(12) United States Patent
Kake et al.

(10) Patent No.: US 11,347,329 B2
(45) Date of Patent: *May 31, 2022

(54) ELECTRONIC PEN, POSITION DETECTION APPARATUS, AND INFORMATION PROCESSING APPARATUS

(71) Applicant: Wacom Co., Ltd., Saitama (JP)

(72) Inventors: Akiyuki Kake, Tokyo (JP); Hanako Kariya, Tokyo (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,646

(22) Filed: Dec. 9, 2020

(65) Prior Publication Data

US 2021/0117018 A1    Apr. 22, 2021

Related U.S. Application Data

(63) Continuation of application No. 16/279,634, filed on Feb. 19, 2019, now Pat. No. 10,890,986, which is a (Continued)

(30) Foreign Application Priority Data

Aug. 22, 2016  (JP) .............................. JP2016-161620

(51) Int. Cl.
*G06F 3/03* (2006.01)
*G06F 3/0354* (2013.01)
(Continued)

(52) U.S. Cl.
CPC ............ *G06F 3/03545* (2013.01); *G06F 3/03* (2013.01); *G06F 3/041* (2013.01); *G06F 3/0488* (2013.01);
(Continued)

(58) Field of Classification Search
CPC ........ G06F 3/03545; G06F 3/03; G06F 3/041; G06F 3/0488; G06F 2203/0384; G06K 7/10376
See application file for complete search history.

(56) References Cited

U.S. PATENT DOCUMENTS

| 2002/0113778 A1 | 8/2002 | Rekimoto et al. |
| 2007/0244834 A1 | 10/2007 | Silverbrook et al. |
| 2017/0131798 A1* | 5/2017 | Geaghan ............. G06F 3/04162 |

FOREIGN PATENT DOCUMENTS

| GB | 2 404 632 A | 2/2005 |
| JP | 6-214704 A | 8/1994 |

(Continued)

OTHER PUBLICATIONS

Extended European Search Report, dated Mar. 9, 2020, for European Application No. 17843144.1-1216, 12 pages.
(Continued)

*Primary Examiner* — Lisa S Landis
(74) *Attorney, Agent, or Firm* — Seed IP Law Group LLP

(57) ABSTRACT

An electronic pen includes: a receiver that receives tag information transmitted from an electronic tag transmitter; a transmitter that transmits a position detection signal for detecting an instruction position in a sensor of a position detection apparatus to the position detection apparatus; and a control circuit that controls the transmitter to transmit the tag information to the position detection apparatus along with the position detection signal when the receiver receives the tag information. The position detection apparatus receives a signal transmitted from the electronic pen, the signal including the tag information and the position detection signal from the electronic tag transmitter, and stores information of the position instructed by the electronic pen detected by the detection circuit in a storage device in association with the tag information from the electronic pen received by the sensor.

17 Claims, 23 Drawing Sheets

Related U.S. Application Data continuation of application No. PCT/JP2017/020222, filed on May 31, 2017.

(51) Int. Cl.
*G06F 3/0488* (2022.01)
*G06F 3/041* (2006.01)
*G06K 7/10* (2006.01)

(52) U.S. Cl.
CPC .. *G06K 7/10376* (2013.01); *G06F 2203/0384* (2013.01)

(56) References Cited

FOREIGN PATENT DOCUMENTS

| | | |
|---|---|---|
| JP | 2001-231765 A | 8/2001 |
| JP | 2002-132446 A | 5/2002 |
| JP | 2006-195931 A | 7/2006 |
| JP | 2006-302046 A | 11/2006 |
| JP | 2008-123265 A | 5/2008 |
| JP | 2008-287627 A | 11/2008 |
| JP | 2010-257470 A | 11/2010 |
| JP | 2011-170712 A | 9/2011 |
| JP | 2016-126473 A | 7/2016 |
| JP | 2016-144119 A | 8/2016 |
| WO | 2014/188635 A1 | 11/2014 |

OTHER PUBLICATIONS

Japanese Office Action, dated Mar. 16, 2021, for Japanese Application No. 2017-210257, 8 pages. (with English Translation).

European Communication pursuant to Article 94(3) EPC, dated Dec. 9, 2021, for European Application No. 17 843 144.1-1216, (7 pages).

Japanese Office Action, dated Apr. 13, 2022, for Japanese Application No. 2021-095508 (8 pages with English-language translation).

\* cited by examiner

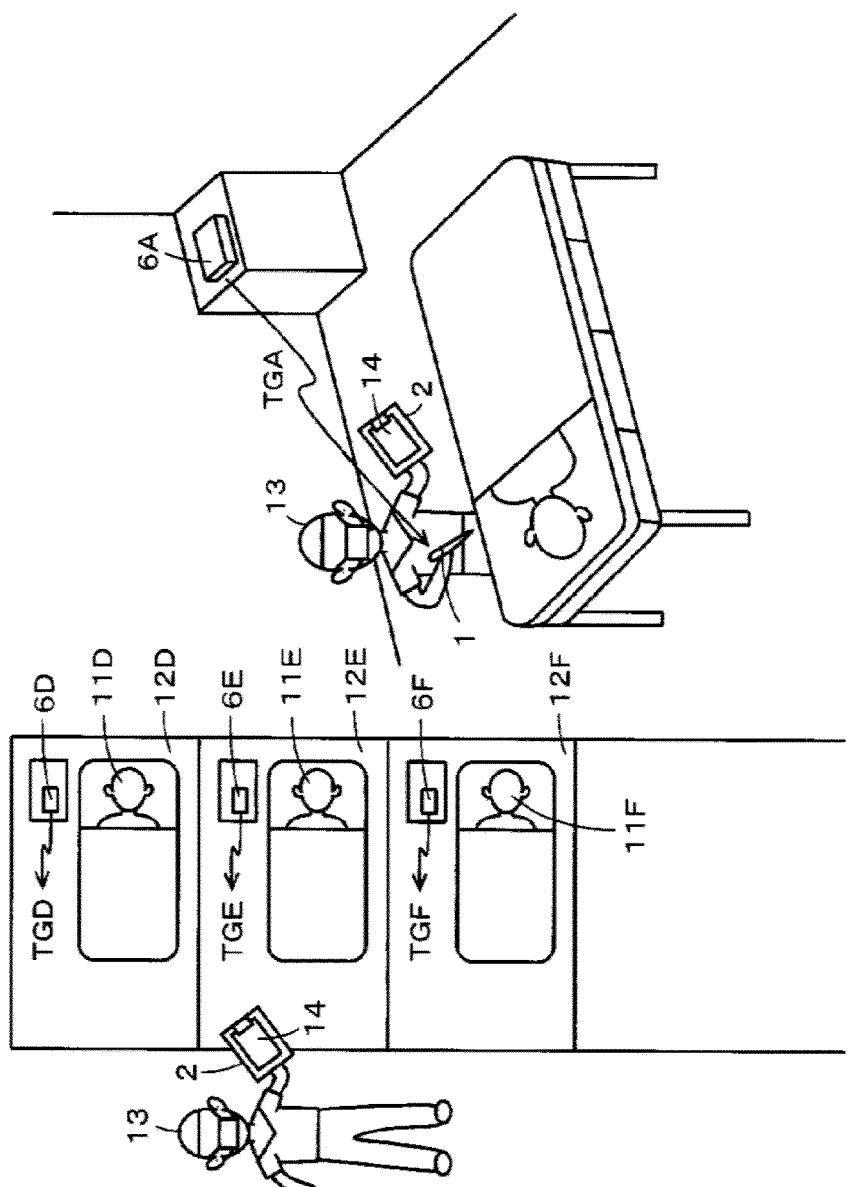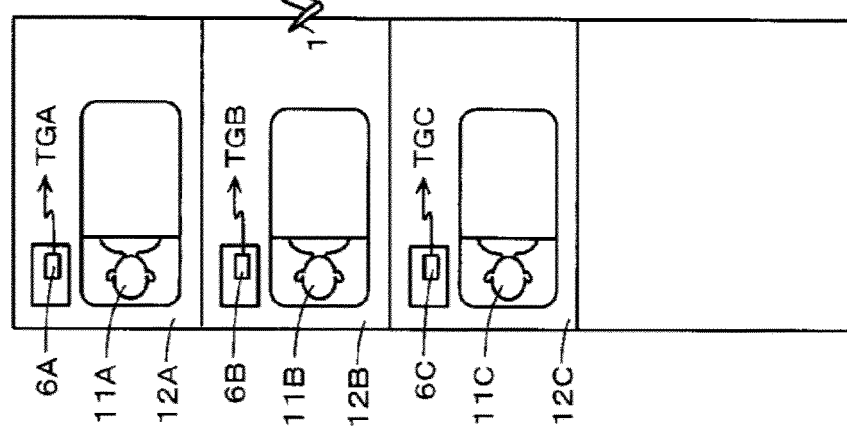

FIG. 4

PEN ID CORRESPONDENCE INFORMATION STORAGE DEVICE

| PEN ID | DOCTOR'S NAME |
|---|---|
| abc··· | XXX |
| def··· | YYY |
| ghi··· | YYY |

FIG. 5

TAG INFORMATION CORRESPONDENCE INFORMATION STORAGE DEVICE

| | | |
|---|---|---|
| TAG INFORMATION TGA | HOSPITAL ROOM No. | EAST 101 |
| | PATIENT'S NAME | ABCD |
| | NAME OF DISEASE | AAA |
| | PATIENT'S IMPRESSIONS AND OPINIONS | $(X_a, Y_a) \sim (X_b, Y_b)$ |
| | DOCTOR'S OBSERVATIONS | $(X_c, Y_c) \sim (X_d, Y_d)$ |
| | ⋮ | ⋮ |
| TAG INFORMATION TGB | HOSPITAL ROOM No. | EAST 102 |
| | PATIENT'S NAME | EFGH |
| | NAME OF DISEASE | BBB |
| | ⋮ | ⋮ |

FIG. 6

TODAY'S RECORD OF DOCTOR'S VISIT

| HOSPITAL ROOM | PATIENT'S NAME | NAME OF DISEASE | PATIENT'S IMPRESSIONS AND OPINIONS | DOCTOR'S OBSERVATIONS | DOCTOR'S NAME |
|---|---|---|---|---|---|
| EAST 101 | ABCD | AAA | :::: | :::: | XXX |
| EAST 102 | EFGH | BBB | :::: | :::: | YYY |
| EAST 103 | IJKL | CCC | :::: | :::: | ZZZ |
| ... | | | ... | ... | ... |

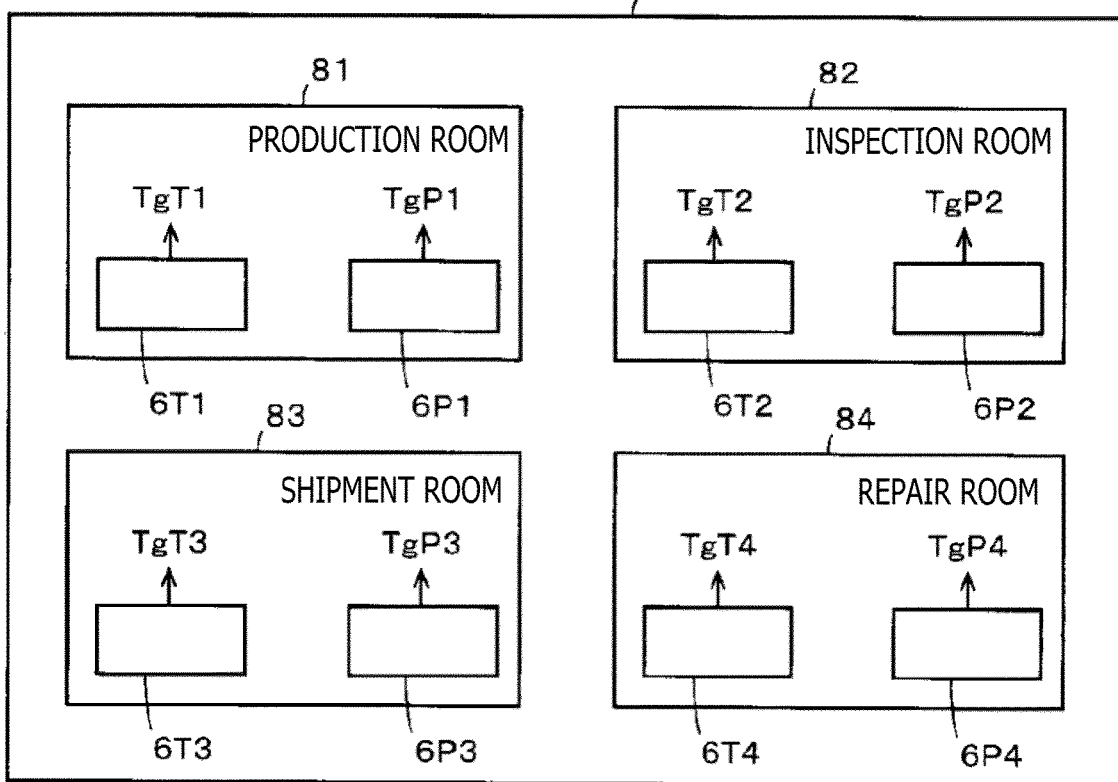

FIG. 23

TAG INFORMATION CORRESPONDENCE INFORMATION STORAGE UNIT

| ROOM | FOR TABLET | FOR ELECTRONIC PEN | PROVIDED APP | PROVIDED INFORMATION |
|---|---|---|---|---|
| PRODUCTION | TgT1 | TgP1 | PRODUCTION APP | COORDINATE VALUE AND DOCUMENT FORMAT TABLE |
| INSPECTION | TgT2 | TgP2 | INSPECTION APP | COORDINATE VALUE AND DOCUMENT FORMAT TABLE |
| SHIPMENT | TgT3 | TgP3 | SHIPMENT APP | COORDINATE VALUE AND DOCUMENT FORMAT TABLE |
| REPAIR | TgT4 | TgP4 | REPAIR APP | COORDINATE VALUE AND DOCUMENT FORMAT TABLE |
| ... | ... | ... | ... | ... |

FIG.24

| TAG INFORMATION | FOR ELECTRONIC PEN |
|---|---|
| TgTA | CREDIT PAYMENT APP AND PROVIDED INFORMATION FOR SHOP A |
| TgPA | SIGNATURE AUTHENTICATION APP AND PROVIDED INFORMATION FOR SHOP A |
| TgTB | CREDIT PAYMENT APP AND PROVIDED INFORMATION FOR SHOP B |
| TgPB | SIGNATURE AUTHENTICATION APP AND PROVIDED INFORMATION FOR SHOP B |
| ⋮ | ⋮ |

FIG.25

PEN ID CORRESPONDENCE INFORMATION STORAGE DEVICE

| | PEN ID | CREDIT CARD NUMBER | SIGNATURE INFORMATION |
|---|---|---|---|
| USER A | IDA | ZZZZYYYYXXXXWWWW | 佐藤 |
| USER B | IDB | AAAABBBBCCCCDDDD | Sato |
| USER C | IDC | EEEEFFFFGGGGHHHH | SATO |
| ⋮ | ⋮ | ⋮ | ⋮ |

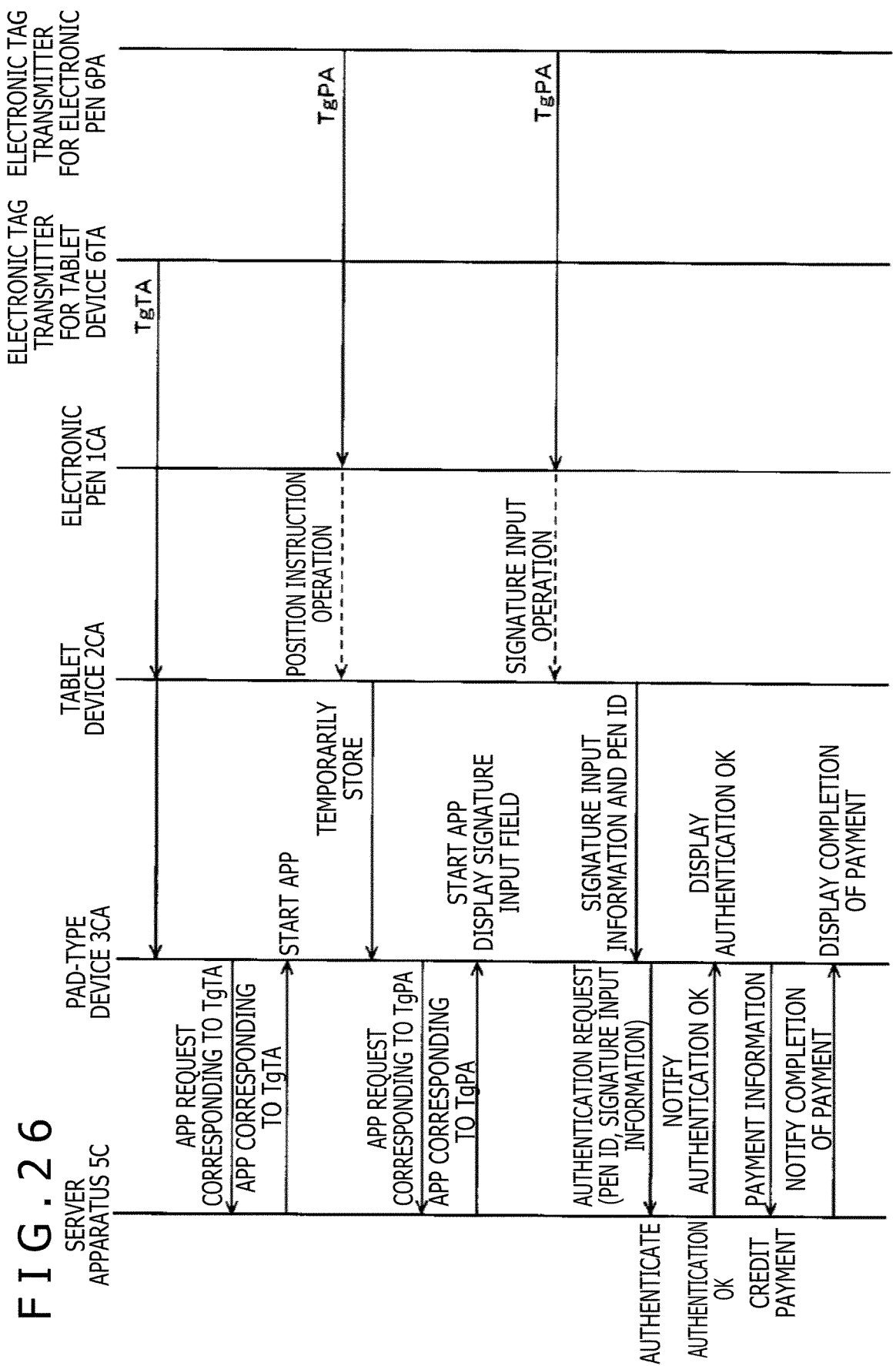

ELECTRONIC PEN, POSITION DETECTION APPARATUS, AND INFORMATION PROCESSING APPARATUS

BACKGROUND

Technical Field

The present disclosure relates to an electronic pen, a position detection apparatus that detects a position instructed and input by the electronic pen, and an information processing apparatus including the electronic pen and a position detection apparatus.

Background Art

Mobile devices, such as a tablet personal computer (PC), a pad-type device, and a smartphone, can be easily carried anywhere, and the mobile devices are used at various places. An input apparatus including an electronic pen and a position detection apparatus is recently admired as an input apparatus of this type of mobile device. The position detection apparatus is integrated into the mobile device, and the electronic pen is an attachment. Examples of a coupling system between the electronic pen and the position detection apparatus include various systems, such as an electromagnetic induction coupling system and a capacitance coupling system, and the electronic pen is used for instructing a predetermined position in a displayed image and for various types of input, such as input of characters and input of a drawing.

Incidentally, in the past, adding a place of capturing the image or the like as exchangeable image file format (Exif) information to the captured image information and storing the information is proposed in, for example, a digital camera. Position information of an absolute position obtained by global positioning system (GPS) positioning is generally used as the information of the captured place. If information (coordinate information) of an instruction position on a sensor of the position detection apparatus instructed and input by the electronic pen on the sensor is also saved in association with the information of the place instructed and input by the electronic pen, it is convenient that the location where the information of the instruction position is input can be recognized.

For example, Patent Document 1 (Japanese Patent Laid-Open No. 2010-257470) discloses a system that acquires and analyzes digital data of report content entered by using an electronic pen and position information of a mobile device that transmits the digital data to thereby verify the correctness of the report content. That is, in the system of Patent Document 1, storage means for storing location information regarding a planned location of the entry and the transmission of the report information is provided in a server, and the server compares the location information regarding the planned location stored in the storage means and the position information sent from the mobile device to verify the correctness of the report content.

PRIOR ART DOCUMENT

Patent Document

Patent Document 1: Japanese Patent Laid-Open No. 2010-257470

BRIEF SUMMARY

Technical Problems

Incidentally, in the system of Patent Document 1, the location information regarding the planned location of the entry and the transmission of the report information needs to be stored in advance in the storage means, and the location information is information of the absolute position obtained by GPS positioning.

Therefore, there is a problem that the mobile device cannot acquire the position information in an indoor place where the GPS radio waves cannot be received.

In addition, in the process in which the server compares the location information regarding the planned location stored in the storage means and the position information sent from the mobile device, the server practically determines whether or not the position information sent from the mobile device is in a predetermined range around the location information stored in the storage means. In this case, the position information obtained by the GPS positioning in the mobile device generally has errors, and there is a problem that the errors reduce the reliability of the comparison result.

There is also a problem that the location information stored in the storage means of the server needs to be registered again when the planned location of the entry and the transmission of the report information are changed. Furthermore, there is a problem that when the planned location of the entry and the transmission of the report information is, for example, in a moving body such as inside a commercial vehicle, it is substantially impossible to store the planned location in the storage means, and the system cannot be applied.

Furthermore, in the system of Patent Document 1, whether or not the entry information is fraudulent is decided based on whether or not the position information of the entered place is an entry planned place, and the information entered by the electronic pen (information instructed by the electronic pen) is not processed according to the place. However, if the information instructed by the electronic pen is processed according to the place of the input of the instruction information or is processed according to a matter related to the place, it is convenient that various expression modes and use modes regarding the information instructed by the electronic pen can be provided according to the place or according to the matter related to the place.

An object of the present disclosure is to provide an electronic pen and a position detection apparatus that can solve the problems.

Another object of the present disclosure is to provide an information processing apparatus that can solve the problems and that can perform a process according to a place of input of instruction information or according to a matter related to the place.

Technical Solution

To solve the problems, the present application teaches an electronic pen including: a receiver which, in operation, receives first identification information transmitted from an electronic tag transmitter; a transmitter which, in operation, transmits a position detection signal for detecting an instruction position in a sensor of a position detection apparatus to the position detection apparatus; and a control circuit which, in operation, controls the transmitter to transmit the first identification information to the position detection apparatus along with the position detection signal when the receiver receives the first identification information.

According to the electronic pen of configured as described above, the first identification information transmitted from the electronic tag transmitter is transmitted to the position detection apparatus along with the position detection signal. Therefore, according to the electronic pen described above, the position detection apparatus can associate the information of the instruction position of the electronic pen detected based on the position detection signal with the first identification information.

In this case, the information of the instruction position of the electronic pen can be associated with the first identification information by installing the electronic tag transmitter in a place where the information of the instruction position of the electronic pen is to be recorded in association with the first identification information.

Therefore, for example, the electronic tag transmitter can be provided for each patient in a hospital, and the electronic tag transmitter can also be moved when the hospital room of the patient is changed. In this way, the information of the instruction position of the electronic pen corresponding to the patient (such as entry information of a doctor's observations regarding the patient) can be always associated. In addition, the electronic tag transmitter can be installed in a specific automobile that is a moving body, and the information of the instruction position of the electronic pen instructed in the specific automobile can be associated with the first identification information corresponding to the specific automobile regardless of the movement of the automobile in which the electronic tag transmitter is installed.

In addition, the present application teaches a position detection apparatus including: a sensor which, in operation, receives a signal transmitted from an electronic pen, the signal including first identification information and a position detection signal from an electronic tag transmitter; a detection circuit which, in operation, detects a position instructed by the electronic pen as a position where the sensor receives the position detection signal from the electronic pen; and a processor which, in operation, stores information of the instruction position detected by the detection circuit in a first storage device in association with the first identification information from the electronic pen received by the sensor.

In addition, the present application teaches a position detection apparatus including: a sensor which, in operation, receives a signal transmitted from an electronic pen, the signal including first identification information and a position detection signal from an electronic tag transmitter; a detection circuit which, in operation, detects a position instructed by the electronic pen as a position where the sensor receives the position detection signal from the electronic pen; and a transmitter which, in operation, transmits information of the instruction position detected by the detection circuit in association with the first identification information from the electronic pen received by the sensor.

According to the position detection apparatuses described above, the sensor receives the first identification information and the position detection signal from the electronic pen. In one position detection apparatus, the detection circuit can detect the position instructed by the electronic pen as the position where the sensor receives the position detection signal from the electronic pen, and the information of the detected instruction position of the electronic pen can be stored in the first storage device in association with the first identification information. In another position detection apparatus, the information of the instruction position of the electronic pen detected by the detection circuit can be transmitted to an external apparatus, such as a PC, in association with the first identification information.

That is, the electronic tag transmitter can be installed in a place where the information of the instruction position of the electronic pen is to be associated with the first identification information, and the position detection apparatus can receive the information. In this way, the information of the instruction position of the electronic pen detected based on the position detection signal can be stored in association with the first identification information or can be transmitted to the outside.

In addition, the present application teaches a position detection apparatus including: a first receiver which, in operation, receives first identification information transmitted from an electronic tag transmitter; a sensor which, in operation, receives a signal from an electronic pen; a detection circuit which, in operation, detects a position instructed by the electronic pen as a position where the sensor receives a position detection signal from the electronic pen; and a processor which, in operation, stores information of the detected instruction position in a first storage device in association with the first identification information received by the first receiver.

In addition, the present application teaches a position detection apparatus including: a first receiver which, in operation, receives first identification information transmitted from an electronic tag transmitter; a sensor which, in operation, receives a signal from an electronic pen; a detection circuit which, in operation, detects a position instructed by the electronic pen as a position where the sensor receives a position detection signal from the electronic pen; and a transmitter which, in operation, transmits information of the detected instruction position in association with the first identification information received by the first receiver.

According to the present disclosure, the first receiver receives the first identification information, and the sensor receives the position detection signal from the electronic pen. In one position detection apparatus, the detection circuit can detect the position instructed by the electronic pen as the position where the sensor receives the position detection signal from the electronic pen, and the information of the detected instruction position of the electronic pen can be stored in the first storage device in association with the first identification information received by the first receiver. In another position detection apparatus, the information of the instruction position of the electronic pen detected by the detection circuit can be transmitted to an external apparatus, such as a PC, in association with the first identification information received by the first receiver.

That is, the electronic tag transmitter can be installed in a place where the information of the instruction position of the electronic pen is to be associated with the first identification information, and the position detection apparatus can receive the information. In this way, the information of the instruction position of the electronic pen detected based on the position detection signal can be stored in association with the first identification information or can be transmitted to the outside.

In addition, the present disclosure teaches a position detection apparatus including: a sensor which, in operation, receives a signal transmitted from an electronic pen, the signal including first identification information and a position detection signal from a first electronic tag transmitter; a first receiver which, in operation, receives second identification information transmitted from a second electronic tag transmitter, the second identification information being different from the first identification information; a detection circuit which, in operation, detects a position instructed by the electronic pen as a position where the sensor receives the position detection signal from the electronic pen; and a processor which, in operation, stores information of the instruction position detected by the detection circuit in a first storage device in association with the first identification information from the electronic pen received by the sensor and the second identification information received by the first receiver.

In addition, the present disclosure teaches a position detection apparatus including: a sensor which, in operation, receives a signal transmitted from an electronic pen, the signal including first identification information and a position detection signal from a first electronic tag transmitter; a first receiver which, in operation, receives second identification information transmitted from a second electronic tag transmitter different from the first electronic tag transmitter; a detection circuit which, in operation, detects a position instructed by the electronic pen as a position where the sensor receives the position detection signal from the electronic pen; and a transmitter which, in operation, transmits information of the instruction position detected by the detection circuit in association with the first identification information from the electronic pen received by the sensor and the second identification information received by the first receiver.

According to the position detection apparatuses described above, the sensor receives the first identification information and the position detection signal from the electronic pen, and the first receiver receives the second identification information. In one position detection apparatus, the detection circuit can detect the position instructed by the electronic pen as the position where the sensor receives the position detection signal from the electronic pen, and the information of the detected instruction position of the electronic pen can be stored in the first storage device in association with the first identification information received by the sensor and the second identification information received by the first receiver. In another position detection apparatus, the information of the instruction position of the electronic pen detected by the detection circuit can be transmitted to an external apparatus, such as a PC, in association with the first identification information received by the sensor and the second identification received by the first receiver.

That is, the first and second electronic tag transmitters can be installed in a place where the information of the instruction position of the electronic pen is to be associated with the first identification information and the second identification information, and the electronic pen and the position detection apparatus can receive the information. In this way, the information of the instruction position of the electronic pen detected based on the position detection signal can be stored in association with the first identification information and the second identification information or can be transmitted to the outside.

To solve the problems, the present disclosure teaches an information processing apparatus including: an electronic pen; a position detection apparatus which, in operation, detects a position instructed by the electronic pen; and a processing device which, in operation, processes information of the position instructed by the electronic pen detected by the position detection apparatus. The electronic pen includes: a receiver which, in operation, receives first identification information transmitted from an electronic tag transmitter; and a transmitter which, in operation, transmits a position detection signal for detecting an instruction position in a sensor of the position detection apparatus and the first identification information received by the receiver to the position detection apparatus. The position detection apparatus, in operation, detects the position instructed by the electronic pen as a position where the sensor receives the position detection signal from the electronic pen and associates and supplies the information of the detected instruction position and the first identification information received through the sensor to the processing device. The processing device, in operation, transmits the first identification information to a predetermined server apparatus to acquire predetermined information corresponding to the first identification information from the server apparatus and uses the acquired predetermined information to process the information of the detected instruction position.

In addition, the present disclosure teaches an information processing apparatus including: an electronic pen; a position detection apparatus which, in operation, detects a position instructed by the electronic pen; and a processing device which, in operation, processes information of the position instructed by the electronic pen detected by the position detection apparatus. The electronic pen includes: a receiver which, in operation, receives first identification information transmitted from an electronic tag transmitter; and a transmitter which, in operation, transmits a position detection signal for detecting an instruction position in a sensor of the position detection apparatus and the first identification information received by the receiver to the position detection apparatus. The position detection apparatus, in operation, detects the position instructed by the electronic pen as a position where the sensor receives the position detection signal from the electronic pen and associates and supplies the information of the detected instruction position and the first identification information received through the sensor to the processing device. The processing device, in operation, transmits the first identification information to a predetermined server apparatus to acquire and start an application program corresponding to the first identification information or start an already installed application program corresponding to the first identification information based on acquisition of the first identification information and uses the started application program to perform a process regarding the information of the detected instruction position.

In the information processing apparatuses described above, the electronic pen transmits the first identification information transmitted from the electronic tag transmitter to the position detection apparatus along with the position detection signal. The position detection apparatus then supplies the information of the instruction position of the electronic pen detected based on the position detection signal from the electronic pen to the processor in association with the first identification information.

The processing device could then transmits the received first identification information to the predetermined server apparatus to acquire the predetermined information corresponding to the first identification information from the server apparatus and uses the acquired predetermined information to process the information of the position instructed by the electronic pen detected by the detection circuit.

In addition, the processing device could transmit the received first identification information to the predetermined server apparatus to acquire the application program corresponding to the first identification information. The processing device starts the acquired application program or starts the already installed application program corresponding to the first identification information based on the acquisition of the first identification information. The processing device uses the started application program to perform the process regarding the information of the detected position instructed by the electronic pen.

In this case, the electronic tag transmitter can be installed in a place where the information of the instruction position of the electronic pen is to be recorded in association with the first identification information, and the information of the instruction position of the electronic pen can be associated with the first identification information.

Therefore, for example, the electronic tag transmitter can be provided for each patient in a hospital, and the electronic tag transmitter can also be moved when the hospital room of the patient is changed. In this way, the information of the instruction position of the electronic pen corresponding to the patient can be always associated. In addition, the electronic tag transmitter can be installed in a specific automobile that is a moving body, and the information of the instruction position of the electronic pen instructed in the specific automobile can be associated with the first identification information corresponding to the specific automobile regardless of the movement of the automobile in which the electronic tag transmitter is installed.

The processing device can acquire, as the predetermined information corresponding to the first identification information, a display color or a display mode of a character or the like based on the information of the instruction position of the electronic pen from the server apparatus, for example. The processing device can use the display color or the display mode according to the acquired predetermined information to display the character or the like.

The processing device can start the application program corresponding to the first identification information to perform the process regarding the information of the instruction position of the electronic pen according to the application program.

In addition, the present disclosure teaches an information processing apparatus including: an electronic pen; a position detection apparatus which, in operation, detects a position instructed by the electronic pen; and a processing device which, in operation, processes information of the position instructed by the electronic pen detected by the position detection apparatus. The position detection apparatus includes: a first receiver which, in operation, receives first identification information transmitted from an electronic tag transmitter; a sensor which, in operation, receives a signal from the electronic pen; and a supply circuit which, in operation, detects the position instructed by the electronic pen as a position where the sensor receives a position detection signal from the electronic pen and supplies the information of the detected position to the processing device in association with the first identification information received by the receiver. The processing device, in operation, transmits the first identification information to a predetermined server apparatus to acquire predetermined information corresponding to the first identification information from the server apparatus and uses the acquired predetermined information to process the information of the detected instruction position.

In addition, the present disclosure teaches an information processing apparatus including: an electronic pen; a position detection apparatus which, in operation, detects a position instructed by the electronic pen; and a processing device which, in operation, processes information of the position instructed by the electronic pen detected by the position detection apparatus. The position detection apparatus includes: a first receiver which, in operation, receives first identification information transmitted from an electronic tag transmitter; a sensor which, in operation, receives a signal from the electronic pen; and a supply circuit which, in operation, detects the position instructed by the electronic pen as a position where the sensor receives a position detection signal from the electronic pen and supplies the information of the detected position to the processing device in association with the first identification information received by the receiver. The processing device, in operation, transmits the first identification information to a predetermined server apparatus to acquire and start an application program corresponding to the first identification information or start an already installed application program corresponding to the first identification information based on acquisition of the first identification information and uses the started application program to perform a process regarding the information of the detected instruction position.

The information processing apparatuses described above are only different from the electronic pens described above in that, in one, the first receiver of the position detection apparatus receives the first identification information from the electronic tag transmitter, and the information of the position instructed by the electronic pen is associated with the first identification information received by the first receiver. The other effects are similar to the effects electronic pen described above.

In addition, the present disclosure teaches an information processing apparatus including: an electronic pen; a position detection apparatus which, in operation, detects a position instructed by the electronic pen; and a processing device which, in operation, processes information of the position instructed by the electronic pen detected by the position detection apparatus. The electronic pen includes: a first receiver which, in operation, receives first identification information transmitted from a first electronic tag transmitter; and a transmitter which, in operation, transmits a position detection signal for detecting an instruction position in a sensor of the position detection apparatus and the first identification information received by the first receiver to the position detection apparatus. The position detection apparatus includes: a detection circuit which, in operation, detects the position instructed by the electronic pen as a position where the sensor receives the position detection signal from the electronic pen; a second receiver which, in operation, receives second identification information transmitted from a second electronic tag transmitter, the second identification information being different from the first identification information; and a supply circuit which, in operation, associates and supplies the information of the instruction position detected by the detection circuit, the first identification information received through the sensor, and the second identification information received by the second receiver to the processing device. The processing device, in operation, transmits the first identification information and the second identification information to a predetermined server apparatus to acquire predetermined information corresponding to each of the first identification information and the second identification information from the server apparatus or acquire predetermined information corresponding to the first identification information and the second identification information and uses the acquired predetermined information to process the information of the detected instruction position.

Furthermore, the present disclosure teaches an information processing apparatus including: an electronic pen; a position detection apparatus which, in operation, detects a position instructed by the electronic pen; and a processing device which, in operation, processes information of the position instructed by the electronic pen detected by the position detection apparatus. The electronic pen includes: a first receiver which, in operation, receives first identification information transmitted from a first electronic tag transmitter; and a transmitter which, in operation, transmits a position detection signal for detecting an instruction position in a sensor of the position detection apparatus and the first identification information received by the first receiver to the position detection apparatus. The position detection apparatus includes: a detection circuit which, in operation, detects the position instructed by the electronic pen as a position where the sensor receives the position detection signal from the electronic pen; a second receiver which, in operation, receives second identification information transmitted from a second electronic tag transmitter, the second identification information being different from the first identification information; and a supply circuit which, in operation, associates and supplies the information of the instruction position detected by the detection circuit, the first identification information received through the sensor, and the second identification information received by the second receiver to the processing device. The processor, in operation, transmits one or more of the first identification information and the second identification information to a predetermined server apparatus to acquire and start an application program corresponding to the first identification information and/or the second identification information or start an already installed application program corresponding to the first identification information and/or the second identification information based on acquisition of the first identification information and/or the second identification information, and uses the started application program to perform a process regarding the information of the detected instruction position.

In the information processing apparatuses configured as described above, the electronic pen transmits the first identification information transmitted from the first electronic tag transmitter to the position detection apparatus along with the position detection signal. In the position detection apparatus, the first receiver receives the second identification information transmitted from the second electronic tag transmitter. The position detection apparatus then supplies the information of the instruction position of the electronic pen detected based on the position detection signal from the electronic pen to the processing device in association with the first identification information and the second identification information.

In addition, the processing device of the information processing apparatus could transmit the received first identification information and second identification information to the predetermined server apparatus to acquire the predetermined information corresponding to each of the first identification information and the second identification information from the server apparatus or to acquire the predetermined information corresponding to the first identification information and the second identification information and uses the acquired predetermined information to process the information of the position instructed by the electronic pen detected by the detection circuit.

Furthermore, the processing device of the information processing apparatus could transmit the received first identification information and/or second identification information to the predetermined server apparatus to acquire the application program corresponding to the first identification information and/or the second identification information. The processing device starts the acquired application program or starts the already installed application program corresponding to the first identification information and/or the second identification information based on the acquisition of the first identification information and/or the second identification information and uses the started application program to perform the process regarding the information of the detected position instructed by the electronic pen.

The processing device can acquire the predetermined information corresponding to each of the first identification information and the second identification information or acquire the predetermined information corresponding to the first identification information and the second identification information from the server apparatus and perform the process according to the acquired predetermined information.

The processing device can start the application program corresponding to the first identification information and/or the second identification information to perform the process according to the application program regarding the information of the instruction position of the electronic pen.

Advantageous Effects

According to an electronic pen of the present disclosure, the first identification information transmitted from the electronic tag transmitter is transmitted to the position detection apparatus along with the position detection signal, and the position detection apparatus can associate the information of the instruction position of the electronic pen detected based on the position detection signal with the first identification information.

According to position detection apparatuses of the present disclosure, the sensor receives the first identification information and the position detection signal from the electronic pen. Therefore, a position detection apparatus according to the present disclosure can store the information of the instruction position of the electronic pen detected by the detection circuit in the first storage device in association with the first identification information, and a position detection apparatus according to the present disclosure can transmit the information of the instruction position of the electronic pen detected by the detection circuit to an external apparatus, such as a PC, in association with the first identification information.

According to position detection apparatuses of the present disclosure, the first receiver receives the first identification information, and the sensor receives the position detection signal from the electronic pen. Therefore, a position detection apparatus according to the present disclosure can store the information of the instruction position of the electronic pen detected by the detection circuit in the first storage device in association with the first identification information received by the first receiver, and a position detection apparatus according to the present disclosure can transmit the information of the instruction position of the electronic pen detected by the detection circuit to an external apparatus, such as a PC, in association with the first identification information received by the first receiver.

In this case, the information of the instruction position of the electronic pen can be associated with the first identification information by installing the electronic tag transmitter in a place where the information of the instruction position of the electronic pen is to be recorded in association with the first identification information. Therefore, it is convenient that the information of the instruction position of the electronic pen does not have to be associated with the position information (such as position information of GPS positioning) of the input place of the information. In addition, it is convenient that a desirable process can be performed regarding the information of the instruction position of the electronic pen just by preparing information or a processing function for processing the information of the instruction position of the electronic pen according to the first identification information.

According to a position detection apparatuses of the present disclosure, the sensor receives the first identification information and the position detection signal from the electronic pen, and the first receiver receives the second identification information. Therefore, a position detection apparatus according to the present disclosure can store the information of the instruction position of the electronic pen detected by the detection circuit in the first storage device in association with the first identification information received by the sensor and the second identification information received by the first receiver, and a position detection apparatus according to the present disclosure can transmit the information of the instruction position of the electronic pen detected by the detection circuit to an external apparatus, such as a PC, in association with the first identification information received by the sensor and the second identification information received by the first receiver.

In this case, the information of the instruction position of the electronic pen can be associated with the first identification information and the second identification information by installing the first electronic tag transmitter in a place where the information of the instruction position of the electronic pen is to be recorded in association with the first identification information and by installing the second electronic tag transmitter in a place where the information of the instruction position of the electronic pen is to be transmitted to the position detection apparatus. Therefore, it is convenient that the information of the instruction position of the electronic pen does not have to be associated with the input place of the information of the instruction position of the electronic pen or with the position information of the location of the position detection apparatus. In addition, it is convenient that a desirable process can be performed regarding the information of the instruction position of the electronic pen just by preparing information or a processing function for processing the information of the instruction position of the electronic pen according to the first identification information and the second identification information.

According to the information processing apparatuses of the present disclosure, the processing device can acquire the predetermined information corresponding to the first identification information from the server apparatus and perform a process according to the acquired predetermined information.

According to the present disclosure, the processing device can start the application program corresponding to the first identification information to perform the process according to the application program regarding the information of the instruction position of the electronic pen.

In this case, the information of the instruction position of the electronic pen can be associated with the first identification information by installing the electronic tag transmitter in a place where the information of the instruction position of the electronic pen is to be recorded in association with the first identification information. Therefore, it is convenient that the information of the instruction position of the electronic pen does not have to be associated with the position information (such as position information of GPS positioning) of the input place of the information of the instruction position of the electronic pen. In addition, it is convenient that a desirable process can be performed regarding the information of the instruction position of the electronic pen just by preparing information for processing the information of the instruction position of the electronic pen or an application program of processing function in the server apparatus according to the first identification information.

According to the present disclosure, the sensor of the position detection apparatus receives the first identification information and the position detection signal from the electronic pen, and the first receiver receives the second identification information. Therefore, a position detection apparatus according to the present disclosure can supply the information of the instruction position of the electronic pen detected by the detection circuit to the processing device in association with the first identification information received by the sensor and the second identification information received by the first receiver, and a position detection apparatus according to the present disclosure can transmit the information of the instruction position of the electronic pen detected by the detection circuit to the processing device in association with the first identification information received by the sensor and the second identification information received by the first receiver.

In this case, the information of the instruction position of the electronic pen can be associated with the first identification information and the second identification information by installing the first electronic tag transmitter in a place where the information of the instruction position of the electronic pen is to be recorded in association with the first identification information and by installing the second electronic tag transmitter in a place where the information of the instruction position of the electronic pen is to be transmitted to the position detection apparatus. Therefore, it is convenient that the information does not have to be associated with the input place of the information of the instruction position of the electronic pen or to the position information of the location of the position detection apparatus. In addition, it is convenient that a desirable process can be performed regarding the information of the instruction position of the electronic pen just by preparing information or a processing function for processing the information of the instruction position of the electronic pen according to the first identification information and the second identification information.

BRIEF DESCRIPTION OF DRAWINGS

FIGS. 2A and 2B are diagrams for describing a use mode of the first embodiment of the electronic pen, the position detection apparatus, and the information processing apparatus according to the present disclosure in the information processing system in the example of FIG. 1.

FIG. 4 is a diagram for describing storage content of a storage device of a server apparatus as part of the information processing system in the example of FIG. 1.

FIG. 5 is a diagram for describing storage content of a storage device of the server apparatus as part of the information processing system in the example of FIG. 1.

FIG. 6 is a diagram for describing a use mode of the first embodiment of the electronic pen, the position detection apparatus, and the information processing apparatus according to the present disclosure in the information processing system in the example of FIG. 1.

FIG. 21 is a diagram for describing a use mode of the fourth embodiment of the electronic pen, the position detection apparatus, and the information processing apparatus according to the present disclosure in the information processing system in the example of FIG. 20.

FIGS. 22A and 22B are diagrams for describing a use mode of the fourth embodiment of the electronic pen, the position detection apparatus, and the information processing apparatus according to the present disclosure in the information processing system in the example of FIG. 20.

FIG. 23 is a diagram for describing storage content of a storage device of the server apparatus as part of the information processing system in the example of FIG. 20.

FIG. 24 is a diagram for describing storage content of the storage device of the server apparatus as part of the information processing system in the example of FIG. 20.

FIG. 25 is a diagram for describing storage content of a storage device of the server apparatus as part of the information processing system in the example of FIG. 20.

FIG. 26 is a sequence diagram for describing a flow of processing action of the fourth embodiment of the electronic pen, the position detection apparatus, and the information processing apparatus according to the present disclosure in the information processing system in the example of FIG. 20.

MODES FOR CARRYING OUT THE DISCLOSURE

Hereinafter, some embodiments of an electronic pen and a position detection apparatus according to the present disclosure will be described with reference to the drawings.

First Embodiment

Figure 1:
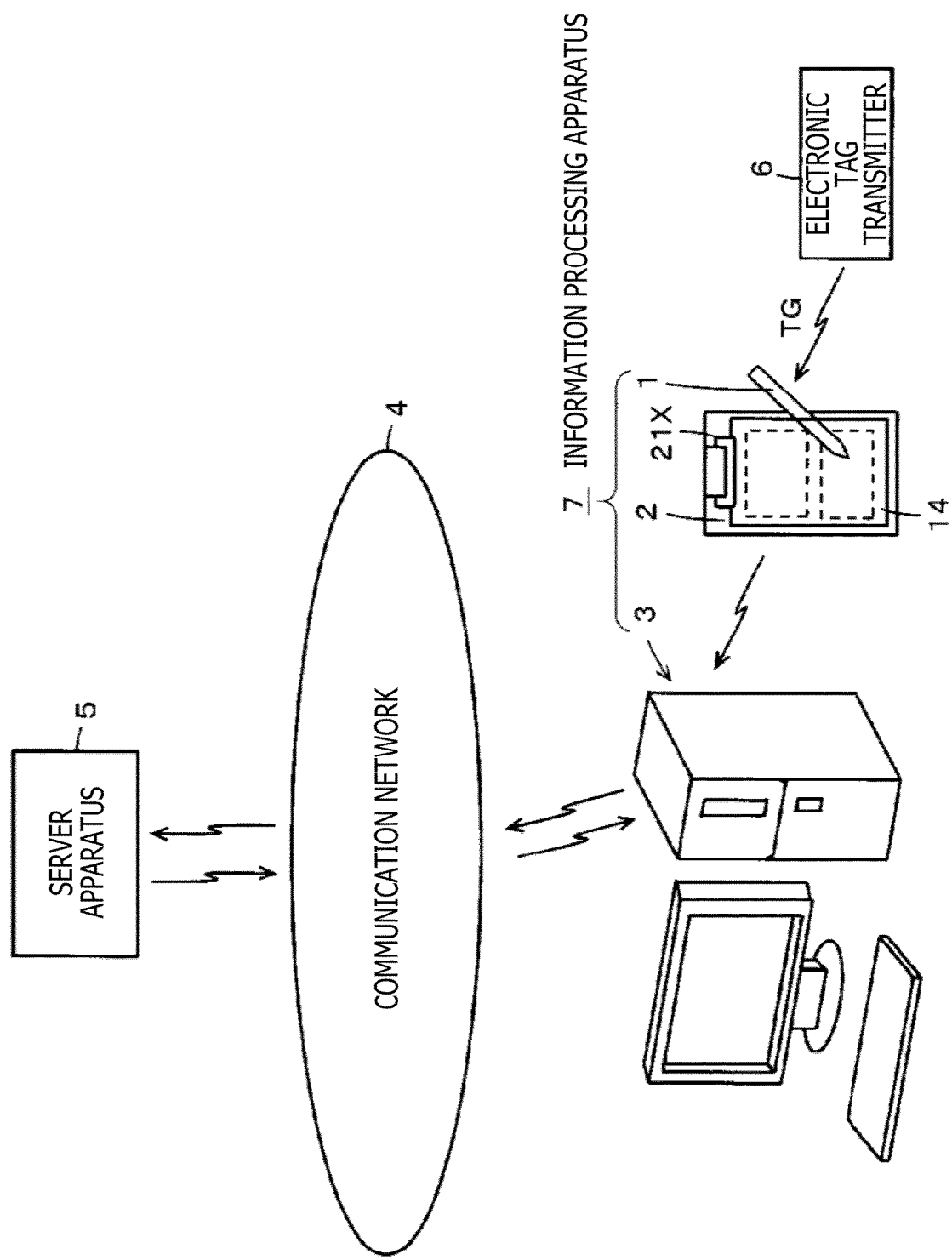
FIG. 1 is a diagram illustrating an overview of an example of an information processing system including a first embodiment of an electronic pen, a position detection apparatus, and an information processing apparatus according to the present disclosure.

FIG. 1 is a diagram illustrating an overview of an information processing system including a first embodiment of the electronic pen and the position detection apparatus according to the present disclosure. An overview of a configuration of the information processing system in this example will be described with reference to FIG. 1.

As illustrated in FIG. 1, the information processing system of this example includes: an electronic pen 1; a tablet device 2 including a position detection apparatus that receives an input of instruction using the electronic pen 1; a personal computer (hereinafter, abbreviated as PC) 3 wirelessly connected to the tablet device 2; a server apparatus 5 connected to the PC 3 through a communication network 4; and an electronic tag transmitter 6.

The electronic tag transmitter 6 includes a wireless communication device compliant with a short range wireless communication standard, such as a Bluetooth (registered trademark) standard, with a communication range of, for example, approximately 10 meters and wirelessly transmits tag information including specific identification information, such as identification information called universal unique identification (UUID). Note that the electronic tag transmitter 6 in this specification is similar to a device equivalent to a so-called beacon (iBeacon) device.

Although the information processing system may include only one electronic tag transmitter 6 as in the example of FIG. 1, the information processing system of the first embodiment includes a plurality of electronic tag transmitters 6 that transmit different pieces of specific identification information as tag information of the electronic tag transmitters 6. Note that the plurality of electronic tag transmitters 6 in the first embodiment are placed at different installation locations where the wireless communication ranges do not overlap with each other.

Predetermined information used for processing by the PC 3 is stored in advance in the server apparatus 5 in association with the tag information (specific identification information) of each of the plurality of electronic tag transmitters 6.

In the first embodiment, the electronic pen 1, the tablet device 2, and the PC 3 configure an information processing apparatus 7, and the tablet device 2 configures a position detection apparatus of the information processing apparatus 7. The PC 3 configures a processing device, and the electronic pen 1 has a function of receiving the tag information from the electronic tag transmitters 6.

That is, the electronic pen 1 in the first embodiment includes a wireless communication device compliant with a Bluetooth (registered trademark) standard to receive the tag information from the electronic tag transmitters 6. In the embodiment, the electronic pen 1 uses an electromagnetic induction transfer system (electro-magnetic resonance (EMR) system) to transmit a position detection signal to a sensor of the tablet device 2. The tablet device 2 detects the position instructed by the electronic pen 1 as a coordinate position on the sensor where the position detection signal is received from the electronic pen.

In addition, the electronic pen 1 of the present embodiment includes a storage device of identification information of the electronic pen 1 and transmits, as additional information of the position detection signal, the identification information of the electronic pen (hereinafter, referred to as pen ID) stored in the storage device to the sensor of the position detection apparatus of the tablet device 2.

Predetermined information used for the processing by the PC 3 is stored in advance in the server apparatus 5 in association with the pen ID of the electronic pen 1.

In the first embodiment, when the electronic pen 1 is used to perform an instruction input operation for the tablet device 2 at a place where the tag information can be received from the electronic tag transmitter 6, the electronic pen 1 transmits, along with the pen ID, the tag information received from the electronic tag transmitter 6 as additional information of the position detection signal to the tablet device 2 through the sensor.

In the tablet device 2, the sensor uses an electromagnetic induction coupling system to receive the position detection signal from the electronic pen 1, and the tablet device 2 detects the received coordinate position on the sensor to detect the position instructed by the electronic pen 1. The tablet device 2 then stores (including temporary storage), in the storage device, the information of the instruction position of the electronic pen 1 in the detection result in association with the received pen ID. The tablet device 2 then sends the stored information of the position instructed by the electronic pen 1 and the pen ID to the PC 3.

In addition, when the tag information and the pen ID as the additional information are transmitted from the electronic pen 1 along with the position detection signal, the tablet device 2 associates and stores (including temporary storage) the information of the position instructed by the electronic pen detected based on the position detection signal, the tag information, and the pen ID. In this case, the tablet device 2 transmits the information of the position instructed by the electronic pen 1, the tag information, and the pen ID stored in the storage device to the PC 3.

In this case, the tablet device 2 may transmit the information of the position instructed by the electronic pen 1 and the pen ID or the information of the position instructed by the electronic pen 1, the tag information, and the pen ID to the PC 3 in real time without storing them in the storage device or may store them in the storage device and transmit them to the PC 3 based on, for example, a later operation of the user. The PC 3 then uses the acquired information to perform a process, such as a display process, regarding the information of the position instructed by the electronic pen.

When the PC 3 receives the pen ID from the tablet device 2 in addition to the information of the position instructed by the electronic pen 1, the PC 3 sends an information providing request including the received pen ID to the server apparatus 5 through the communication network 4 and acquires the information stored in association with the pen ID from the server apparatus 5.

In addition, when the PC 3 receives the pen ID and the tag information from the tablet device 2 in addition to the information of the position instructed by the electronic pen 1, the PC 3 sends an information providing request including the received pen ID and tag information to the server apparatus 5 through the communication network 4 and acquires the information stored in association with the pen ID and the information stored in association with the tag information from the server apparatus 5. The PC 3 then uses the acquired information to perform a process, such as a display process, regarding the information of the position instructed by the electronic pen.

Although the information processing apparatus 7 includes the electronic pen 1, the tablet device 2, and the PC 3 as described above, the combination is not fixed to a combination of a specific electronic pen 1, a specific tablet device 2, and a specific PC 3, and the information processing apparatus 7 may include a combination of an arbitrary electronic pen 1, an arbitrary tablet device 2, and an arbitrary PC 3. Therefore, the same electronic pen 1 may be shared and used by a plurality of information processing apparatuses 7. Similarly, the same tablet device 2 and PC 3 may be shared and used by a plurality of information processing apparatuses 7. Although only one information processing apparatus is illustrated in FIG. 1, it is obvious that a plurality of sets of information processing apparatuses may be connected, through communication means, to the electronic tag transmitter 6 and the server apparatus 5 connected to the communication network 4.

The communication network 4 may be a network including a public network, such as the Internet and a mobile phone network. The communication network 4 may also be a wireless local area network (LAN) using wireless fidelity (Wi-Fi). The communication network 4 may also be a LAN for wired connection between the PC 3 and the server apparatus 5.

[Specific Example of Use of Information Processing System]

Next, the configuration and the action of each component of the information processing system including the first embodiment of the electronic pen and the position detection apparatus according to the present disclosure for which the overview is described above will be further described along with a specific example of use.

FIGS. 2A and 2B are diagrams for describing an overview of a case in which the information processing system of the present embodiment is applied to recording of a doctor's visit for hospitalized patients of a hospital. In addition, FIGS. 3 to 6 are diagrams used for describing each component of the information processing system of this example.

In the example, patients 11A, 11B, 11C, 11D, 11E, 11F, . . . are hospitalized in private hospital rooms 12A, 12B, 12C, 12D, 12E, 12F, . . . , respectively, as illustrated in FIG.

2A. In addition, electronic tag transmitters 6A, 6B, 6C, 6D, 6E, 6F, . . . that transmit tag information TGA, TGB, TGC, TGD, TGE, TGF, . . . including specific identification information different from each other are installed in the hospital rooms 12A, 12B, 12C, 12D, 12E, 12F, . . . , respectively. Here, the electronic tag transmitters 6A, 6B, 6C, 6D, 6E, 6F, . . . are distinguished by adding suffixes A, B, C, D, E, F, . . . , respectively, when there are a plurality of electronic tag transmitters 6. Note that each of the electronic tag transmitters 6A, 6B, 6C, 6D, 6E, 6F, . . . can wirelessly communicate with an electronic pen 1A only in the hospital room provided with the electronic tag transmitter, and the wireless communication is disabled when the electronic pen 1A is in another hospital room.

In the example, a doctor 13 carries the electronic pen 1 and the tablet device 2 for the doctor 13 to visit each of the hospital rooms 12A, 12B, 12C, 12D, 12E, 12F, . . . to perform a doctor's visit for each of the patients 11A, 11B, 11C, 11D, 11E, 11F, . . . and uses the electronic pen 1 to enter observations into the tablet device 2 on the spot.

Note that when there is a plurality of doctors 13 in charge of the doctor's visit, different electronic pens 1 respectively corresponding to the plurality of doctors 13 in charge of the doctor's visit are used. In addition, there may be one tablet device 2 shared by the plurality of doctors in the first embodiment, or there may be different tablet devices 2 respectively corresponding to the plurality of doctors 13 in charge of the doctor's visit.

The tablet device 2 of the present embodiment does not include a display screen as described later with reference to FIGS. 4 and 5. Instead, recording paper 14 can be placed on a surface corresponding to an input surface of the sensor and can be locked by a paper holder. The dimension of the recording paper 14 is, for example, an A4 size.

In addition, the electronic pen 1 is an electronic pen with a ballpoint pen function, and a ballpoint pen ink can be used for writing on the recording paper 14 placed on the sensor of the tablet device 2. When the electronic pen 1 is used for writing on the recording paper 14 placed on the sensor, the tablet device 2 is configured to use a position detection function to detect the trajectory of the writing. That is, the tablet device 2 of this example can hold the trajectory of the writing at the time of the writing on the recording paper 14 as electronic data (information of position instructed by the electronic pen 1).

Figure 3:
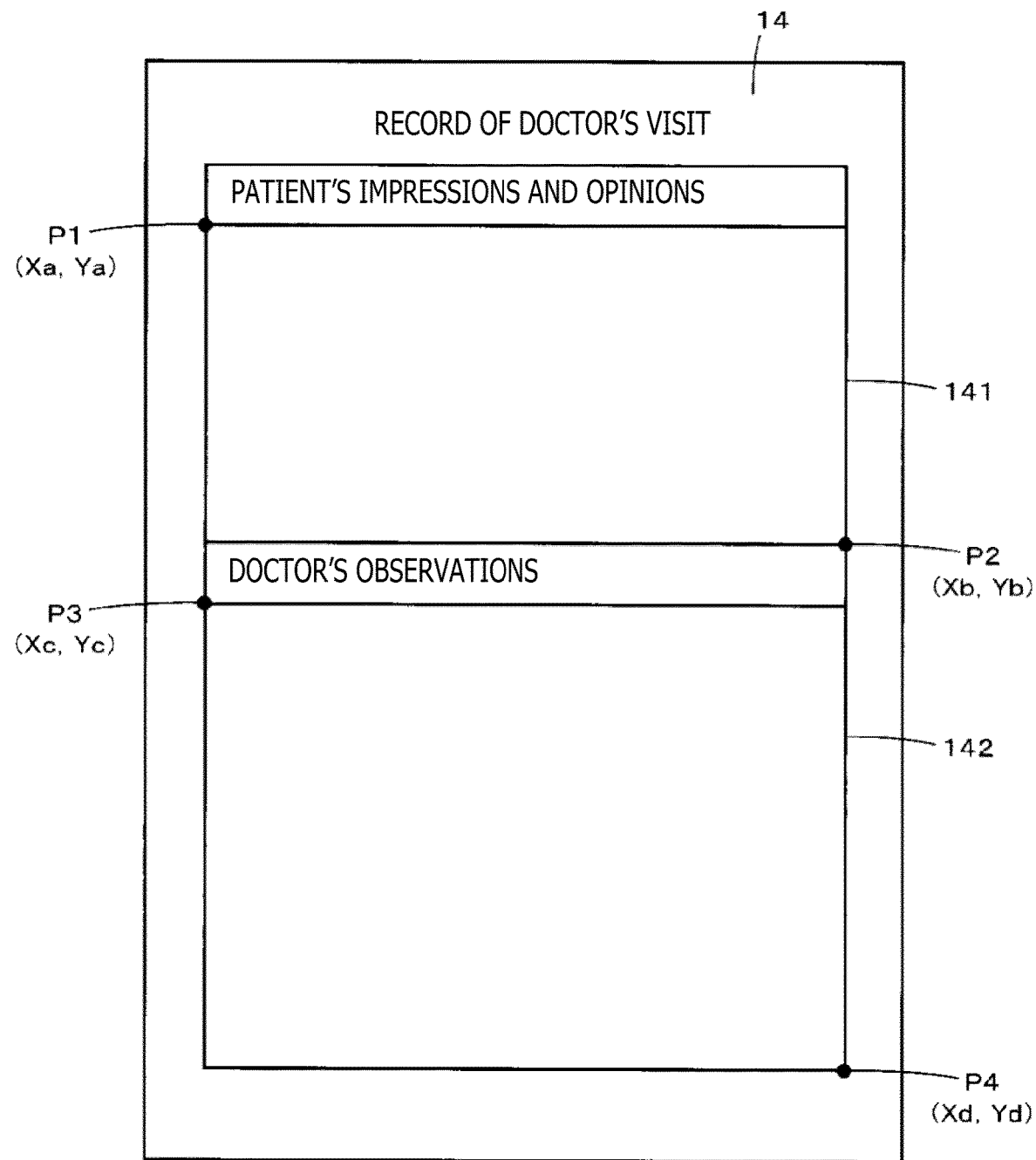
FIG. 3 is a diagram for describing a use mode of the first embodiment of the electronic pen, the position detection apparatus, and the information processing apparatus according to the present disclosure in the information processing system in the example of FIG. 1.

In this case, a document format providing a predetermined entry field is, for example, printed in advance on the recording paper 14 in this example. For example, a document format including an entry field 141 for a patient's impressions and opinions and an entry field 142 for a doctor's observations is, for example, printed in advance on the recording paper 14 as entry fields for the recording of the doctor's visit as illustrated in FIG. 3. In the tablet device 2, the recording paper 14 is fixed by holding the paper at a predetermined position as described later.

Therefore, each entry field in the printed document format can be associated with a coordinate position range of the sensor of the tablet device 2. That is, in the example of FIG. 3, the entry field 141 for a patient's impressions and opinions is a region of a rectangular range specified by a coordinate position P1 indicated by position coordinates (Xa, Ya) and a coordinate position P2 indicated by position coordinates (Xb, Yb). In addition, the entry field 142 for a doctor's observations is a region of a rectangular range specified by a coordinate position P3 indicated by position coordinates (Xc, Yc) and a coordinate position P4 indicated by position coordinates (Xd, Yd).

In the case of using the recording paper 14 in the example of FIG. 3, the doctor 13 listens to the patients 11A to 11F . . . in the hospital rooms 12A to 12F . . . to obtain impressions and opinions. The doctor 13 uses the electronic pen 1 to write and input the obtained content to the entry field 141 for a patient's impressions and opinions of the recording paper 14 mounted on the tablet device 2 and inputs the position instruction to the sensor of the tablet device 2. The patients 11A to 11F . . . themselves may use the electronic pen 1 handed over from the doctor 13 to write and input impressions and opinions to the entry field 141 for a patient's impressions and opinions in the recording paper 14 mounted on the tablet device 2 and may input the position instruction to the sensor of the tablet device 2.

The doctor 13 also uses the electronic pen 1 to write and input observations to the entry field 142 for a doctor's observations in the recording paper 14 mounted on the tablet device 2 for each of the patients 11A to 11F . . . in each of the hospital rooms 12A to 12F . . . and inputs the position instruction to the sensor of the tablet device 2.

Note that FIG. 3 is an example of the document format printed on the recording paper 14, and different document formats can also be prepared according to hospital wards, according to departments, such as a department of internal medicine, a department of surgery, and a department of pediatrics, or according to diseases of patients.

The electronic tag transmitters 6A to 6F . . . are installed in the hospital rooms 12A to 12F . . . , respectively. Therefore, the electronic pen 1 receives the tag information from the electronic tag transmitter installed in the hospital room where the doctor 13 is visiting at that point. The electronic pen 1 then transmits the received tag information as additional information of the position detection signal to the tablet device 2. The tablet device 2 stores, in association with the received additional information, the information of the position instructed by the electronic pen 1 detected based on the position detection signal.

For example, if the hospital room where the doctor 13 is visiting at that point is the hospital room 12A as illustrated in FIG. 2B, the electronic pen 1 receives the tag information TGA from the electronic tag transmitter 6A installed in the hospital room 12A. Therefore, the electronic pen 1 transmits the position detection signal as well as the pen ID and the tag information TGA as additional information of the position detection signal to the tablet device 2 in the hospital room 12A. Therefore, the tablet device 2 stores the information of the position instructed by the electronic pen 1 detected based on the position detection signal in association with the pen ID of the electronic pen 1 and the tag information TGA.

The doctor 13 finished with the doctor's visit of all of the hospital rooms 12A to 12F . . . uses wired connection or wireless connection to connect the tablet device 2 to, for example, the PC 3 of the doctor 13 or to a shared PC 3 for collecting the information of the doctor's visit and transfers the information of the stored position instructed by the electronic pen 1 as well as the pen ID of the electronic pen 1 and the tag information, such as the tag information TGA, associated with the information to the PC 3. Note that the recording paper 14 with the data written by the ballpoint pen function of the electronic pen 1 may be handed over to each patient or may be stored in the hospital.

When the PC 3 receives, from the tablet device 2, the information of the position instructed by the electronic pen 1 as well as the pen ID of the electronic pen 1 and the tag information, such as the tag information TGA, associated with the information, the PC 3 sends an information providing request including the pen ID and the tag information TGA to the server apparatus 5 through the communication network 4. The PC 3 then acquires, from the server apparatus 5, predetermined information corresponding to the pen ID and the tag information in response to the transmitted information providing request.

An example of information stored in the server apparatus 5 will be described with reference to FIGS. 4 and 5. That is, the server apparatus 5 is provided with a pen ID correspondence information storage device and a tag information correspondence information storage device in this example. As illustrated in FIG. 4, correspondence information of the pen ID and the doctor's name are stored in advance in the pen ID correspondence information storage device. As illustrated in FIG. 5, predetermined information corresponding to each of the tag information TGA, TGB, TGC, TGD, TGE, TGF, ... from each of the electronic tag transmitters 6A, 6B, 6C, 6D, 6E, 6F, ... is stored in advance in the tag information correspondence information storage device.

That is, for example, a manager of the hospital uses the PC 3 to access the server apparatus 5 through the communication network 4 and launches a registration application program of pen ID (hereinafter, application program will be abbreviated as app). The manager associates and registers the pen ID of the electronic pen 1A for each doctor and the name of the doctor in the server apparatus 5. The server apparatus 5 associates the registered pen ID and the name as illustrated in FIG. 4 and stores them in the pen ID correspondence information storage device. The manager of the hospital then distributes each electronic pen 1 with the pen ID registered in the server apparatus 5 to each corresponding registered doctor.

The manager of the hospital also uses the PC 3 to access the server apparatus 5 through the communication network 4 and launches a registration app of tag information correspondence information. The manager registers in advance, in the server apparatus 5, each of the tag information TGA, TGB, TGC, TGD, TGE, TGF, ... from each of the electronic tag transmitters 6A, 6B, 6C, 6D, 6E, 6F ... and predetermined information to be registered in association with the tag information. The server apparatus 5 associates each of the registered tag information TGA, TGB, TGC, TGD, TGE, TGF, ... and the corresponding predetermined information as illustrated in FIG. 5 and stores them in the tag information correspondence information storage device.

In the example of FIG. 5, "Hospital Room Number (No.)," "Patient's Name," and "Name of Disease" as well as coordinate information for specifying the region range in the sensor of the tablet device 2 with respect to the entry field of the document format of the recording paper 14 are registered and stored as the predetermined information corresponding to each of the registered tag information TGA, TGB, TGC, TGD, TGE, TGF, .... In the example of FIG. 5, the entry field of the patient's impressions and opinions and the entry field of the doctor's observations are registered as entry fields of the document format of the recording paper 14. For each entry field, ((Xa, Ya), (Xb, Yb) (see FIG. 3)) or ((Xc, Yc), (Xd, Yd) (see FIG. 3)) is registered as coordinate information for specifying the region in the sensor of the tablet device 2.

When the server apparatus 5 receives the information providing request from the PC 3, the server apparatus 5 uses the storage information to generate provided information and returns the provided information to the PC 3. That is, when the information providing request from the PC 3 includes the pen ID, the server apparatus 5 reads the information of the doctor's name corresponding to the received pen ID from the pen ID correspondence information storage device (see FIG. 4) and returns the information as provided information to the PC 3. When the information providing request form the PC 3 includes the tag information, the server apparatus 5 reads the information registered in association with the received tag information from the tag information correspondence information storage device (see FIG. 5) and returns the information as provided information to the PC 3.

In the present embodiment, the PC 3 uses the predetermined information received from the server apparatus 5 to process the information of the position instructed by the electronic pen 1 received from the tablet device 2. In the present embodiment, the PC 3 uses the information of the position instructed by the electronic pen 1 received from the tablet device 2 and the predetermined information received from the server apparatus 5 to generate display information and displays the generated display information on a display screen of a display of the PC 3. FIG. 6 illustrates an example of a display of the display screen of the display of the PC 3 in this example.

That is, in this example, the tag information from the electronic tag transmitter 6 installed in the hospital room of each patient can be sent to the server apparatus 5 to display the entry information entered into the tablet device 2 by the doctor in the doctor's visit on the display screen of the display of the PC 3 in association with the patient's name, the name of disease, and the like of each hospital room associated with the tag information as illustrated in FIG. 6. In this example, it is convenient that the name of the doctor executing the doctor's visit can also be displayed by acquiring the doctor's name from the server apparatus 5 based on the pen ID of the electronic pen 1.

Note that as for the patient's impressions and opinions and the doctor's observations, an image of the characters entered into the recording paper 14 may be displayed, or the entered characters may be recognized to obtain text data to display an image of the text data.

In this way, in the information processing system including the electronic pen 1 and the tablet device 2 according to the first embodiment, the electronic tag transmitter 6 that transmits specific identification information as tag information is prepared, and the electronic pen 1 is provided with the function of receiving the tag information from the electronic tag transmitter 6. When the electronic pen 1 receives the tag information from the electronic tag transmitter 6, the electronic pen 1 transmits the received tag information as additional information of the position detection signal to the tablet device 2 included in the position detection apparatus. The tablet device 2 detects the information of the position instructed by the electronic pen 1 based on the position detection signal and associates and stores (including temporary storage) the detected information of the position instructed by the electronic pen 1 and the tag information.

The electronic tag transmitter 6 can be installed in an arbitrary place, at an arbitrary point of time, and according to an arbitrary occasion, such as an objective and usage, to transmit the tag information as specific identification information to the electronic pen 1. That is, the electronic tag transmitter 6 can be installed according to time (T), place (P), and occasion (O). The detected information of the position instructed by the electronic pen 1 and the tag information are associated and stored in the tablet device 2. Therefore, the tag information can be used as reference information to acquire information associated with the tag information, and the acquired information can be used to process the information of the position instructed by the electronic pen 1 according to the T, P, and O.

In the embodiment, information according to the installation time (T), the installation place (P), and the installation objective and usage (O) of the electronic tag transmitter 6 is associated with the tag information and stored in the server apparatus 5 as predetermined information to be used to process the information of the position instructed by the electronic pen 1. An information processing apparatus that processes the information of the position instructed by the electronic pen 1 can acquire the predetermined information from the server apparatus 5 in association with the tag information to easily process the information of the position instructed by the electronic pen 1 according to the T, P, and O. That is, the information related to the installation place, the installation time, and the installation objective of the electronic tag transmitter can be stored in the server apparatus 5 in association with the tag information, and the information processing apparatus can acquire the stored information based on the tag information to easily process the information of the position instructed by the electronic pen 1 according to the T, P, and O. In this case, there is an advantage that the information of the absolute position of the installation place of the electronic tag transmitter 6 does not have to be registered.

The embodiment also has an advantageous effect that predetermined information can be stored in the server apparatus 5 in association with the pen ID of the electronic pen 1, and the information processing apparatus can use the predetermined information also associated with the pen ID to process the information of the position instructed by the electronic pen 1.

[Example of Detailed Configuration of Each Component in Information Processing System]

Figure 7:
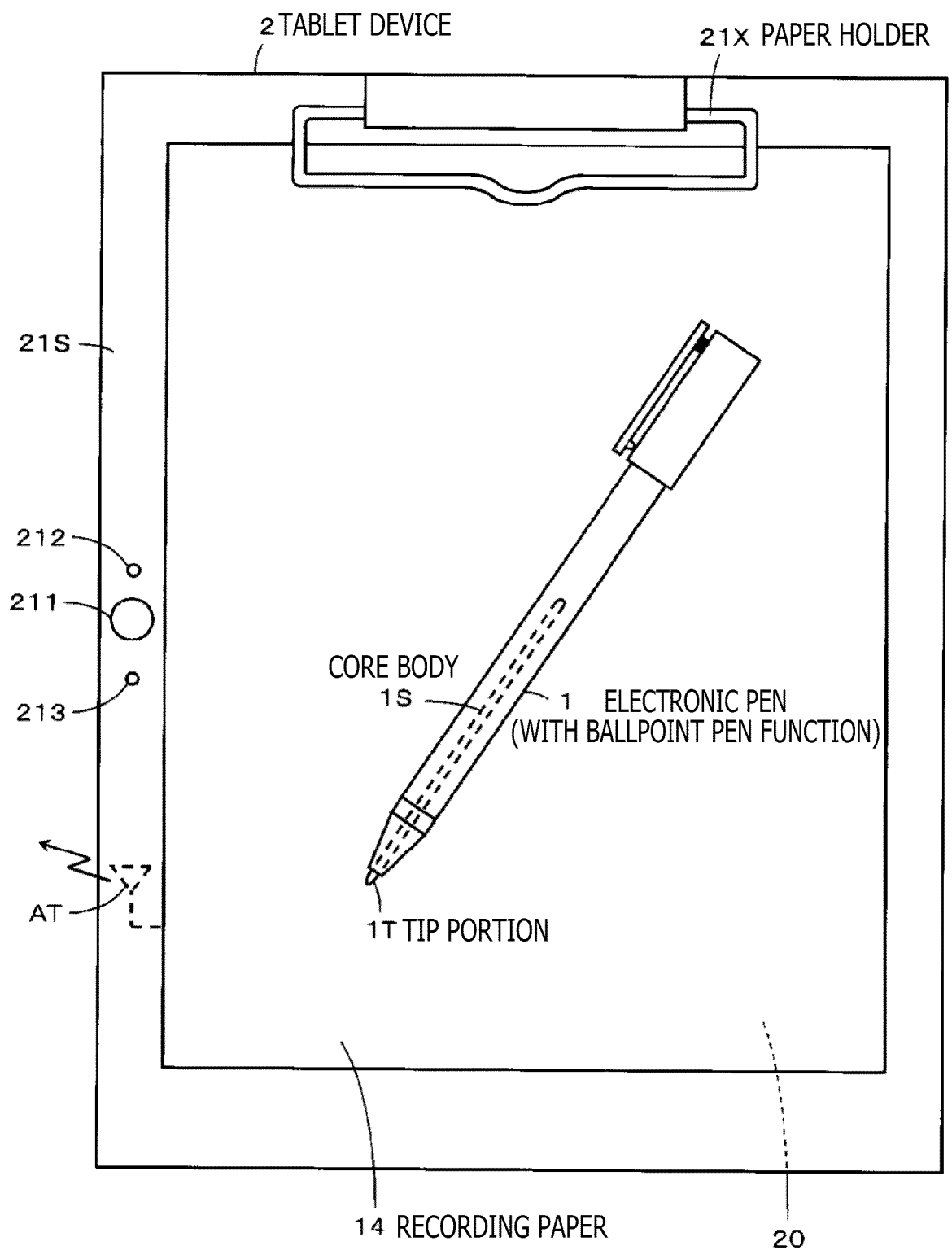
FIG. 7 is a diagram for describing an example of a hardware configuration of the first embodiment of the electronic pen and the position detection apparatus according to the present disclosure.
Figure 8:
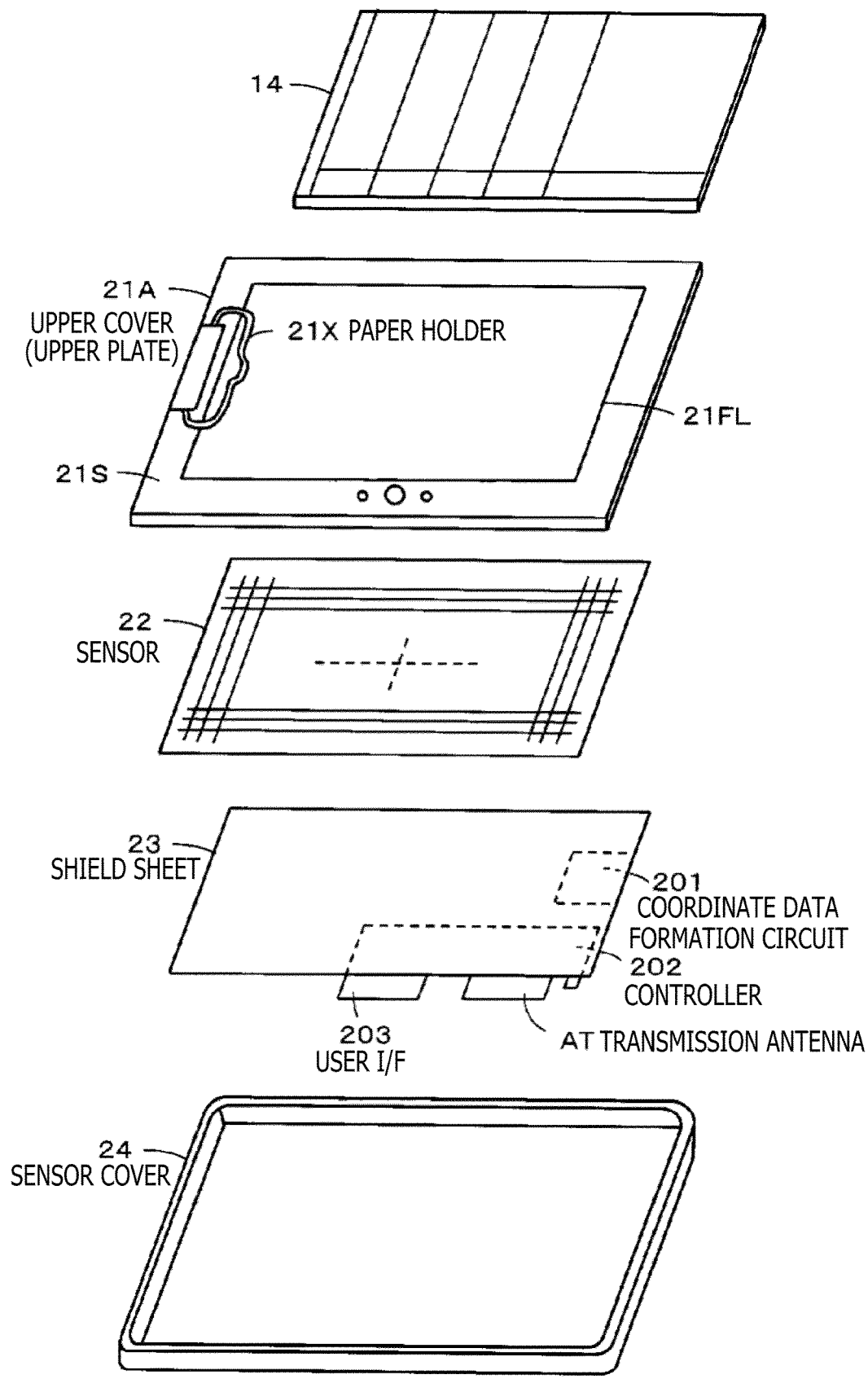
FIG. 8 is a diagram for describing an example of a hardware configuration of the first embodiment of the position detection apparatus according to the present disclosure.

FIGS. 7 and 8 are diagrams illustrating an example of a mechanical hardware configuration of the tablet device 2 according to the first embodiment.

[Appearance and Basic Configuration of Tablet Device 2]

FIG. 7 is a diagram for describing an appearance of the tablet device 2 according to the first embodiment. As illustrated in FIG. 7, the tablet device 2 of the present embodiment includes a paper holder 21X that holds the recording paper 14 at an upper end of an instruction input surface 21S for the electronic pen 1 to fix the recording paper 14 on the instruction input surface 21S of the tablet device 2, and the tablet device 2 has an appearance similar to widely used stationery called a binder or the like.

A position detection apparatus 20 of an electromagnetic induction transfer system is installed in the tablet device 2 in the present embodiment to provide a configuration of an electronic binder. The electronic pen 1 can be used to input coordinate data to the tablet device 2. The electronic pen 1 has a function (coordinate instruction function) of cooperating with the position detection apparatus 20 installed in the tablet device 2 to repeatedly transmit a position detection signal that can be received by the position detection apparatus 20. The electronic pen 1 also includes a core body 1S filled with ink and a tip portion (pen tip) 1T provided at an end of the core body 1S to provide a function (ballpoint pen function) that can leave handwriting on the recording paper 14.

In the present embodiment, the electronic pen 1 uses the electromagnetic induction transfer system to transmit and receive signals to and from the sensor of the tablet device 2 as described above and causes the position detection apparatus of the tablet device 2 to detect the instruction position. The mechanical configuration of the electronic pen 1 of the present embodiment can be a configuration of a well-known electronic pen of the electromagnetic induction transfer system except that the core body has the ballpoint pen function, and the mechanical configuration will not be illustrated here.

As illustrated in FIG. 7, the ballpoint pen function of the electronic pen 1 can be used to write characters and symbols or draw a picture on the recording paper 14 fixed to the tablet device 2 by using the paper holder 21X. In this case, based on the signal transmitted at the same time from the electronic pen 1 toward the position detection apparatus 20 by using the coordinate instruction function of the electronic pen 1, the position detection apparatus 20 detects the coordinate data as information of the instruction position corresponding to the handwriting formed on the recording paper 14 and accumulates the coordinate data as electronic data in the storage device.

The coordinate data (handwriting data) accumulated in the storage device of the tablet device 2 can be wirelessly transmitted to the PC 3 through a controller and a transmission antenna AT installed in the tablet device 2 which will be described in detail later. Therefore, the information written on the recording paper 14 can be imported and used as coordinate data (handwriting data) in real time without taking time to separately use an image reader or the like to import the information written on the recording paper 14 as electronic data.

An operation button 211 and light emitting diodes (LEDs) 212 and 213 are also provided at a left end of the instruction input surface 21S of the tablet device 2. The operation button 211 is for receiving an input of operation from the user, and the LEDs 212 and 213 are for notifying the user of the action state or the like of the tablet device 2. The operation button 211 is, for example, an operator operated to turn on and off the power supply or transmit the coordinate data and the additional information (pen pressure information and tag information) as imported information of the imported position instructed by the electronic pen 1.

[Basic Structure of Tablet Device 2]

FIG. 8 is an exploded configuration diagram for describing an example of a mechanical hardware configuration of the tablet device 2. As illustrated in FIG. 8, the tablet device 2 can be roughly divided into an upper cover (upper plate) 21, a sensor 22 that detects the position instructed by the electronic pen 1, a shield sheet 23, and a sensor cover 24, from the top with the instruction input surface 21S on the upper side. The sensor cover 24 positioned at the lowest part is formed by a synthetic resin, metal, or the like, and the sensor cover 24 has a thin box shape in which the upper surface is an opening. The shield sheet 23 and the sensor 22 are housed in the sensor cover 24.

The shield sheet 23 includes an electromagnetic sheet made of a magnetic material pasted together with a conductive sheet formed by, for example, indium tin oxide (ITO), zinc oxide, or tin oxide. The shield sheet 23 prevents inclusion of an unnecessary signal in the sensor 22 and plays a role of eliminating a leakage of a magnetic flux generated from the sensor 22. The shield sheet 23 is provided to cover the entire surface on the opposite side of the instruction input surface 21S of the sensor 22.

Although the details of the configuration of the sensor 22 will be described later, the sensor 22 includes a large number of linear conductors (loop coils) that transmit signals to the electronic pen 1 and that receive signals from the electronic pen 1.

The upper cover 21 is formed by a material, such as a synthetic resin, glass, and ceramic, that transmits the signal (radio wave) transmitted from the electronic pen 2. The side of the upper cover 21 exposed to the outside is the instruction input surface 21S.

The paper holder 21X formed by, for example, metal is provided at the upper end of the instruction input surface 21S of the upper cover 21 as also illustrated in FIG. 7, and the recording paper 14 can be held on the upper cover 21 (on the tablet device 2). The upper cover 21 covers and protects the sensor 22 and functions as an upper plate on which the recording paper 14 is placed.

On the instruction input surface 21S of the upper cover 21, a frame portion 21FL indicating a region corresponding to the instruction input region of the sensor 22 is formed as a mark for positioning the recording paper 14 as illustrated in FIG. 8. The frame portion 21FL may be formed by printing a frame or may be formed by a protrusion or a recess. A plurality of pieces of recording paper 14 can be bundled at a predetermined thickness, and the recording paper 14 can be sandwiched and held by the paper holder 21X of the upper cover 21 as illustrated in FIG. 8. The electronic pen 1 adopts the electromagnetic induction coupling system, and the electronic pen 1 can exchange electromagnetic waves to and from the sensor 22 even when there are a plurality of pieces of recording paper 14 at the predetermined thickness.

Furthermore, a coordinate data formation circuit 201 and a controller 202 are provided to face the sensor 22 across the shield sheet 23 as illustrated along with the shield sheet 23 in FIG. 8. The coordinate data formation circuit 201 is configured to form coordinate data based on output from the sensor 22. The controller 202 mainly realizes a control function of accumulating, in the storage device, the coordinate data formed by the coordinate data formation circuit 201 and transmitting the accumulated data to an external electronic device such as the PC 3.

The controller 202 also includes a wireless communication device, and the transmission antenna AT is provided for the wireless communication device. The transmission antenna AT is provided outside of the region covered by the shield sheet 23 to allow appropriately transmitting the coordinate data and the like to an external electronic device such as the PC 3.

A user interface (hereinafter, referred to as user I/F) 203 provided with the operation button 211 and the LEDs 212 and 213 is also connected to the controller 202. In this case, to allow the user to operate the user I/F 203 provided with the operation button 211 and the LEDs 212 and 213, the user I/F 213 is provided to protrude from an outer edge of the shield sheet 23 so that the operation button 211 and the LEDs 212 and 213 are not covered by the shield sheet 23.

The tablet device 2 of the present embodiment is used by using the frame portion 21FL as a mark to position and place the recording paper 14 on the instruction input surface 21S that is the upper surface of the upper cover 21 as illustrated in FIG. 7. The recording paper 14 is fixed by the paper holder 21X, and the electronic pen 1 is used for the writing on the recording paper 14.

<Example of Electronic Circuit Configuration of Electronic Pen 1 and Tablet Device 2 and Electronic Circuit Configuration of Electronic Tag Transmitter 6>

Figure 9:
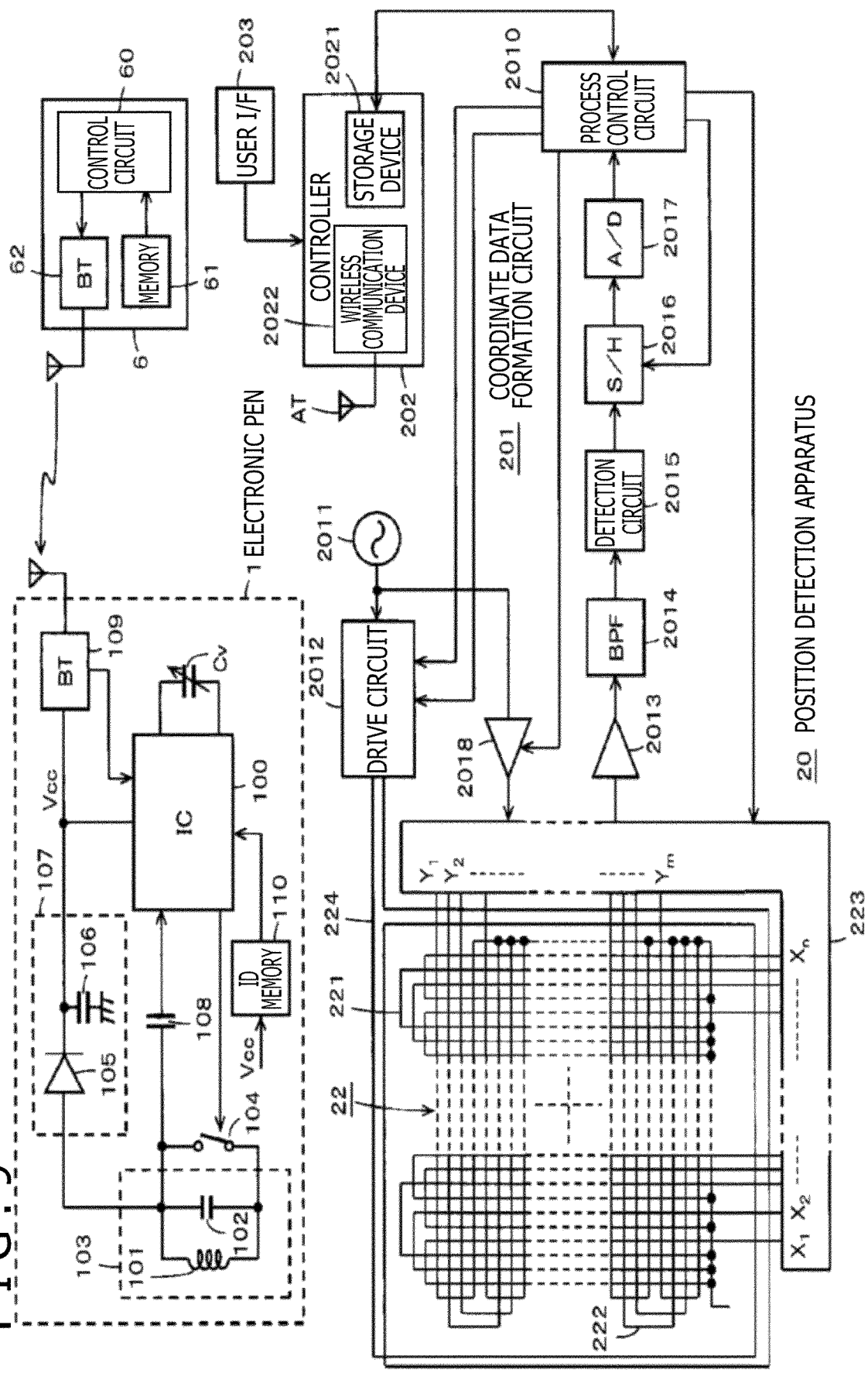
FIG. 9 is a diagram for describing an example of an electronic circuit configuration of the first embodiment of the electronic pen and the position detection apparatus according to the present disclosure.

FIG. 9 is a diagram illustrating an example of a circuit configuration of an equivalent circuit of the electronic pen 1 of the first embodiment and the position detection apparatus 20 of the tablet device 2 that uses the electromagnetic induction transfer system to detect the position and the pen pressure of the electronic pen 1 and also illustrating an example of a circuit configuration of the electronic tag transmitter 6.

The position detection apparatus 20 of the tablet device 2 in the example of FIG. 9 includes the sensor 22, the coordinate data formation 201, and the controller 202 as described above. The sensor 22 is provided with a selection circuit 223 formed by laminating an X-axis direction loop coil group 221 and a Y-axis direction loop coil group 222 and is configured to sequentially select one loop coil of the two loop coil groups 221 and 222.

The electronic pen 1 includes a signal control circuit including an integrated circuit (IC) 100 and is configured to acquire a drive voltage for driving the IC 100 from an excitation signal transmitted from an excitation coil 224 included in the sensor 22 of the position detection apparatus 20 of the tablet device 2. Note that although the loop coil groups 221 and 222 of the sensor 22 are used only to receive an electromagnetic coupling signal from the electronic pen 1 in the example described in FIG. 9, this does not exclude electromagnetic coupling with the electronic pen 1 to drive a signal control circuit included in the electronic pen 1 in place of the excitation coil 224. In addition, this does not exclude transmission of a signal of predetermined control data or the like to the signal control circuit included in the electronic pen 1.

In the sensor 22 of the position detection apparatus 20 in the example of FIG. 9, the excitation coil 224 is provided to surround the X-axis direction loop coil group 221 and the Y-axis direction loop coil group 222. Although the excitation coil 224 has two turns in FIG. 9, the excitation coil 224 practically has more turns, such as eight to ten turns. As illustrated in FIG. 9, the excitation coil 224 is connected to a drive circuit 2012, and the drive circuit 2012 is connected to an oscillation circuit 2011 that oscillates at a frequency fo.

The drive circuit 2012 is controlled by a process control circuit 2010 including a microcomputer or microprocessor. The process control circuit 2010 controls the drive circuit 2012 to control the supply of an oscillation signal at the frequency fo from the oscillation circuit 2011 to the excitation coil 224 and to control transmission of a signal from the excitation coil 224 to the electronic pen 1.

The oscillation signal with the frequency fo from the oscillation circuit 2011 is also supplied to the selection circuit 223 through an amplifier 2018. The gain of the amplifier 2018 is controlled by a control signal from the process control circuit 2010, and the oscillation signal from the oscillation circuit 2011 can be intermittent.

The process control circuit 2010 controls the selection by the selection circuit 223, and the selection circuit 223 selects one loop coil. The selection circuit 223 is controlled by the process control circuit 2010 to set a first half of a selected period of the selected one loop coil as a transmission period of the signal from the oscillation circuit 2011 and to set the period of a second half as a reception period of the signal from the electronic pen 1. In the reception period of the signal from the electronic pen 1, an induced voltage generated by the loop coil selected by the selection circuit 223 is amplified by a reception amplifier 2013 and supplied to a band-pass filter 2014, and only components of the frequency fo are extracted. The band-pass filter 2014 supplies the extracted components to a detection circuit 2015.

The detection circuit 2015 detects the components of the frequency fo and supplies a direct current (DC) signal according to the detected components of the frequency fo to a sample and hold circuit 2016. The sample and hold circuit 2016 holds a voltage value at predetermined timing of an output signal of the detection circuit 2015, specifically, at predetermined timing in a reception period, and transmits the voltage value to an analog to digital (A/D) conversion circuit 2017. The A/D conversion circuit 2017 converts an analog output of the sample and hold circuit 2016 into a digital signal and outputs the digital signal to the process control circuit 2010. The process control circuit 2010 supplies the signal at the predetermined timing to the sample and hold circuit 2016.

The process control circuit 2010 then determines whether or not the digital signal from the A/D conversion circuit 2017 indicates a value exceeding a predetermined threshold value. The process control circuit 2010 determines whether or not the loop coil selected by the selection circuit 223 is a loop coil at the position instructed by the electronic pen 1 and detects the position instructed by the electronic pen 1 based on the determination.

Other than the detection of the position instructed by the electronic pen 1, the process control circuit 2010 also detects the intermittence of the signal from the electronic pen 1 as a digital signal of several bits to detect the pen pressure and detects the tag information from the electronic tag transmitter 6 as described later. The process control circuit 2010 then associates and supplies the detected information of the position instructed by the electronic pen, the detected information of the pen pressure, and the detected tag information to the controller 202.

The controller 202 associates and stores the received information of the position instructed by the electronic pen, the information of the pen pressure, and the tag information in a storage device 2021. Note that the controller 202 includes a clock with a calendar function not illustrated and also stores information of year, month, day, hour, minute, and second at the point of time of the storage in association with the information stored in the storage device 2021.

When the controller 202 receives an instruction for transmission to the server apparatus 5 from the user through the user I/F 203, the controller 202 reads the tag information from the storage device 2021 and transmits an information providing request including the read tag information from a wireless communication device 2022 to the server apparatus 5 through the communication network 4.

The circuit configuration of the electronic pen 1 is as illustrated by surrounding the electronic pen 1 with a dotted line in FIG. 9. That is, a capacitor 102 is connected parallel to a coil 101 as an inductance element to configure a resonant circuit 103. A switch 104 is connected parallel to the resonant circuit 103. The IC 100 controls ON and OFF of the switch 104. When the switch 104 is OFF, the resonant circuit 103 performs a resonant action for the signal from the sensor 22. However, when the switch 104 is ON, the capacitor 102 connected parallel to the coil 101 is short-circuited, and the resonant action by the resonant circuit 103 for the signal from the sensor 22 is turned off.

The IC 100 is operated by a power supply voltage Vcc obtained by using a rectifier circuit (power supply circuit) 107 including a diode 105 and a capacitor 106 to rectify an alternate current (AC) signal received by the resonant circuit 103 through electromagnetic induction from the sensor 22 of the position detection apparatus 20 of the tablet device 2. The IC 100 is connected to the resonant circuit 103 through a capacitor 108, and the IC 100 monitors operation conditions of the resonant circuit 103. By monitoring the operation conditions of the resonant circuit 103, the IC 100 can detect conditions of electromagnetic coupling with the excitation coil 224 of the sensor 22, or although not described in this example, can use the two loop coil groups 221 and 222 to detect a signal of control data or the like transmitted from the sensor 22 of the position detection apparatus 20 to perform desirable action control.

The electronic pen 1 of the present embodiment includes pen pressure detection means including a pressure-sensitive element that detects the pen pressure applied to the core body 1S as capacitance Cv of a variable capacitor, for example. The variable capacitor is connected to the IC 100 as illustrated in FIG. 9, and the IC 100 can detect the capacitance Cv according to the pen pressure. The IC 100 detects the pen pressure in the electronic pen 1 from the value of the capacitance Cv. The IC 100 then converts the detected pen pressure into, for example, a digital signal of 8 bits. The IC 100 uses the digital signal corresponding to the pen pressure to control the switch 104 to transmit the information of the pen pressure as additional information to the position detection apparatus 20 of the tablet device 2.

The electronic pen 1 of the present embodiment also includes a wireless communication device 109 compliant with a Bluetooth (registered trademark) standard to allow receiving the tag information from the electronic tag transmitter 6 as illustrated in FIG. 9. The wireless communication device 109 is operated by the power supply voltage Vcc obtained from the rectifier circuit 107 and is configured to supply the received tag information to the IC 100. The IC 100 also uses the received tag information (digital signal) to control the switch 104 to transmit the tag information as additional information to the position detection apparatus 20 of the tablet device 2.

The electronic tag transmitter 6 includes a control circuit 60, a memory 61 that stores specific identification information, and a wireless communication device 62 compliant with a Bluetooth (registered trademark) standard. When power is supplied to the electronic tag transmitter 6, the control circuit 60 reads the specific identification information stored in the memory 61 and repeatedly sends out the information as tag information from the wireless communication device 62.

A position detection action and a detection action of the pen pressure information and the tag information of the electronic pen 1 and the position detection apparatus 20 of the tablet device 2 configured in this way will be described.

The process control circuit 2010 first drives the drive circuit 2012 to transmit a signal from the excitation coil 224 to the electronic pen 1 for a predetermined time. Next, the process control circuit 2010 causes the selection circuit 223 to sequentially select one loop coil of the X-axis direction loop coil group 221 and transmits the oscillation signal from the oscillation circuit 2011 to the electronic pen 1 through the amplifier 2018 in the transmission period of the first half of the selected period. In this case, the process control 2010 controls the gain of the amplifier 2018, and the signal is a burst signal corresponding to the transmission period.

The electronic pen 1 receives the burst signal through the resonant circuit 103 and returns the burst signal to the sensor 22 of the position detection apparatus 20 of the tablet device 2. If the position instructed by the electronic pen 1 is the selected one loop coil of the X-axis direction loop coil group 221, the process control circuit 2010 detects the burst signal returned from the electronic pen 1 through the selection circuit 223 and through the components from the reception amplifier 2013 to the A/D conversion circuit 2017 in the second half of the selected period. If the position instructed by the electronic pen 1 is not the selected one loop coil of the X-axis direction loop coil group 221, the returned burst signal is not received by the loop coil, and the process control circuit 2010 does not detect the burst signal. The process control circuit 2010 then obtains an X-coordinate value of the position instructed by the electronic pen 1 by detecting the position of the loop coil of the X-axis direction loop coil group 221 in which the returned burst signal is detected.

Next, the process control circuit 2010 drives the drive circuit 2012 to transmit a signal from the excitation coil 224 to the electronic pen 1 for a predetermined time. Next, the process control circuit 2010 causes the selection circuit 223 to sequentially select one loop coil of the Y-axis direction loop coil group 222 and performs a process similar to the process for the loop coil of the X-axis direction loop coil group 221 to thereby obtain a Y-coordinate value of the position instructed by the electronic pen 1.

In this way, when the process control circuit 2010 detects the instruction position of the electronic pen 1, the process control circuit 2010 continuously performs transmission from the excitation coil 224 for more than a certain time and continuously performs transmission and reception for the number of times according to the number of bits of the digital signal of the additional information at timing similar to the timing in the detection of coordinates in order to detect the pen pressure information and the tag information as additional information from the electronic pen 1. In this case, the selection circuit 223 selects the loop coil (can be either X-axis direction loop coil or Y-axis direction loop coil) closest from the electronic pen 1 according to the detected coordinate values.

On the other hand, the IC 100 of the electronic pen 1 uses the digital signal of the additional information including the pen pressure information obtained according to the capacitance Cv of the variable capacitor included in the pen pressure detection means and including the received tag information to thereby control ON and OFF of the switch 104 in synchronization with the transmission and the reception of the signal from the position detection apparatus 20 of the tablet device 2. When the switch 104 is OFF, the resonant circuit 103 can return the signal transmitted from the position detection apparatus 20 to the position detection apparatus 20, and the loop coil of the position detection apparatus 20 receives the signal. On the other hand, when the switch 104 is ON, the resonant circuit 103 is prohibited from performing the resonant action. Therefore, the signal is not returned from the resonant circuit 103 to the position detection apparat 20, and the loop coil of the position detection apparatus 20 does not receive the signal.

The process control circuit 2010 of the coordinate data formation circuit 201 of the position detection apparatus 20 can verify whether there is a reception signal for the number of times equivalent to the number of bits of the digital signal of the additional information to thereby receive the digital signal of a plurality of bits according to the pen pressure information and the tag information to detect the pen pressure information and the tag information from the electronic pen 1. Therefore, the electronic pen 1 transmits the pen pressure information and the tag information as a signal subjected to amplitude shift keying (ASK) modulation to the position detection apparatus 20 of the tablet device 2.

<Configuration Example of Server Apparatus 5>

Figure 10:
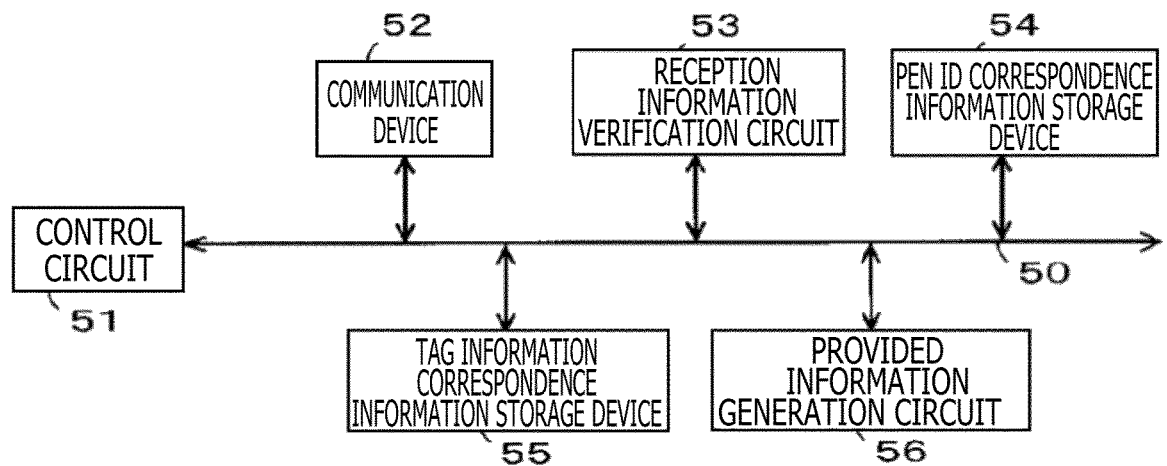
FIG. 10 is a diagram for describing an example of a hardware configuration of the server apparatus as part of the information processing system in the example of FIG. 1.

FIG. 10 is a block diagram illustrating an example of a hardware configuration of the server apparatus 5 according to the first embodiment. As illustrated in FIG. 10, the server apparatus 5 includes a communication device 52, a reception information verification circuit 53, a pen ID correspondence information storage device 54, a tag information correspondence information storage device 55, and a provided information generation circuit 56 that are connected to a control circuit 51 including a computer through a system bus 50.

The communication device 52 is for connection to the PC 3 or the like through the communication network 4, and the communication device 52 may be a wireless communication device or may be a wired communication device.

The reception information verification circuit 53 analyzes an information providing request received by the communication device 52 to verify whether the pen ID or the tag information is included and supplies the verification result to the provided information generation circuit 56.

The pen ID correspondence information storage device 54 is a storage device that stores the pen correspondence information illustrated in FIG. 4. The tag information correspondence information storage device 55 is also a storage device that stores the tag information correspondence information illustrated in FIG. 5.

The provided information generation circuit 56 uses the pen ID received from the reception information verification circuit 53 as reference information to acquire, from the pen ID correspondence information storage device 54, the information of the doctor's name stored according to the pen ID and generates provided information including the information of the doctor's name. The provided information generation circuit 56 also uses the tag information received from the reception information verification circuit 53 as reference information to acquire, from the tag information correspondence information storage device 55, various pieces of information of FIG. 5 stored according to the tag information and generates provided information including the various pieces of information. The provided information generation circuit 56 then returns, through the communication device 52, the generated provided information to the partner (PC 3) that has requested for the information through the communication network 4.

Note that in the block configuration of FIG. 10, the control circuit 51 may also be configured to perform the functions of the reception information verification circuit 53 and the provided information generation circuit 56 as software functions.

[Example of Processing Action of Each Component in Information Processing System of First Embodiment]

<Example of Processing Action of Electronic Pen 1>

Figure 11:
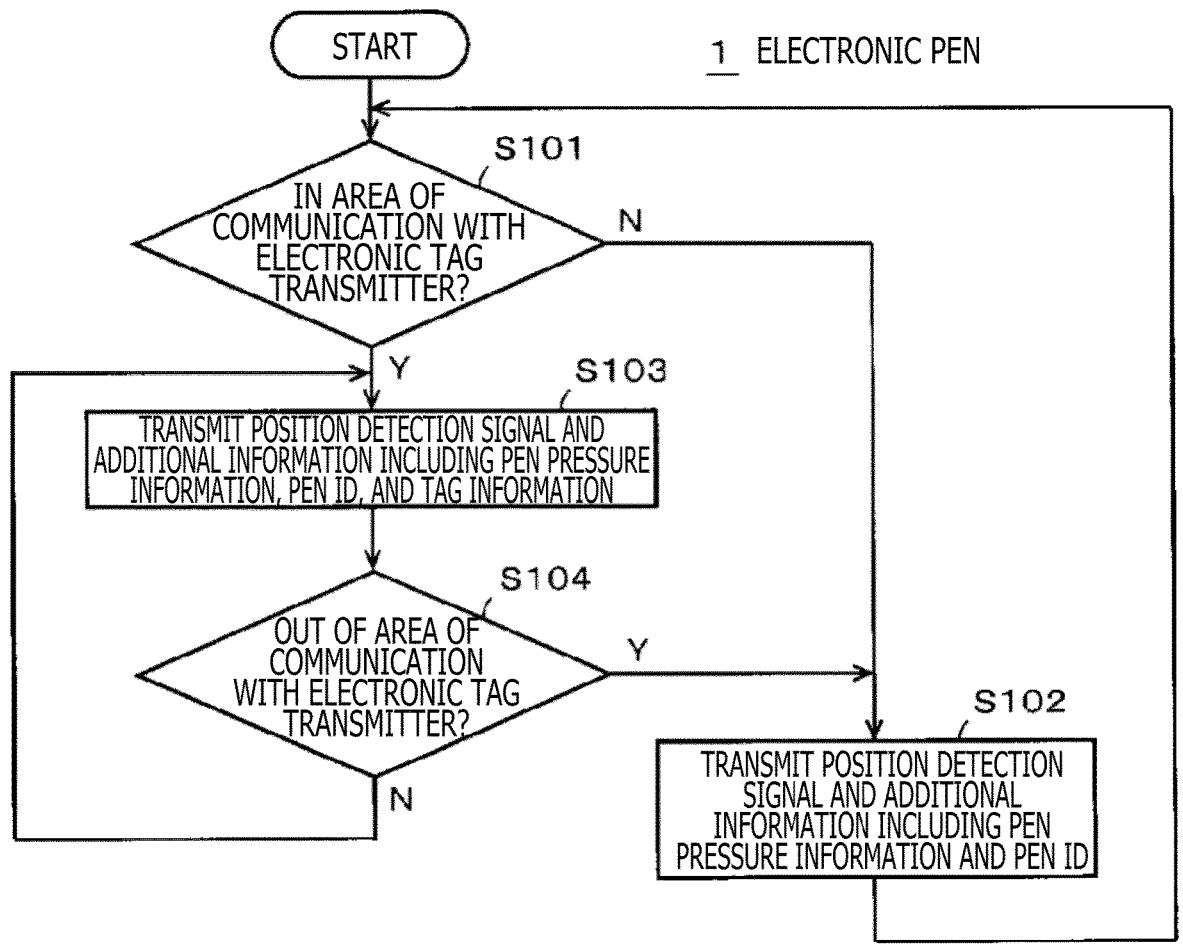
FIG. 11 is a diagram illustrating a flow chart for describing an example of a processing action of the first embodiment of the electronic pen according to the present disclosure.

FIG. 11 is a diagram illustrating a flow chart for describing an example of a processing action of the electronic pen 1 of the first embodiment.

That is, the wireless communication device 109 of the electronic pen 1 monitors at all times whether or not the electronic pen 1 has entered the area of communication with the electronic tag transmitter 6 and supplies the monitoring results to the IC 100. In the electronic pen 1, the IC 100 verifies whether or not the electronic pen 1 has entered the area of communication with the electronic tag transmitter 6 based on the monitoring results from the wireless communication device 109 (S101).

If the electronic pen 1 verifies that the electronic pen 1 has not entered the area of communication with the electronic tag transmitter 6 at S101, the electronic pen 1 controls the resonant circuit 103 as described above to return the position detection signal based on the transmission signal from the tablet device 2 and to transmit the additional information including the pen pressure information and the pen ID to the tablet device 2 (S102). The electronic pen 1 then returns to S101 and repeats the process from S101.

If the electronic pen 1 verifies that the electronic pen 1 has entered the area of communication with the electronic tag transmitter 6 at S101, the electronic pen 1 controls the resonant circuit 103 as described above to return the position detection signal based on the transmission signal from the tablet device 2 and to transmit the additional information including the pen pressure information, the pen ID, and the tag information to the tablet device 2 (S103).

After S103, the IC 100 of the electronic pen 1 verifies whether or not the electronic pen 1 is out of the area of communication with the electronic tag transmitter 6 based on the monitoring results from the wireless communication device 109 (S104). If the electronic pen 1 verifies that the electronic pen 1 is not out of the area of communication with the electronic tag transmitter 6 at S104, the electronic pen 1 returns the process to S103 and repeats the process from S103.

If the electronic pen 1 verifies that the electronic pen 1 is out of the area of communication with the electronic tag transmitter 6 at S104, the electronic pen 1 shifts the process to S102 and repeats the process from S102.

<Example of Processing Action of Tablet Device 2>

Figure 12:
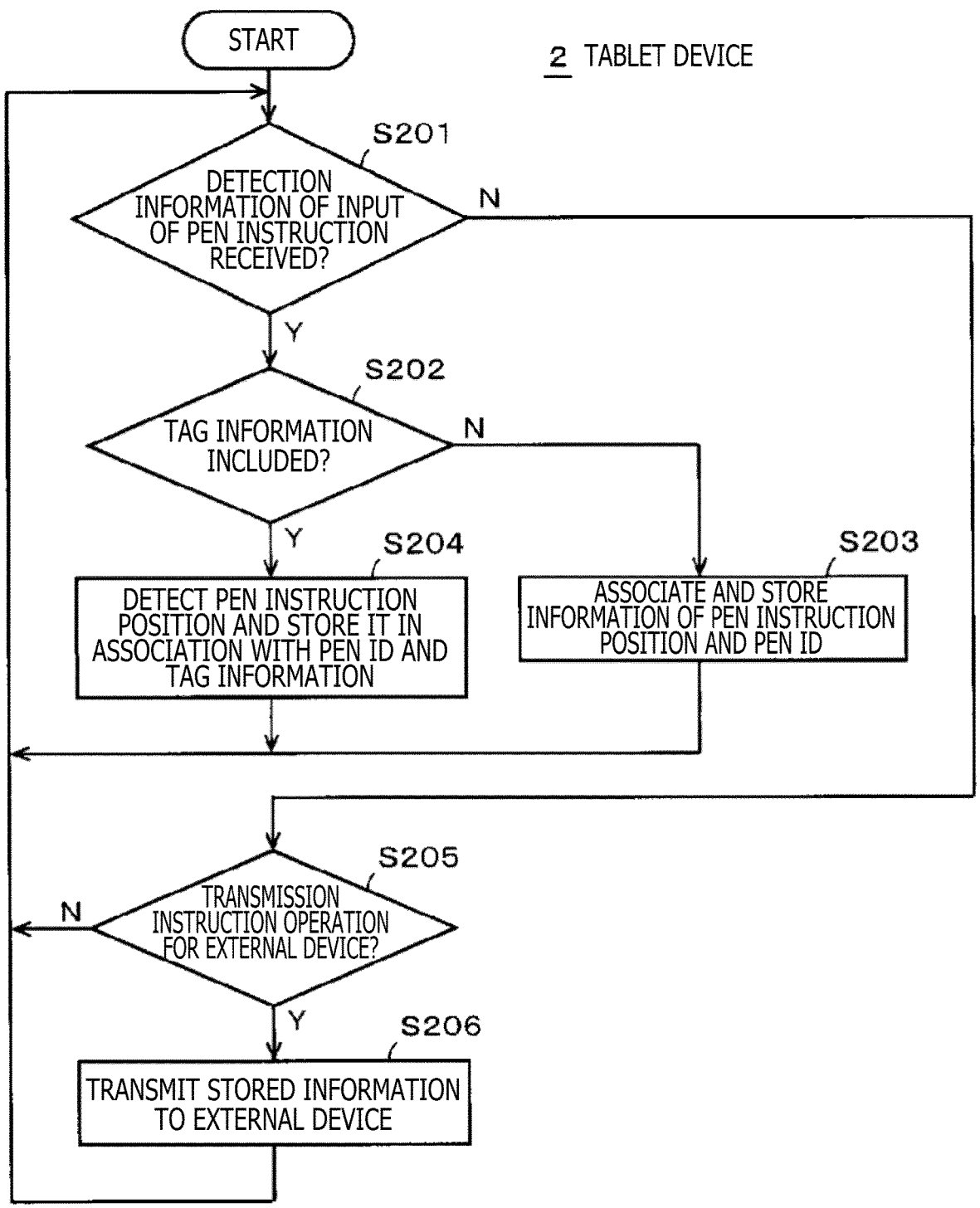
FIG. 12 is a diagram illustrating a flow chart for describing an example of a processing action of the first embodiment of the position detection apparatus according to the present disclosure.

FIG. 12 is a diagram illustrating a flow chart for describing an example of a processing action of the tablet device 2 of the first embodiment. The example of processing action of FIG. 12 illustrates an example of a flow of the processing action of the controller 202 of the position detection apparatus 20 of the tablet device 2.

That is, the controller 202 verifies whether or not detection information of input of pen instruction using the electronic pen 1 is received from the process control circuit 2010 of the coordinate data formation circuit 201 (S201).

If the controller 202 verifies that the information is received from the process control circuit 2010 at S201, the controller 202 verifies whether or not the received information includes the tag information (S202). If the controller 202 verifies that the received information does not include the tag information at S202, the controller 202 associates and stores the information of the position instructed by the electronic pen 1 included in the received information and the information of the pen ID in the storage device 2021 (S203). In this case, the information of year, month, day, hour, minute, and second at the time of the storage in the storage device 2021 is also associated and stored. After S203, the controller 202 returns the process to S201 and repeats the process from S201.

If the controller 202 verifies that the received information includes the tag information at S202, the controller 202 associates and stores the information of the position instructed by the electronic pen 1, the information of the pen ID, and the tag information included in the received information in the storage device 2021 (S204). In this case, the information of year, month, day, hour, minute, and second at the time of the storage in the storage device 2021 is also associated and stored. After S204, the controller 202 returns the process to S201 and repeats the process from S201.

If the controller 202 verifies that the information is not received from the process control circuit 2010 at S201, the controller 202 verifies whether or not an information transmission instruction operation for an external device, such as the PC 3, is received through the user I/F 203 (S205). If the controller 202 verifies that the information transmission instruction operation for the external device is not received at S205, the controller 202 returns the process to S201 and waits for the reception of information from the process control circuit 2010.

If the controller 202 verifies that the information transmission instruction operation for the external device is received at S205, the controller 202 transmits the information stored in the storage device 2021 to the external device (S206). Note that when the external device includes a display in this case, a list of information stored in the storage device 2021 is displayed on the display of the external device, and the information to be transmitted to the external device can be selected from the list.

After S206, the controller 202 returns the process to S201 and repeats the process from S201.

<Example of Processing Action of PC 3>

Figure 13:
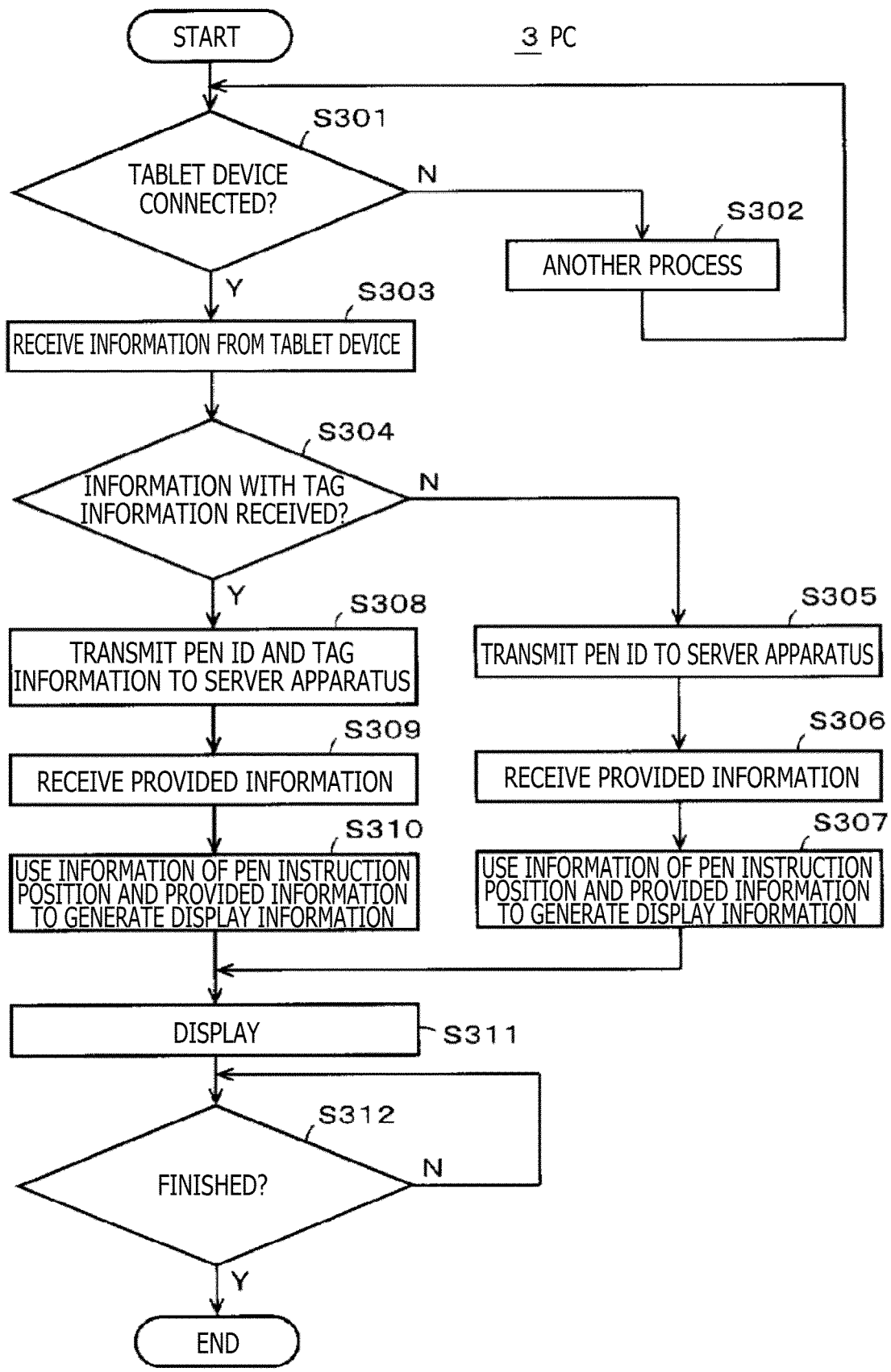
FIG. 13 is a diagram illustrating a flow chart for describing an example of a processing action of parts of the first embodiment of the information processing apparatus according to the present disclosure.

FIG. 13 is a diagram illustrating a flow chart for describing an example of a processing action of the PC 3 of the first embodiment. Note that an app started when the PC 3 is connected to the tablet device 2 is downloaded in advance from, for example, the server apparatus 5 and installed on the PC 3.

The PC 3 verifies whether or not the tablet device 2 is connected (in this example, wireless connection) (S301). If the PC 3 verifies that the tablet device 2 is not connected, the PC 3 performs another process (S302). After the execution, the PC 3 returns to S301 and monitors for the connection of the tablet device 2.

If the PC 3 verifies that the tablet device 2 is connected at S301, the PC 3 starts the app to receive information sent from the tablet device 2 (S303) and verifies whether or not the received information includes the tag information (S304).

If the PC 3 verifies that the received information does not include the tag information at S304, the PC 3 transmits the pen ID included in the received information to the server apparatus 5 (S305). Consequently, the information of the doctor's name stored in association with the pen ID is transmitted as provided information from the server apparatus 5 in this example, and the PC 3 receives the provided information from the server apparatus 5 (S306).

The PC 3 then uses the received provided information and the information of the position instructed by the electronic pen 1 to generate display information (S307) and displays the generated display information on the display screen of the display of the PC 3 (S311). In this case, for example, the character information written by the doctor is displayed in association with the doctor's name based on the information of the position instructed by the electronic pen. After S311, the PC 3 waits for an end instruction (S312) and ends the processing routine.

If the PC 3 verifies that the received information includes the tag information at S304, the PC 3 transmits the pen ID and the tag information included in the received information to the server apparatus 5 (S308). Consequently, in this example, the predetermined information as illustrated in FIG. 5 stored in association with the tag information that is information stored in association with the pen ID is sent as provided information from the server apparatus 5 along with the information of the doctor's name, and the PC 3 receives the provided information from the server apparatus 5 (S309).

The PC 3 then uses the received provided information and the information of the position instructed by the electronic pen 1 to generate display information (S310) and displays the generated display information on the display screen of the display of the PC 3 (S311). In this case, for example, the display image as illustrated in FIG. 6 is displayed on the display screen of the PC 3. After S311, the PC 3 waits for an end instruction (S312) and ends the processing routine.

<Example of Processing Action of Server Apparatus 5>

Figure 14:
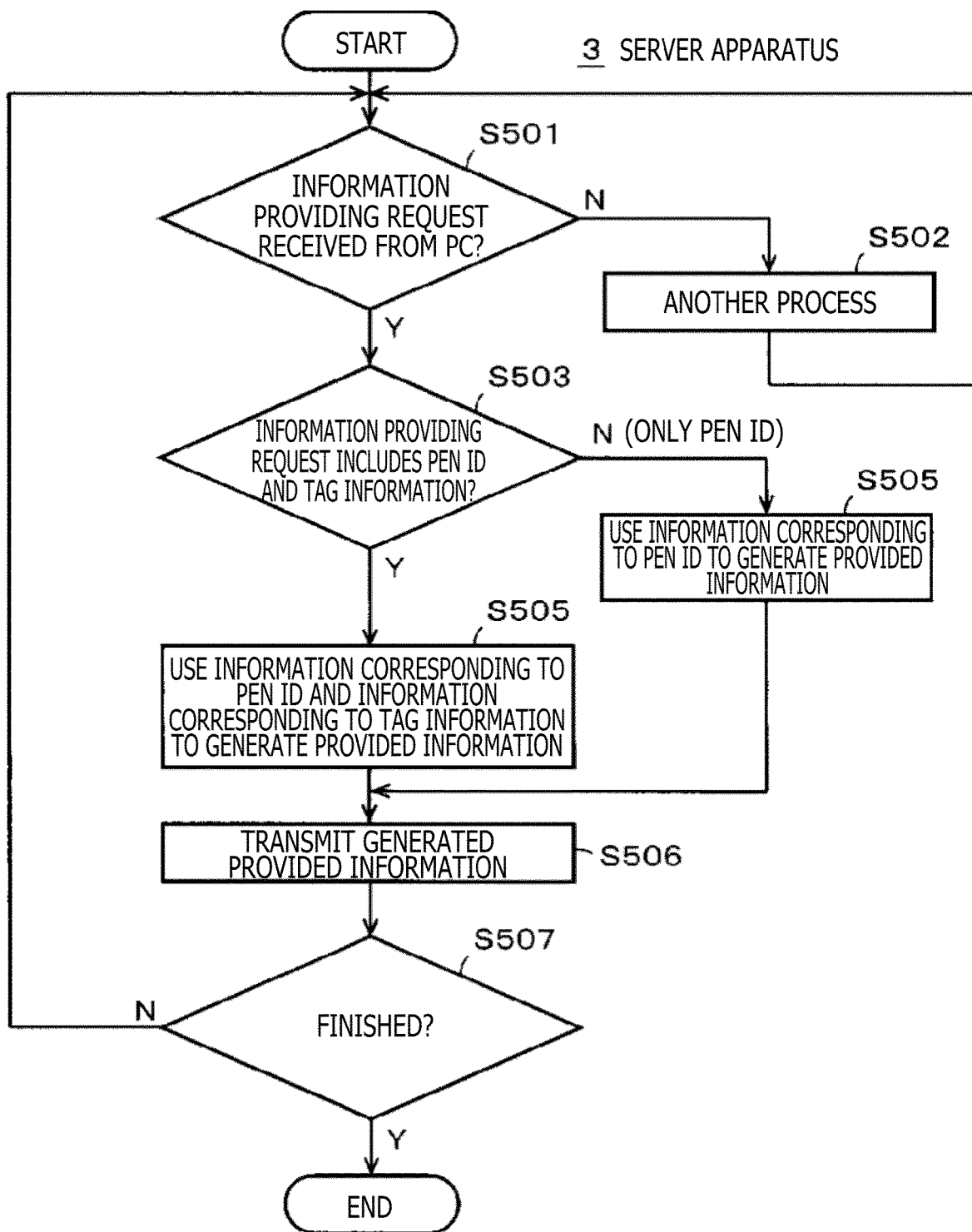
FIG. 14 is a diagram illustrating a flow chart for describing an example of a processing action of the server apparatus as part of the information processing system in the example of FIG. 1.

FIG. 14 is a diagram illustrating a flow chart for describing an example of a processing action of the server apparatus 5 in the information processing system of the first embodiment. Note that in the process described in FIG. 14, the control circuit 51 of the server apparatus 5 performs the functions of the reception information verification circuit 53 and the provided information generation circuit 56 as software functions in the block configuration of FIG. 10.

The control circuit 51 of the server apparatus 5 verifies whether or not an information providing request is received from the PC 3 (S501). If the control circuit 51 verifies that the information providing request is not received, the control circuit 51 performs another process (S502). After the execution, the control circuit 51 returns to S501 and monitors for the reception of an information providing request from the PC.

If the control circuit 51 verifies that the information providing request is received from the PC 3 at S501, the control circuit 51 verifies whether or not the received information providing request includes both the pen ID and the tag information (S503). If the control circuit 51 verifies that the information providing request includes only the pen ID at S503, the control circuit 51 refers to the pen ID correspondence information storage device 54 based on the pen ID to read the information corresponding to the pen ID, that is, the information of the doctor's name in this example (see FIG. 4), and generates provided information (S504).

If the control circuit 51 verifies that the information providing request includes both the pen ID and the tag information at S501, the control circuit 51 refers to the pen ID correspondence information storage device 54 based on the pen ID to read the information corresponding to the pen ID, that is, the information of the doctor's name in this example, and refers to the tag information correspondence information storage device 55 based on the tag information to read the information corresponding to the tag information (see FIG. 5) to generate provided information (S505).

After S504 or S505, the control circuit 51 proceeds to S506 and transmits the provided information generated at S504 or S505 to the PC 3 that has requested for the information (S506). The control circuit 51 then verifies whether or not an end request is received from the PC 3 (S507). If the control circuit 51 verifies that the end request is not received, the control circuit 51 returns the process to S501 and repeats the process from S501. If the control circuit 51 verifies that the end request is received from the PC 3 at S507, the control circuit 51 ends the processing routine.

[Modification of First Embodiment]

Note that although the electronic pen 1 is distributed only to the doctor in the example, an electronic pen for a patient may be distributed to each hospital room. In that case, if the electronic pen for a patient is associated with each patient, and the pen ID is registered in the server apparatus, the entry information for the field of a patient's impressions and opinions and the entry information for the field of a doctor's observations can be verified by the pen ID.

In addition, when the document format of the recording paper 14 includes a field for nurse's reports and opinions, the electronic pen can be distributed to the nurse, and the pen ID of the distributed electronic pen can be registered in the server apparatus 5 in association with the name of the nurse. In this way, the entry information in the entry field for the nurse in the document format of the recording paper 14 can be associated with the name of the nurse entering the information.

However, the entry field for a doctor, the entry field for a patient, and the entry field for nurse in the document format of the recording paper 14 can be specified and registered as region ranges based on coordinate information on the sensor of the tablet device 2 as in the example. The entered writing information and the entry field can be associated even when the person entering the data does not possess a special electronic pen, and this is significantly convenient.

Note that the pen ID is not essential in the disclosure of the first embodiment, and it is only necessary that only the tag information be transmitted along with the position detection signal from the electronic pen 1. Therefore, instead of the doctor carrying the electronic pen 1 and the tablet device 2 to perform the doctor's visit, both the electronic pen 1 and the tablet device 2 may be provided in the hospital room of each patient. One of the electronic pen 1 and the tablet device 2 may be provided in the hospital room of each patient, and the doctor may carry the other of the electronic pen 1 and the tablet device 2 to perform the doctor's visit.

When the electronic pen 1 is provided in the hospital room of each patient, the name of the hospital room (hospital room number), the patient's name, or the name of the doctor in charge may be registered in the server apparatus 5 according to the pen ID of the electronic pen 1. In addition, when the tablet device 2 is provided in the hospital room of each patient, the name of the hospital room (hospital room number), the patient's name, or the name of the doctor in charge may be registered in the server apparatus 5 according to the ID of the tablet device 2. Furthermore, when both the electronic pen 1 and the tablet device 2 are provided in the hospital room of each patient, the patient's name may be registered in the server apparatus 5 for the electronic pen 1, and the name of the hospital room (hospital room number) or the name of the doctor in charge may be registered in the server apparatus 5 for the tablet device 2, for example.

Note that although the tag information correspondence information stored in the server apparatus 5 is information used for generating display information in displaying the information of the position instructed by the electronic pen 1 in the example of the embodiment, the tag information correspondence information stored in the server apparatus 5 is not limited to this example, and various pieces of information according to the T, P, and O can be stored.

For example, the information used for generating the display information based on the information of the position instructed by the electronic pen 1 may not be the tag information correspondence information, and for example, information for controlling the display by changing the display color or controlling the display mode may be the tag information correspondence information. For example, in a laboratory of a school, control information stored as information corresponding to the tag information of the electronic tag transmitter can be control information of a display mode in which the trajectory (handwriting) including the information of the instruction position of the electronic pen is handwriting in small characters using a hard pen. In an art room, control information stored as information corresponding to the tag information of the electronic tag transmitter can be control information of a display mode in which the trajectory (handwriting) including the information of the instruction position of the electronic pen is handwriting using a rather thick pen for painting. In addition, the information corresponding to the tag information may be stored to simply change the display color of the handwriting using the electronic pen 1 according to the installation place of the electronic tag transmitter.

Note that although the electronic tag transmitter is installed in each hospital room in the example, the electronic tag transmitter may be provided on, for example, an arm band or a leg band that can be worn by the patient, and the patient may be asked to wear it.

Second Embodiment

Although the electronic pen 1 receives the tag information from the electronic tag transmitter 6 in the first embodiment, the tablet device 2 can be configured to receive the tag information and configured as in the following description to realize effects similar to the effects of the first embodiment. The second embodiment illustrates a case in which the tablet device receives the tag information from the electronic tag transmitter 6.

Figure 15:
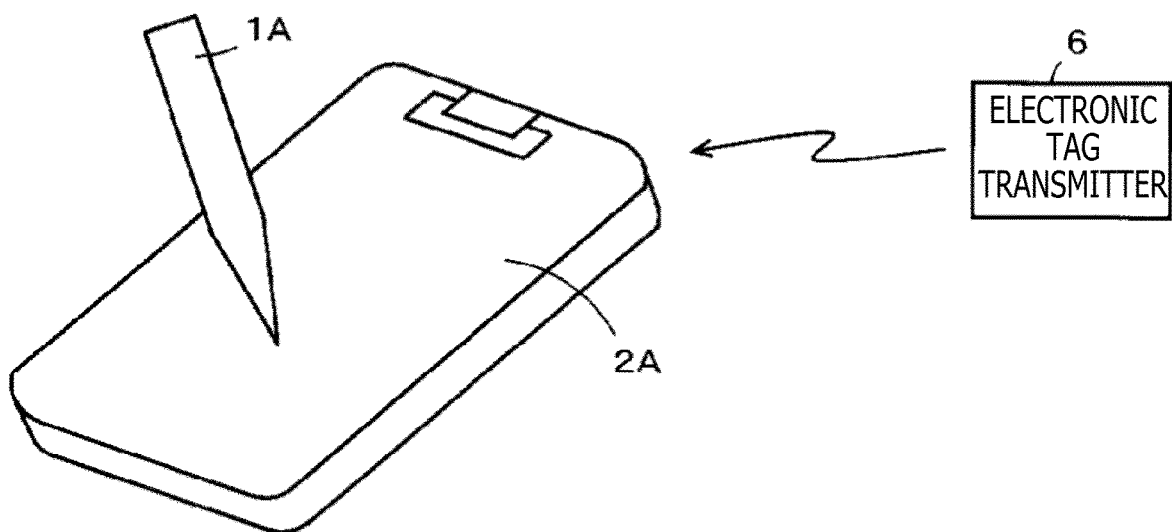
FIG. 15 is a diagram for describing a second embodiment of the electronic pen and the position detection apparatus according to the present disclosure.
Figure 16:
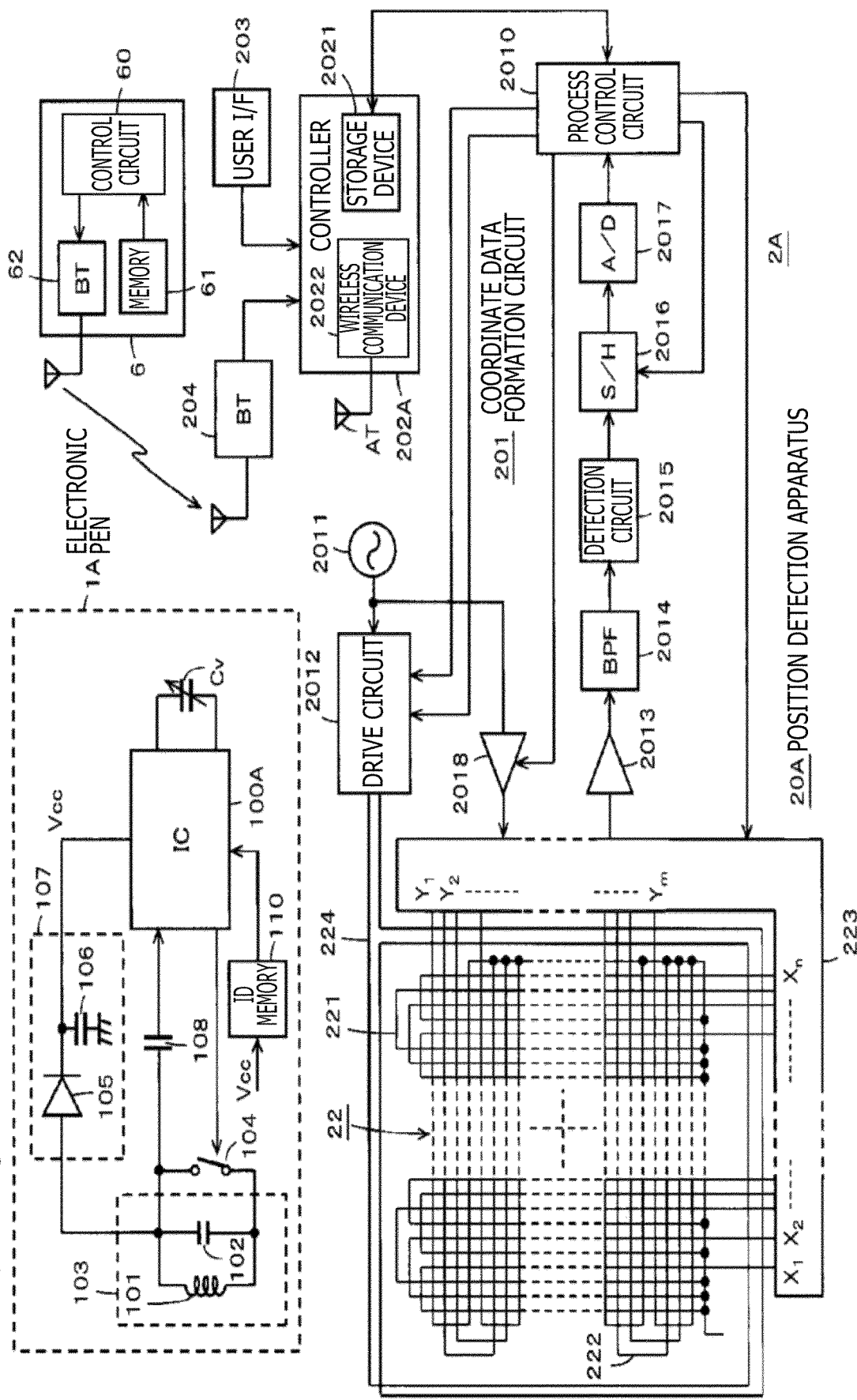
FIG. 16 is a diagram for describing an example of an electronic circuit configuration of the second embodiment of the electronic pen and the position detection apparatus according to the present disclosure.

FIG. 15 is a diagram illustrating a relationship between the electric pen 1A, a tablet device 2A, and the electronic tag transmitter 6 that are parts of the second embodiment. In addition, FIG. 16 is a diagram illustrating an example of an electronic circuit configuration of the electronic pen 1A, the tablet device 2A, and the electronic tag transmitter 6, and FIG. 16 corresponds to FIG. 9 of the first embodiment. In FIGS. 15 and 16, the same reference signs are provided to the same constituent parts as those of the first embodiment.

That is, the configuration of the electronic tag transmitter 6 in the second embodiment is similar to the configuration of the first embodiment as illustrated in FIG. 16. In the electronic pen 1A of the second embodiment, the wireless communication device 109 compliant with a Bluetooth (registered trademark) standard for receiving the tag information from the electronic tag transmitter 6 is not included in the electronic pen 1 of the first embodiment as illustrated in FIG. 16. An IC 100A of the electronic pen 1A of the second embodiment is different from the first embodiment in that the additional information includes the pen pressure information and the pen ID and does not include the tag information.

In addition, the tablet device 2A of the second embodiment includes a wireless communication device 204 compliant with a Bluetooth (registered trademark) standard for receiving the tag information from the electronic tag transmitter 6 as illustrated in FIG. 16, and the tag information received by the wireless communication device 204 is supplied to a controller 202A. The controller 202A stores the information of the position instructed by the electronic pen 1A and the pen ID in the storage device 2021 in association with the tag information received by the wireless communication device 204. The other configurations are similar to those of the first embodiment.

Figure 17:
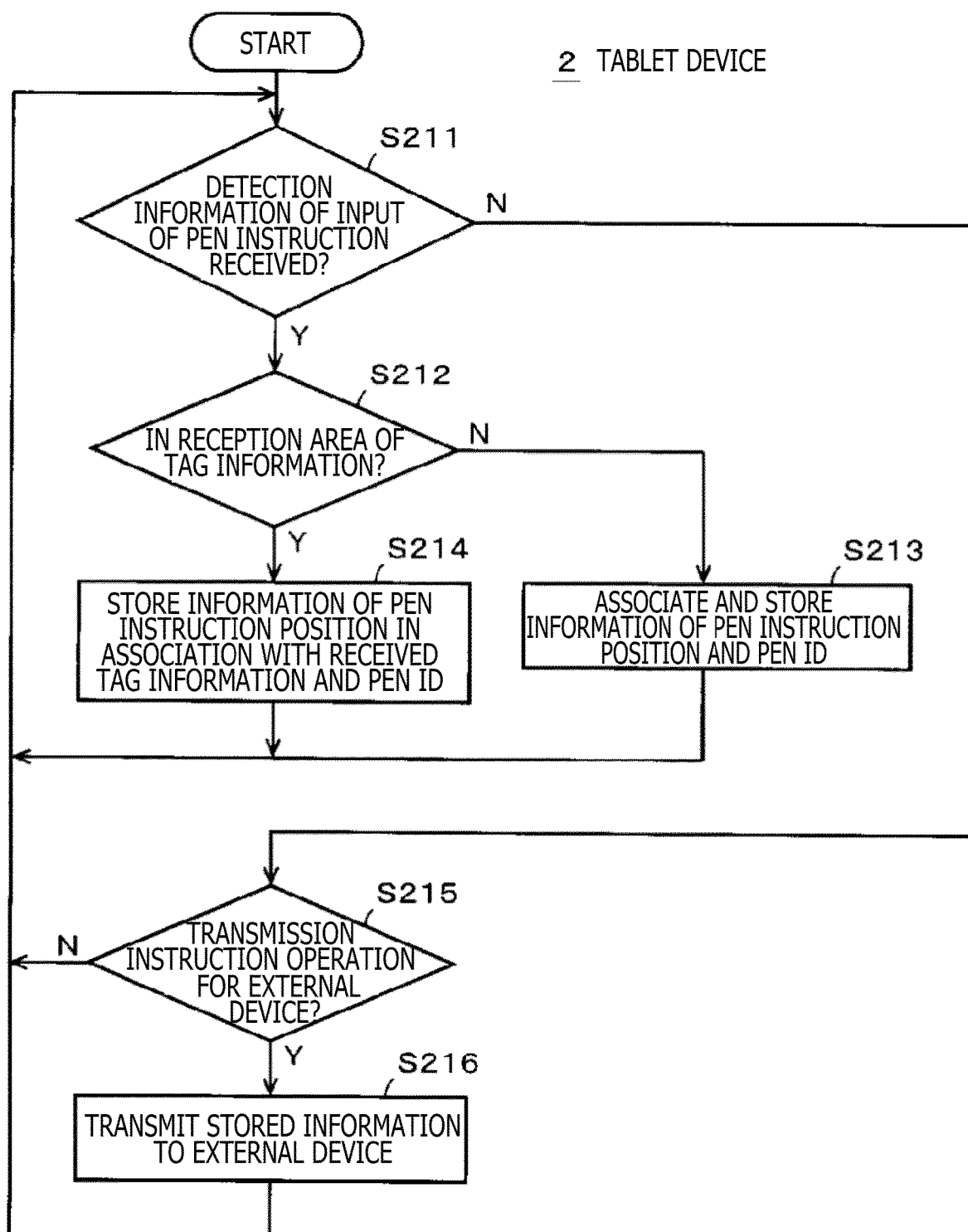
FIG. 17 is a diagram illustrating a flow chart for describing an example of a processing action of the second embodiment of the position detection apparatus according to the present disclosure.

FIG. 17 illustrates a flow chart of an example of a processing action of the tablet device 2A of the second embodiment. The example of processing action of FIG. 17 illustrates an example of a flow of the processing action of the controller 202A in a position detection apparatus 20A of the tablet device 2A.

That is, the controller 202A verifies whether or not detection information of an input of pen instruction using the electronic pen 1 is received from the process control circuit 2010 of the coordinate data formation circuit 201 (S211).

If the controller 202A verifies that the information is received from the process control circuit 2010 at S211, the controller 202A verifies whether or not the tablet device 2A is in the area of communication with the electronic tag transmitter 6 based on the monitoring result of whether or not the tablet device 2A has entered the area of communication with the electronic tag transmitter 6 from the wireless communication device 204 (S212).

If the controller 202A verifies that the tablet device 2A is not in the area of communication with the electronic tag transmitter 6 at S212, the controller 202A associates and stores the information of the position instructed by the electronic pen 1A included in the information verified to have been received at S211 and the information of the pen ID in the storage device 2021 (S213). In this case, the information of year, month, day, hour, minute, and second at the time of the storage in the storage device 2021 is also associated and stored. After S213, the controller 202A returns the process to S211 and repeats the process from S211.

If the controller 202A verifies that the tablet device 2A is in the area of communication with the electronic tag transmitter 6 at S212, the controller 202A associates and stores the tag information received by the wireless communication device 204 from the electronic tag transmitter 6, the information of the position instructed by the electronic pen 1, and the information of the pen ID in the storage device 2021 (S214). In this case, the information of year, month, day, hour, minute, and second at the time of the storage in the storage device 2021 is also associated and stored. After S214, the controller 202A returns the process to S211 and repeats the process from S211.

If the controller 202A verifies that the detection information of the pen instruction input is not received from the process control circuit 2010 at S211, the controller 202A verifies whether or not an information transmission instruction operation for an external device, such as the PC 3, is received through the user I/F 203 (S215). If the controller 202A verifies that the information transmission instruction operation for the external device is not received at S215, the controller 202A returns the process to S211 and waits for the reception of information from the process control circuit 2010.

If the controller 202A verifies that the information transmission instruction operation for the external device is received at S215, the controller 202A transmits the information stored in the storage device 2021 to the external device (S216). Note that when the external device includes a display in this case, a list of information stored in the storage device 2021 is displayed on the display of the external device, and information to be transmitted to the external device can be selected from the list.

After S216, the controller 202A returns the process to S211 and repeats the process from S211.

In this way, the tag information, the pen ID, and the information of the position instructed by the electronic pen 1A are associated and stored in the storage device 2021 of the controller 202A in the tablet device 2A of the second embodiment as in the first embodiment. Therefore, the processing action similar to the processing action in the first embodiment is also performed in the second embodiment when the tablet device 2A is connected to the PC 3, and the processing result similar to the processing result in the first embodiment is displayed on the display screen of the display of the PC 3.

It is obvious that the modification described in the modification of the first embodiment can also be made in the second embodiment.

Third Embodiment

In the first and second embodiments, the wireless communication device that receives the tag information from the electronic tag transmitter is provided on one of the electronic pen and the tablet device that are part of the information processing apparatus.

However, the electronic pen and the tablet device can be configured to receive tag information including pieces of specific identification information different from each other, and a more complicated process than in the first and second embodiments can be performed for the information of the position instructed by the electronic pen. A third embodiment illustrates a case in which the electronic pen and the tablet device receive tag information from electronic tag transmitters different from each other.

Figure 18:
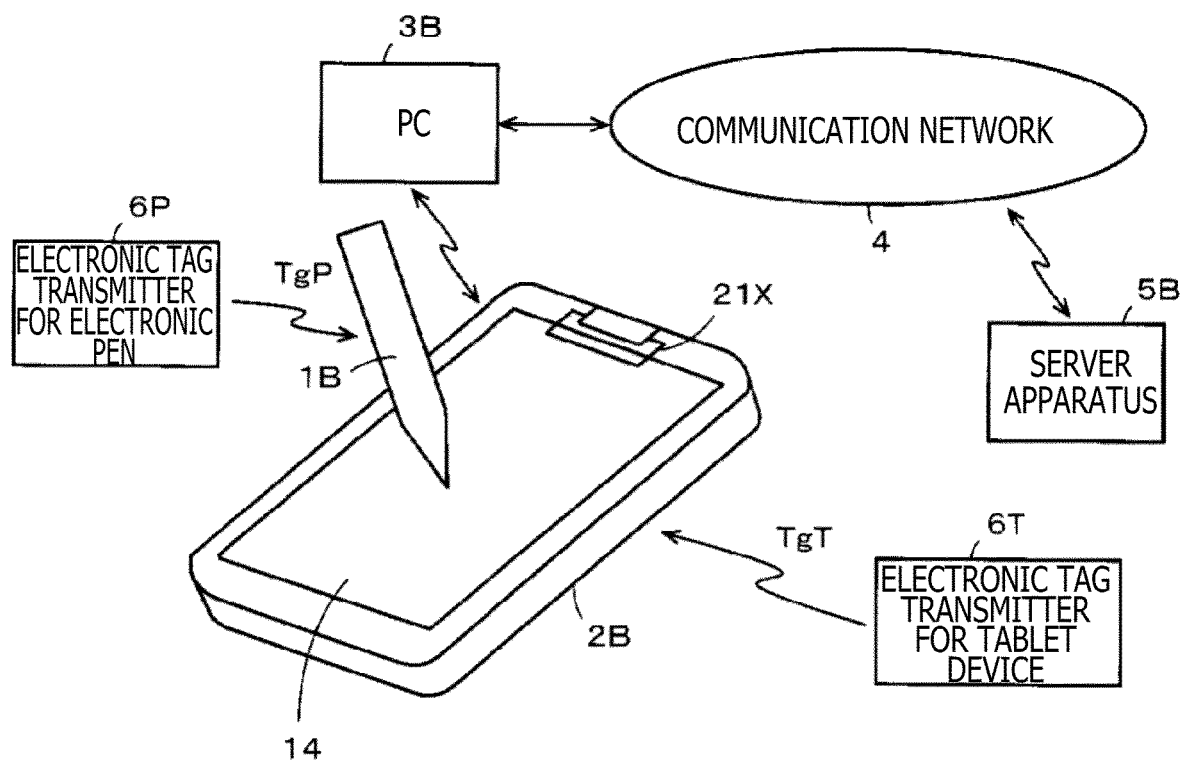
FIG. 18 is a diagram for describing a third embodiment of the electronic pen and the position detection apparatus according to the present disclosure.

FIG. 18 is a diagram illustrating an overview of a configuration example of the entire information processing system according to the third embodiment. The information processing system of the third embodiment includes: an electronic pen 1B; a tablet device 2B including a position detection apparatus that receives an instruction input by the electronic pen 1B; a personal computer (hereinafter, abbreviated as PC) 3B wirelessly connected to the tablet device 2B; a server apparatus 5B connected to the PC 3B through the communication network 4; an electronic tag transmitter 6P for an electronic pen; and an electronic tag transmitter 6T for a tablet device.

That is, the information processing system of the third embodiment is different from the information processing system of the first embodiment in that the electronic tag transmitters include the electronic tag transmitter 6P for an electronic pen and the electronic tag transmitter 6T for a tablet device. In addition, the tablet device 2B includes a wireless communication device that receives tag information TgT for a tablet device from the electronic tag transmitter 6T for a tablet device as in the tablet device of the second embodiment. The other configurations are similar to the configurations of the information processing system of the first embodiment.

The hardware configurations and the processing actions of the electronic pen 1B and the electronic tag transmitter 6P for an electronic pen are similar to those of the electronic pen 1 and the electronic tag transmitter 6 in the first embodiment (see FIGS. 9, 11, and 12). In addition, the hardware configuration and the processing action of the PC 3B are similar to those of the PC 3 in the first embodiment (see FIG. 13).

Furthermore, the hardware configuration of the server apparatus 5B is only different in that the storage content of the tag information correspondence information storage device 55 is predetermined information corresponding to tag information TgP for an electronic pen and the tag information TgT for a tablet device, and the other configurations are similar to those of the first embodiment.

In addition, the hardware of the tablet device 2B in the third embodiment is substantially similar to the hardware illustrated in FIG. 16. However, the storage processing action of the information of the position instructed by the electronic pen 1B performed by a controller 202B (not illustrated) of a position detection apparatus 20B of the tablet device 2B is different from that of the first and second embodiments.

Note that communication between the electronic pen 1A and the electronic tag transmitter 6P for an electronic pen and communication between the tablet device 2B and the electronic tag transmitter 6T for a tablet device are independent from each other, and crosstalk and interference are prevented. For example, a passkey in wireless communication compliant with a Bluetooth (registered trademark) standard used between the electronic pen 1A and the electronic tag transmitter 6P for an electronic pen and a passkey used between the tablet device 2B and the electronic tag transmitter 6T for a tablet device are different, and crosstalk and interference of the communication are prevented.

Figure 19:
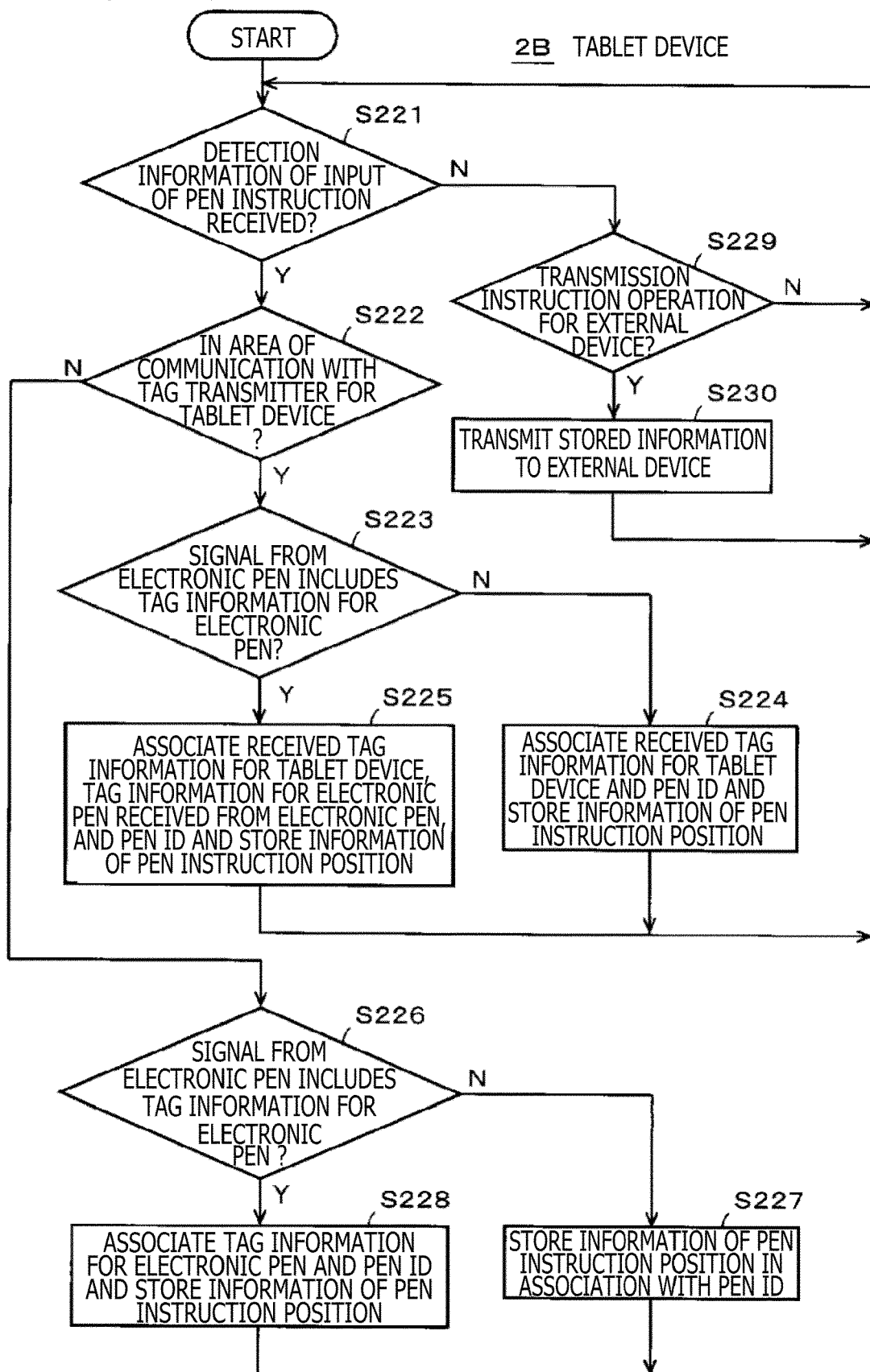
FIG. 19 is a diagram illustrating a flow chart for describing an example of a processing action of the third embodiment of the position detection apparatus according to the present disclosure.

FIG. 19 illustrates a flow chart of an example of a storage processing action of the information of the position instructed by the electronic pen 1B performed by the tablet device 2B in the third embodiment. The example of processing action of FIG. 19 illustrates an example of a flow of processing action of the controller 202B in the position detection apparatus 20B of the tablet device 2B.

That is, the controller 202B verifies whether or not detection information of input of pen instruction using the electronic pen 1B is received from the process control circuit 2010 of the coordinate data formation 201 (S221).

If the controller 202B verifies that the information is received from the process control circuit 2010 at S221, the controller 202B verifies whether or not the tablet device 2B is in the area of communication with the electronic tag transmitter 6T for a tablet device based on the monitoring result of whether or not the tablet device 2B has entered the area of communication with the electronic tag transmitter 6T for a tablet device from the wireless communication device 204 (S222).

If the controller 202B verifies that the tablet device 2B is in the area of communication with the electronic tag transmitter 6T for a tablet device at S222, the controller 202B verifies whether or not the information verified to have been received at S221 includes the tag information TgP for an electronic pen (S223).

If the controller 202B verifies that the information does not include the tag information TgP for an electronic pen at S223, the controller 202B associates and stores the tag information TgT for a tablet device received from the electronic tag transmitter 6T for a tablet device, the information of the position instructed by the electronic pen 1B included in the information verified to have been received at S221, and the information of the pen ID in the storage device 2021 (S224). In this case, the information of year, month, day, hour, minute, and second at the time of the storage in the storage device 2021 is also associated and stored. After S224, the controller 202B returns the process to S221 and repeats the process from S221.

If the controller 202B verifies that the information includes the tag information TgP for an electronic pen at S223, the controller 202B associates and stores the tag information TgT for a tablet device received from the electronic tag transmitter 6T for a tablet device, the information of the position instructed by the electronic pen 1B included in the information verified to have been received at S221, the information of the pen ID, and the tag information TgP of the electronic pen in the storage device 2021 (S225). In this case, the information of year, month, day, hour, minute, and second at the time of the storage in the storage device 2021 is also associated and stored. After S225, the controller 202B returns the process to S221 and repeats the process from S221.

If the controller 202B verifies that the tablet device 2B is not in the area of communication with the electronic tag transmitter 6T for a tablet device at S222, the controller 202B verifies whether or not the information verified to have been received at S221 includes the tag information TgP for an electronic pen (S226).

If the controller 202B verifies that the information does not include the tag information TgP for an electronic pen at S226, the controller 202B associates and stores the information of the position instructed by the electronic pen 1 and the information of the ID in the storage device 2021 (S227). In this case, the information of year, month, day, hour, minute, and second at the time of the storage in the storage device 2021 is also associated and stored. After S227, the controller 202B returns the process to S221 and repeats the process from S221.

If the controller 202B verifies that the information includes the tag information TgP for an electronic pen at S226, the controller 202B associates and stores the tag information TgP for an electronic pen, the information of the position instructed by the electronic pen 1, and the information of the pen ID in the storage device 2021 (S228). In this case, the information of year, month, day, hour, minute, and second at the time of the storage in the storage device 2021 is also associated and stored. After S228, the controller 202B returns the process to S221 and repeats the process from S221.

If the controller 202B verifies that the detection information of the pen instruction input is not received from the process control circuit 2010 at S221, the controller 202B verifies whether or not an information transmission instruction operation for an external device, such as the PC 3, is received through the user I/F 203 (S229). If the controller 202B verifies that the information transmission instruction operation for the external device is not received at S229, the controller 202B returns the process to S221 and waits for the reception of information from the process control circuit 2010.

If the controller 202B verifies that the information transmission instruction operation for the external device is received at S229, the controller 202B transmits the information stored in the storage device 2021 to the external device (S230). Note that when the external device includes a display in this case, a list of information stored in the storage device 2021 is displayed on the display of the external device, and information to be transmitted to the external device can be selected from the list.

After S230, the controller 202B returns the process to S221 and repeats the process from S221.

In this way, the tag information TgT for the tablet device 2B is associated and stored in the storage device 2021 of the controller 202B in the tablet device 2B of the third embodiment in addition to the tag information TgP for the electronic pen 1, the pen ID, and the information of the position instructed by the electronic pen 1B. Therefore, according to the third embodiment, predetermined information according to the T, P, and O associated with the tag information TgT for the tablet device 2B can be acquired from, for example, the server apparatus 5 in addition to the predetermined information according to (corresponding to) the T, P, and O associated with the tag information TgP for the electronic pen 1B.

Therefore, when the tablet device 2B is connected to the PC 3 in the information processing system of the third embodiment, a processing action according to complicated usage and situations can be performed as compared to the first and second embodiments.

Note that in the information processing system of the third embodiment, not only the pen ID of the electronic pen 1B, but also the ID of the tablet device 2B can be stored in association with the information of the position instructed by the electronic pen, and a processing action according to further complicated usage and situations can be performed.

Note that in the first to third embodiments, the thing corresponding to the tag information stored in the server apparatus is not limited to the predetermined information according to (associated with) the T, P, and O, but may also be an app.

Fourth Embodiment

In the embodiments described above, the information of the position instructed by the electronic pen is associated with the tag information, the pen ID of the electronic pen, and/or the ID of the tablet device and temporarily stored in the storage device of the tablet device. The tag information, the pen ID, and the ID of the tablet device in the stored information are sent to the server apparatus later, and the information of the position instructed by the electronic pen is processed.

On the other hand, the information of the position instructed by the electronic pen may not be stored in the storage device of the tablet device in association with the tag information, the pen ID of the electronic pen, and/or the ID of the tablet device. The information processing apparatus can be configured to use the information to cooperate with the server apparatus in real time to thereby perform a predetermined process.

Figure 20:
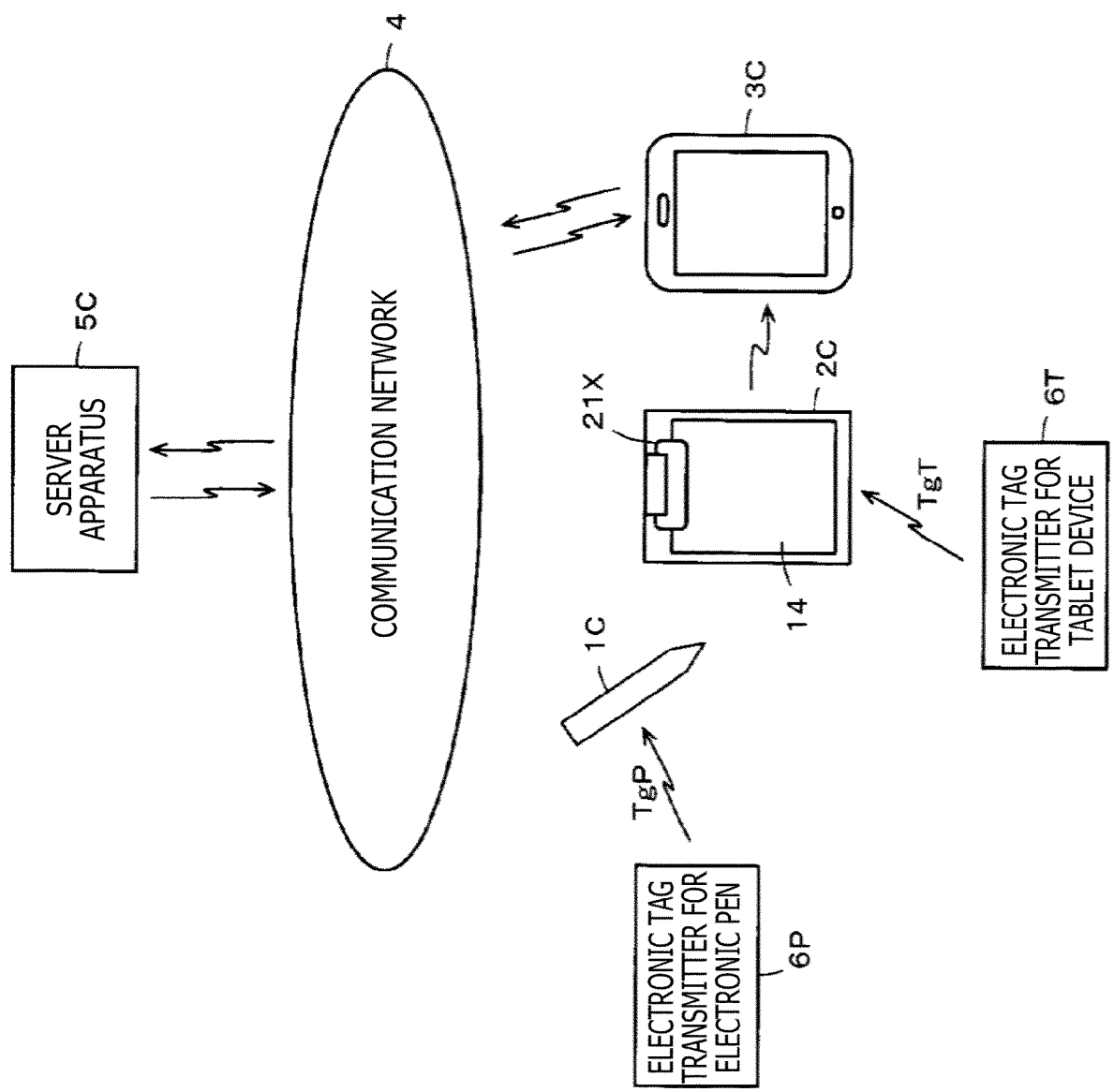
FIG. 20 is a diagram illustrating an overview of an example of an information processing system including a fourth embodiment of the electronic pen, the position detection apparatus, and the information processing apparatus according to the present disclosure.

FIG. 20 is a diagram illustrating a configuration example of the information processing system of a fourth embodiment, and the information processing system includes an electronic pen 1C, a tablet device 2C, a pad-type device 3C with a function of a PC, the communication network 4, a server apparatus 5C, the electronic tag transmitter 6P for an electronic pen, and the electronic tag transmitter 6T for a tablet device. The electronic pen 1C, the tablet device 2C, and the pad-type device 3C configure an information processing apparatus.

In the example of FIG. 20, the configurations of the electronic pen 1C and the electronic tag transmitter 6C for an electronic pen are similar to the configurations of the electronic pen 1 and the electronic tag transmitter 6 of the first embodiment. The configuration of the tablet device 2C is similar to the configuration of the tablet device 2A of the second embodiment except for the following differences.

The tablet device 2C of the fourth embodiment is wirelessly connected to the pad-type device 3C at all times. When the tablet device 2C receives the position detection signal, the pen ID, and the tag information TgP for an electronic pen from the electronic pen 1C, the tablet device 2C uses the position detection signal to detect the position instructed by the electronic pen 1C. The tablet device 2C transfers the information of the detected position instructed by the electronic pen 1C, the pen ID, and the tag information TgP for an electronic pen to the pad-type device 3 through a buffer memory or without the involvement of the buffer memory.

When the pad-type device 3C receives the information of the position instructed by the electronic pen 1, the pen ID, and the tag information TgP from the tablet device 2C, the pad-type device 3C accesses the server apparatus 5C and issues a request for providing information including the tag information TgT for a tablet device and the tag information TgP for an electronic pen through the communication network 4. In this example, the pad-type device 3C acquires a corresponding predetermined app and provided information (data) and uses the acquired app and provided information (data) to perform a process.

In the fourth embodiment, the server apparatus 5C stores apps and data necessary for processing in association with the tag information TgT for a tablet device and the tag information TgP for an electronic pen as described later. The server apparatus 5C provides a corresponding app and data necessary for processing according to the request for providing information including the tag information TgT for a tablet device and the tag information TgP for an electronic pen. The pad-type device 3C starts the app provided from the server apparatus 5 and executes the app while using the provided data as necessary.

Note that although the tablet device 2C and the pad-type device 3 are separately provided in the example of FIG. 20, the function of the tablet device 2C and the function of the pad-type device 3C may be installed on one mobile device.

A specific example of use of the information processing system of the fourth embodiment will be described.

First Example

In a first example described below, a factory building 8 includes a plurality of, for example, four, working process rooms 81, 82, 83, and 84 as illustrated in FIG. 21, and work records are created in each of the working process rooms 81, 82, 83, and 84. In the example of FIG. 21, the factory building 8 includes a production room 81, an inspection room 82, a shipment room 83, and a repair room 84.

In the present embodiment, the electronic pen 1C is used to input work records of each of the working process rooms 81, 82, 83, and 84 to the recording paper 14 locked at the predetermined position by the paper holder 21X of the tablet device 2C.

In this case, the items necessary for the work records in the working process rooms 81, 82, 83, and 84 are generally different from each other. For example, FIG. 22A illustrates an example of a work record document format for the production room 81, and FIG. 22B illustrates an example of a work record document format for the inspection room 82.

In this way, in the past, the work record document formats for the working process rooms are different, and, for example, the work records need to be written on the recording paper on which the work record document format for each working process room is printed. An optical character recognition (OCR) or the like needs to be used to read the written work records to digitize the written matters, and the operator needs to use the digitized matters to copy and input the entry data of each item to the PC. In addition, even when each item is written and input to the tablet device, and the written data is digitized, the operator needs to instruct and input one of the factory buildings, one of the rooms of working processes, and one of the items in order to input the electronic data of each item to the PC.

In the first example of the example of use in the fourth embodiment, an electronic tag transmitter for an electronic pen and an electronic tag transmitter for a tablet device are installed on each working process room as described below, and predetermined information as described below is registered in the server apparatus 5C according to the tag information TgP and TgT transmitted from the electronic tag transmitters. In this way, the electronic data of the content of the work records can be managed just by using the electronic pen 1C to input coordinates in the tablet device 2C in each working process room.

In this example, as illustrated in FIG. 21, an electronic tag transmitter 6T1 for a tablet device and an electronic tag transmitter 6P1 for an electronic pen are installed in the production room 81, an electronic tag transmitter 6T2 for a tablet device and an electronic tag transmitter 6P2 for an electronic pen are installed in the inspection room 82, an electronic tag transmitter 6T3 for a tablet device and an electronic tag transmitter 6P3 for an electronic pen are installed in the shipment room 83, and an electronic tag transmitter 6T4 for a tablet device and an electronic tag transmitter 6P4 for an electronic pen are installed in the repair room 84.

FIG. 23 illustrates an example of content stored in advance in the server apparatus 5C in this example. That is, as illustrated in FIG. 23, a production room app as an app to be provided is stored for the production room 81 in the server apparatus 5C in association with tag information TgT1 from the electronic tag transmitter 6T1 for a tablet device and tag information TgP1 from the electronic tag transmitter 6P1 for an electronic pen installed in the production room 81. Information of a coordinate value and document format correspondence table indicating a correspondence relationship between the item fields in the document format as illustrated in FIGS. 22A and 22B and the coordinate values on the sensor of the tablet device 2C is stored as required provided information.

In addition, as illustrated in FIG. 23, an inspection room app as an app to be provided is stored for the inspection room 82 in the server apparatus 5C in association with tag information TgT2 from the electronic tag transmitter 6T2 for a tablet device and tag information TgP2 from the electronic tag transmitter 6P2 for an electronic pen installed in the inspection room 82. Information of a coordinate value and document format correspondence table indicating a correspondence relationship between the item fields in the document format as illustrated in FIG. 22B and the coordinate values on the sensor of the tablet device 2C is stored as required provided information.

As illustrated in FIG. 23, a shipment room app and a repair app as apps to be provided are similarly stored for the shipment room 83 and the repair room 84 in the server apparatus 5C in association with tag information TgT3 and tag information TgT4 from the electronic tag transmitter 6T3 for a tablet device and the electronic tag transmitter 6T4 for a tablet device installed in the rooms and in association with tag information TgP3 and tag information TgP4 from the electronic tag transmitter 6P3 for an electronic pen and the electronic tag transmitter 6P4 for an electronic pen. Information of coordinate value and document format correspondence tables is stored as required provided information.

In this example, once the person in charge of entry carrying the electronic pen 1C, the tablet device 2C, and the pad-type device 3C enters each room, the electronic pen 1C and the tablet device 2C can receive the tag information from the electronic tag transmitter for an electronic pen and the electronic tag transmitter for a tablet device installed in each room. Therefore, when the person in charge of entry brings the electronic pen 1C over the sensor of the tablet device 2, the tablet device 2C receives the tag information for an electronic pen from the electronic tag transmitter for an electronic pen as a signal from the electronic pen 1C, and the tablet device 2C receives the tag information from the electronic tag transmitter for a tablet device. The tablet device 2C then sends the received tag information for an electronic pen and the tag information for a tablet device to the pad-type device 3C.

When the pad-type device 3C receives the tag information for an electronic pen and the tag information for a tablet device from the tablet device 2C, the pad-type device 3C sends the tag information to the server apparatus 5 through the communication network 4 and issues a providing request. Once the server apparatus 5C receives the providing request from the tablet device 2C, the server apparatus 5C sends the app and the provided information stored in association with the tag information for an electronic pen and the tag information for a tablet device to the pad-type device 3C that has issued the request.

The pad-type device 3C starts the app sent from the server apparatus 5C and displays, for example, a display image according to the document format for each room as illustrated in FIGS. 22A and 22B on the display screen of the pad-type device 3C. The pad-type device 3C also processes the information of the position instructed by the electronic pen 1C sent through the tablet device 2C and uses the information of the coordinate value and document format corresponding table as provided information to reflect the information on the display screen. In addition, the pad-type device 3C uses the information of the coordinate value and document format correspondence table to save the information (such as character text) of the position instructed by the electronic pen, for each item in the document format.

Therefore, in the present embodiment, once the person in charge of entry carrying the electronic pen 1C, the tablet device 2C, and the pad-type device 3C enters each room, the display image according to the document format of the entered room is displayed on the display screen of the pad-type device 3C. The document format for each room is printed on the recording paper 14, and the recording paper 14 can be locked by the paper holder 21X at the predetermined position of the tablet device 2C as described above. As a result, the coordinate position on the sensor of each item field of the document format printed on the recording paper corresponds to the coordinate position of each item in the coordinate value and document format correspondence table acquired from the server apparatus 5C.

Therefore, when the electronic pen 1C is used for writing and inputting each item in the document format of the recording paper locked to the tablet device 2C, the tablet device 2C uses the app acquired from the server apparatus 5 and uses the information of the coordinate value and document format correspondence table to process the information of the position instructed by the electronic pen 1C. Therefore, characters and the like as written and input to the recording paper 14 by using the electronic pen 1C are displayed in the field of each item in the display image according to the document format displayed on the display screen of the pad-type device 3C. Therefore, the person in charge of entry can check, on the display screen of the pad-type device 3C, the content of the electronic data (handwriting data as information of the position instructed by the electronic pen IC) according to the writing on the recording paper 14 locked to the tablet device 2C written by using the electronic pen 1C.

In this case, to acquire the provided app and the provided information from the server apparatus 3C, the tag information may be one of the tag information from the electronic tag transmitter for an electronic pen and the tag information from the electronic tag transmitter for a tablet device. However, the security and the reliability of the entry information can be improved by allowing to acquire the provided app and the provided information from the server apparatus 3C according to both the tag information from the electronic tag transmitter for an electronic pen and the tag information from the electronic tag transmitter for a tablet device as in the example.

For example, the tag information from the electronic tag transmitter for a tablet device is associated with each room provided with the electronic tag transmitter. The tag information from the electronic tag transmitter for an electronic pen is used for the authentication of the person in charge of entry. That is, the person in charge of entry in each room often has the authority, and the electronic pen 1C with a function of receiving the tag information from the electronic tag transmitter for an electronic pen is distributed only to the person in charge of entry.

In this way, the server apparatus 5C can use the tag information from the electronic tag transmitter for a tablet device to recognize the room from which the tag information is transmitted. The server apparatus 5C can use the tag information from the electronic tag transmitter for an electronic pen to check that the instruction is input by the electronic pen carried by the person in charge of entry in the room recognized based on the tag information from the electronic tag transmitter for a tablet device.

In this case, the tablet device 2C and the pad-type device 3C can also be installed in each room, and the person in charge of entry needs to carry only the electronic pen 1C and go to the room in which the data needs to be entered.

Note that the person in charge of entry having the authority can be registered and stored in the server apparatus in association with the pen ID of the electronic pen 1C, and the information including the pen ID can be sent from the pad-type device 3C. In this way, the pad-type device 3C can also store the person in charge of entry who has entered the data.

Note that in the first example, a PC with the function of the pad-type device 3C can also be prepared in each room, and the PC and the tablet device 2C can be connected wirelessly or through a cable. In addition, it is obvious that one apparatus with the functions of the tablet device 2C and the pad-type device 3C can be used as described above.

Second Example

A second example of the example of use of the information processing system in the fourth embodiment allows payment of credit card in a shop by using the electronic pen 1C without using a credit card. That is, the electronic tag transmitter for an electronic pen and the electronic tag transmitter for a tablet device are installed in the shop that allows the payment. The tablet device 2C and the pad-type device 3C may be installed in the shop or may be carried by the user. The electronic pen 1C used in this example is for an individual user.

The correspondence table as illustrated in FIG. 24 is stored in the tag information correspondence information storage device of the server apparatus 5C. That is, a credit payment application and required provided information for a shop A are stored in association with tag information TgTA from the electronic tag transmitter for a tablet device installed in the shop A. In addition, a credit payment application and required provided information for a shop B are stored in association with tag information TgTB from an electronic tag transmitter for a tablet device installed in the shop B.

In addition, a signature authentication application and required provided information for the shop A are stored in association with tag information TgPA from the electronic tag transmitter for an electronic pen installed in the shop A. In addition, a signature authentication application and required provided information for the ship B are stored in association with tag information TgPB from the electronic tag transmitter for an electronic pen installed in the shop B. Although not illustrated in FIG. 24, credit payment applications and required provided information for other shops are similarly stored in association with tag information from the electronic tag transmitters for a tablet device installed in the other shops, and signature authentication applications and required provided information for the shops are stored in association with the tag information from the installed electronic tag transmitters for an electronic pen.

In addition, card numbers of credit cards and signature information (handwriting information) of users A, B, C . . . are stored in relation to data IDA, IDB, IDC, . . . of an electronic pen 1CA, an electronic pen 1B, an electronic pen 1C . . . possessed by the users A, B, C . . . in the pen ID correspondence information storage device of the server apparatus 5C as illustrated in FIG. 25. The server apparatus 5C receives a registration request from the user to store the information in the pen ID correspondence information storage device. That is, the user accesses the server apparatus 5C in advance to register the ID of the electronic pen 1C possessed by the user in the server apparatus 5C and registers the card number of the credit card for payment in association with the pen ID.

A flow of a credit payment process in the second example will be described with reference to a sequence diagram of FIG. 26. Note that the user A uses the electronic pen 1CA of the user A to make the credit payment in the shop A in the description of the example of the sequence diagram in FIG. 26. In the shop A of the example, a tablet device 2CA and a pad-type device 3CA are provided for the shop.

As illustrated in FIG. 26, in the shop A, the tag information TgTA from an electronic tag transmitter 6TA for a tablet device installed in the ship A is sent to the pad-type device 3CA through the tablet device 2CA. A salesperson of the shop A operates the pad-type device 3CA to transmit provided information including the tag information TgTA from the electronic tag transmitter 6TA for a tablet device to the server apparatus 5C.

Consequently, the credit payment app and the provided information for the shop A corresponding to the tag information TgTA for a tablet device stored in the tag information correspondence storage device are sent from the server apparatus 5C to the pad-type device 3CA. The pad-type device 3CA starts the credit payment app for the shop A received from the server apparatus 5C and uses the provided information to display a display image for the credit payment on the display screen. A signature input field for the user is not displayed in the display image in this case. The salesperson of the shop A checks the display image and uses the paper holder 21X of the tablet device 2CA to lock the recording paper 14 at a predetermined position.

The salesperson then borrows the electronic pen 1CA of the user A to input necessary payment information to the recording paper 14. Alternatively, the user A may use the electronic pen 1CA of the user A to input necessary payment information to the recording paper 14. In this case, the electronic pen 1CA receives the tag information TgPA from the electronic tag transmitter 6PA for an electronic pen, and the electronic pen 1CA sends the tag information TgP to the tablet device 2CA along with the position detection signal. The tablet device 2CA detects the information of the position instructed by the electronic pen 1CA based on the position detection signal and associates and temporarily stores the detected information of the instruction position and the received tag information TgP.

The tablet device 2CA sends the tag information TgPA to the pad-type device 3CA when the information received from the electronic pen 1CA includes the tag information TgPA from the electronic tag transmitter 6PA for an electronic pen. The pad-type device 3CA sends a providing request including the tag information TgPA to the server apparatus 5C.

Consequently, the signature app and the provided information for the shop A corresponding to the tag information TgPA for an electronic pen stored in the tag information correspondence storage device are sent from the server apparatus 5C to the pad-type device 3CA. The pad-type device 3CA starts the signature app for the shop A received from the server apparatus 5C. The signature app displays the signature input field on the display screen of the pad-type device 3CA and announces that the electronic pen 1CA can be used to input the signature in the signature input field. The salesperson of the shop A checks the signature input field in the display screen of the pad-type device 3CA and prompts the user to input the signature in the signature input field of the recording paper 14.

The user then uses the ballpoint pen function of the electronic pen 1CA to write and input the signature of the user in the signature input field of the recording paper 14 locked to the tablet device 2CA. Consequently, the tablet device 2CA detects the signature input information in the signature input operation as information of the position instructed by the electronic pen 1C and sends the information to the pad-type device 3C in association with the pen ID of the electronic pen 1CA.

The pad-type device 3C uses the signature app to send an authentication request including the signature input information and the pen ID received from the tablet device 2CA to the server apparatus 5C.

Once the server apparatus 5C receives the authentication request, the server apparatus 5C uses the pen ID and refers to the pen ID correspondence information storage device of FIG. 25 to compare the stored signature information and the signature input information included in the authentication request. The server apparatus 5C authenticates the signature based on the degree of coincidence of the information. If the result of the authentication of the signature is OK, the server apparatus 5C notifies the pad-type device 3CA of the authentication OK. The pad-type device 3CA displays the authentication OK on the display screen based on the notification of the authentication OK to announce it to the salesperson of the shop A and the user. The pad-type device 3CA then sends the input payment information to the server apparatus 5C based on the reception of the notification of the authentication OK.

When the server apparatus 5C determines that the signature authentication is OK, the server apparatus 5C waits for the payment information from the pad-type device 3CA. When the server apparatus 5C receives the payment information, the server apparatus 5C uses the credit card number associated with the pen ID included in the authentication request to perform the credit payment. The server apparatus 5C then sends a credit payment completion notification to the pad-type device 3CA.

Once the pad-type device 3CA receives the credit payment completion notification from the server apparatus 5C, the pad-type device 3CA displays the completion of the payment on the display screen to announce it to the salesperson of the shop A and the user A.

Note that when the server apparatus 5C does not determine that the stored signature information and the signature input information included in the authentication request coincide, the server apparatus 5C sends signature authentication NG to prompt the user to input the signature again or to notify the user of the rejection of the credit payment using the electronic pen 1CA.

In addition, when the credit card number or the signature information is not stored according to the pen ID included in the authentication request, the server apparatus 5C notifies the user of the rejection of the credit payment using the electronic pen 1CA. In that case, electronic payment using the credit card may be performed.

In this way, according to the second example, the user performs the registration in the server apparatus 5C in association with the pen ID of the electronic pen 1CA possessed by the user and also registers the signature information. As a result, the user can use the electronic pen 1CA to make the credit payment at the shop without using the credit card.

Note that although the signature information is used for the authentication in the second example, only the pen ID of the electronic pen may be used to make the credit payment. However, the credit payment also using the signature information as in the second example can prevent a malicious user from using the electronic pen for the credit payment when the electronic pen is lost, and the security protection effect is high.

Note that the credit card number and the signature information are registered and stored in the server apparatus 5C in association with the pen ID of the electronic pen in the example. However, when the tablet device 2CA is for the individual user, the credit card number and the signature information may be registered and stored in association with the ID of the tablet device 2CA instead of the pen ID. In this case, only the ID of the tablet device 2CA may be used to read the credit card number to make the credit payment without using the signature information for the authentication.

In addition, the credit card number and the signature information may be registered and stored in association with a password set by the user instead of the pen ID or the ID of the tablet device 2CA. In that case, only the password set by the user may be used to read the credit card number to make the credit payment without using the signature information for the authentication.

Third Example

A third example of the example of use of the information processing system in the fourth embodiment is an example in which the payment by the credit card in the shop can be performed by using the electronic pen 1C without using the credit card as in the second example. However, the third example is different from the second example in that the authentication action can be performed only near the electronic tag transmitter 6P for an electronic pen.

The electronic tag transmitter 6P for an electronic pen can adjust the signal output of the tag information TgP to set the transmission range of the tag information TgP. Therefore, the electronic tag transmitter 6P for an electronic pen is placed near, for example, a cash register of the shop, and the signature can be verified for the payment only near the cash register in the third example.

Specifically, the tablet device 2C receives the tag information TgP of the electronic tag transmitter 6P for an electronic pen from the electronic pen 1C and transmits the tag information TgP to the server apparatus 5C through the pad-type terminal 3C. In this case, when the server apparatus 5C detects the reception of the tag information TgPA, the server apparatus 5C transmits an app for displaying the signature input field or returns a command for starting the app for displaying the signature input field installed in the pad-type terminal 3C to the pad-type device 3C. The pad-type device 3C displays the signature input field in response to the command. Once the signature input field is displayed on the display screen of the pad-type device 3C, the electronic device 1C can be used to input the signature, and the signature can be verified.

On the other hand, the electronic pen 1C cannot receive the tag information TgP when the electronic pen 1C is not near the electronic tag transmitter 6P for an electronic pen. Therefore, the tag information TgP cannot be sent to the server apparatus 5C even when the electronic pen 1C approaches the pad-type device 3C, and the app for displaying the signature input field is not started in the pad-type device 3C. As a result, the signature cannot be verified, and the payment cannot be performed.

Therefore, the third example allows to always perform the payment action at a place where a fraudulent pen input can be prevented, such as beside the salesperson watching the payment action, and this is preferable in terms of security. That is, this can prevent a fraudulent behavior in payment, such as a malicious payer who has stolen the electronic pen of another person imitates and inputs the signature of the person who is the owner of the electronic pen while looking at the signature or traces and inputs the signature of the person when the salesperson is not watching.

Note that although the app acquired from the server apparatus 5C is automatically started in the fourth embodiment, the pad-type device may acquire the app from the server apparatus 5C and provide a display indicating that the app can be launched. In response to this, the person in charge of entry, the salesperson of the shop, or the like may perform a start operation to start the app.

In addition, although the app is acquired from the server apparatus 5C in the fourth embodiment, the app may be installed in advance in the pad-type device, and only the necessary information as described above used in the app may be acquired from the server apparatus based on the tag information.

Other Embodiments or Modifications

Although the electronic pen of the embodiments is an electronic pen of the electromagnetic induction coupling system, it is obvious that the electronic pen of the present disclosure may be an electronic pen of an active capacitance system in which the electronic pen includes a signal transmission circuit.

Figure 27:
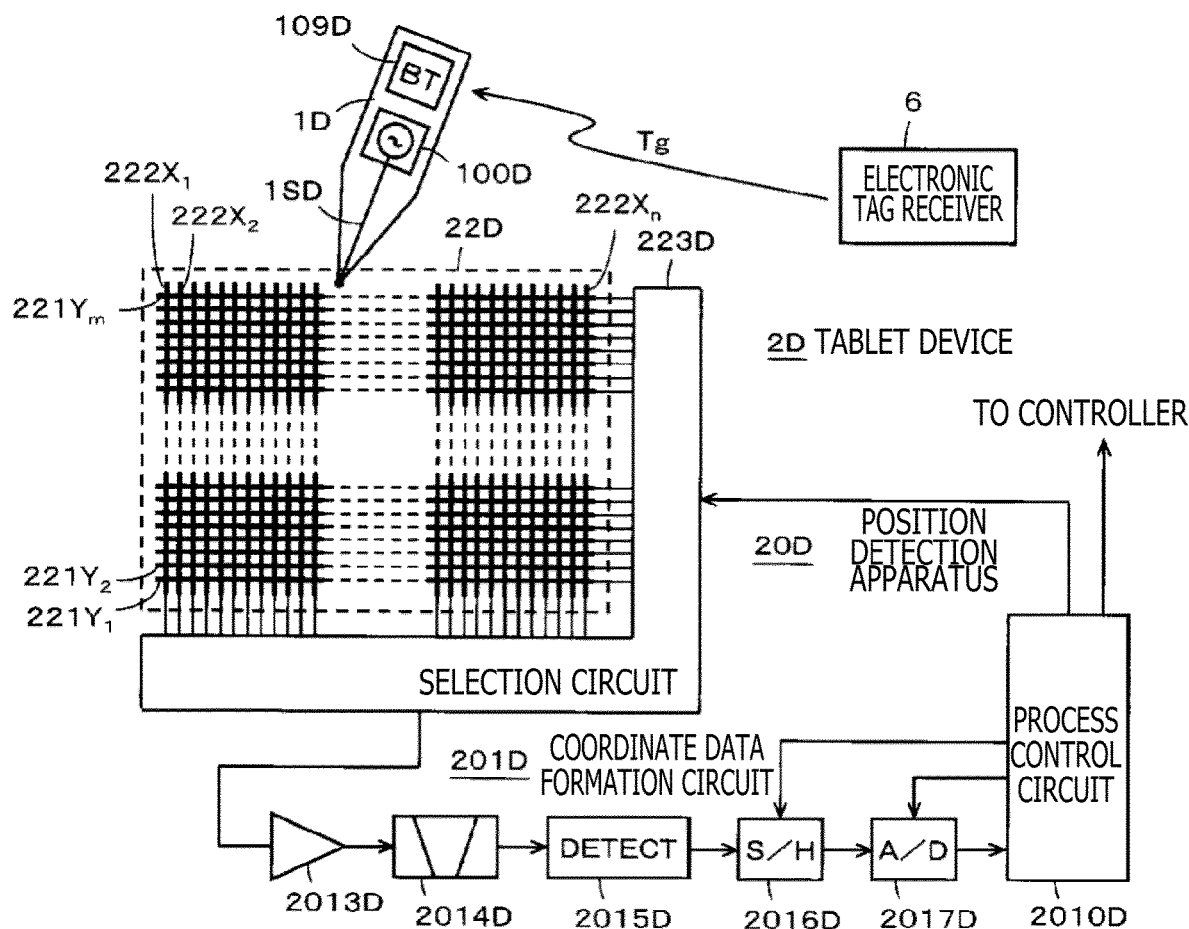
FIG. 27 is a diagram for describing another example of configuration of the electronic pen and the position detection apparatus according to the present disclosure.

FIG. 27 is a diagram illustrating an example of circuits of parts of an electronic pen 1D of the active capacitance system and a position detection apparatus of a tablet device 2D used with the electronic pen 1D. This example illustrates a case in which the electronic pen 1D is used in place of the electronic pen 1 of the first embodiment.

The electronic pen 1D of the active capacitance system of this example includes a wireless communication device 109D that receives the tag information Tg from the electronic tag transmitter 6 and includes a signal transmitter 100D. In addition, the electronic pen 1D transmits an AC signal at a predetermined frequency as a position detection signal from a core body 1SD made of a conductive material and transmits the pen pressure information, the pen ID, and the tag information Tg received from the electronic tag transmitter 6 as additional information from the core body 1SD.

As illustrated in FIG. 27, a position detection apparatus 20D of the tablet device 2D includes a sensor 22D, a coordinate data formation 201D connected to the sensor 22D, and a controller (not illustrated in FIG. 27).

The sensor 22D is formed by laminating, from the lower side, a first conductor group, an insulating layer (not illustrated), and a second conductor group. The first conductor group includes a plurality of first conductors $221Y_1$, $221Y_2, \ldots$, and $221Y_m$ (m is an integer equal to or greater than 1) extending in the lateral direction (X-axis direction) arranged in parallel at predetermined intervals in the Y-axis direction. The second conductor group includes a plurality of second conductors $222X_1, 222X_2, \ldots$, and $222X_n$ (n is an integer equal to or greater than 1) extending in a direction intersecting with the extending direction of the first conductors $221Y_1, 221Y_2, \ldots$, and $221Y_m$, that is, the orthogonal longitudinal direction (Y-axis direction) in this example. The second conductors $222X_1, 222X_2, \ldots$, and $222X_n$ are arranged in parallel at predetermined intervals in the X-axis direction.

The coordinate data formation 201D includes a selection circuit 223D as an input-output interface for the sensor 22D, an amplification circuit 2013D, a band-pass filter 2014D, a detection circuit 2015D, a sample and hold circuit 2016D, an AD conversion circuit 2017D, and a process control circuit 2010D.

The selection circuit 223D selects one conductor from the first conductor group $221Y_1, 221Y_2, \ldots$, and $221Y_m$ and one conductor from the second conductor group $222X_1, 222X_2, \ldots$, and $222X_n$ based on a control signal from the process control circuit 2010D. The conductors selected by the selection circuit 223D are connected to the amplification circuit 2013D. A signal from the electronic pen 1D is detected by the selected conductors and amplified by the amplification circuit 2013D. The output of the amplification circuit 2013D is supplied to the band-pass filter 2014D, and only the components of the frequency of the signal transmitted from the electronic pen 1D are extracted.

The detection circuit 2015D detects the output signal of the band-pass filter 2014D. The output signal of the detection circuit 2015D is supplied to the sample and hold circuit 2016D and is sampled and held at predetermined timing based on a sampling signal from the process control circuit 2010D. The AD conversion circuit 2017D then converts the signal into a digital value. The process control circuit 2010D reads the digital data from the AD conversion circuit 2017D.

The control circuit 2010D detects position coordinates on the sensor 22D instructed by the electronic pen 1D (information of position instructed by the electronic pen 1D) from the digital data from the AD conversion circuit 2017D and detects the additional information including the pen pressure information, the pen ID, the tag information, and the like sent from the electronic pen 1D. The process control circuit 2010D then supplies the detected information of the position instructed by the electronic pen 1D and the additional information to the controller not illustrated. The controller stores the received information of the position instructed by the electronic pen 1D and the additional information in the storage device or outputs the information to the outside as in the embodiments.

Figure 28:
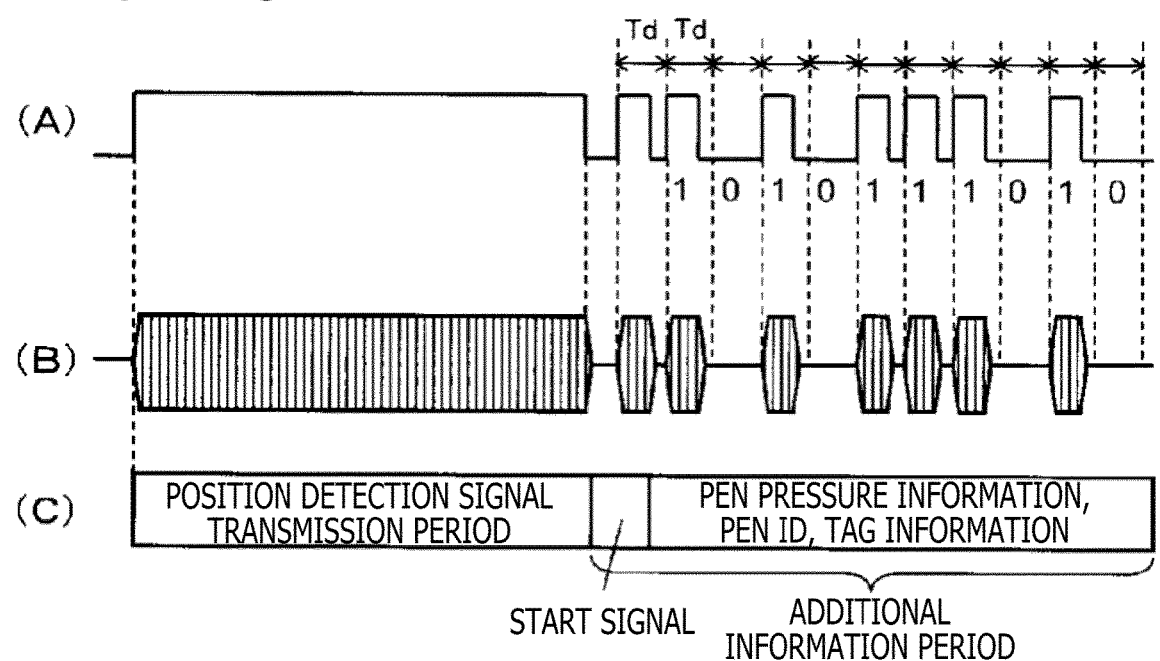
FIG. 28 is a diagram for describing another example of configuration of the electronic pen and the position detection apparatus according to the present disclosure.

The electronic pen 1D of this example repeatedly outputs a signal of a pattern including a position detection signal transmission period and an additional information transmission period in one cycle as illustrated in (C) of FIG. 28. (A) of FIG. 28 illustrates an example of a transmission control signal in the electronic pen 1D. A certain period in which the transmission control signal of (A) of FIG. 28 is maintained in a high level is a position detection signal transmission period, and an oscillation signal at a predetermined frequency is consecutively transmitted as a burst signal in this period as illustrated in (B) of FIG. 28.

The length of the position detection signal transmission period is a time length that allows the coordinate data formation 201D of the tablet device 2D to detect the position on the sensor 22D instructed by the electronic pen 1D and is, for example, a time length that allows to scan all the first conductors 221Y and the second conductors 222X once or more, preferably, more than a plurality of times.

In addition, the electronic pen 1D controls the transmission control signal at a high level or a low level at a predetermined cycle (Td) in an additional information transmission period after the end of the position detection signal transmission period as illustrated in (A) of FIG. 28 to thereby perform ASK modulation of the AC signal at a predetermined frequency. Instead of the ASK modulation, an on off keying (OOK) signal may be formed.

In this case, the first predetermined cycle (Td) after the position detection signal transmission period is always in the high level, and the signal is a start signal of (C) of FIG. 28. The start signal is a timing signal that allows the coordinate data formation 201D of the tablet device 2D to accurately determine the subsequent transmission timing of additional information. Note that instead of the start signal, the burst signal of the position detection signal transmission period can be used as the timing signal.

In the additional information transmission period, the electronic pen 1D sequentially transmits the pen pressure information of a plurality of bits, the pen ID of a plurality of bits, and the tag information of a plurality of bits, following the start signal. In this case, as illustrated in (A) and (B) of FIG. 28, the ASK modulation is performed by controlling the transmission control signal ((A) of FIG. 28) at the low level to not to transmit the AC signal when the transmission data (binary code) indicates "0" and controlling the transmission control signal at the high level to transmit the AC signal when the transmission data (binary code) indicates "1."

In the coordinate data formation of the tablet device 2D, the process control circuit 2010D detects the position instructed by the electronic pen 1D from the reception signal in the position detection signal transmission period. The process control circuit 2010D then waits for the end of the position detection signal transmission period. Once the process control circuit 2010D detects the start signal, the process control circuit 2010D detects the pen pressure information in the additional information transmission period as well as the data of the pen ID and the tag information and performs an action of restoring them. The process control circuit 2010D then outputs the information of the position instructed by the electronic pen 1D, the pen pressure information, the pen ID, and the tag information to the controller.

Note that the electronic tag transmitter (may be either the electronic tag transmitter for an electronic pen or the electronic tag transmitter for a tablet device) may be built in an arm band, a necklace, or the like that can be worn by a person or may be downsized to allow carrying the electronic tag transmitter in a pocket. In this way, the user operating the electronic pen or the tablet device may wear or carry the electronic tag transmitter.

In that case, for example, the electronic pen and the tablet device that can receive the tag information from the electronic tag transmitter worn or carried by the user can be prepared and installed in the shop that allows the credit payment in the second and third examples of the fourth embodiment. In this way, the user making the payment can wear or carry the electronic tag transmitter to make the credit payment at the shop.

For example, the user can wear an accessory including the electronic tag transmitter for an electronic pen and the electronic tag transmitter for a tablet device and go to the shop. The user can use the electronic pen and the tablet device with a function of receiving the tag information from the electronic tag transmitter prepared in the shop to make the credit payment.

Specifically, the information associated with the electronic tag transmitter for a tablet device through the server apparatus 5C is information regarding the language used, and the information associated with the electronic tag transmitter for an electronic pen is information regarding the credit payment of the individual user. When the user approaches the electronic pen and the tablet device provided in the shop, a shop guidance in the language used by the user is displayed on the tablet device through the server apparatus 5C. When the user brings the electronic pen close to the tablet device, the credit information of the user is displayed. In addition, the signature is authenticated through the server apparatus 5C, and the credit payment is made.

Note that the installation place of the electronic tag transmitter may be not only a fixed place, such as a hospital room, a shop, and a factory, but also a moving body, such as inside of an automobile (such as a taxi).

DESCRIPTION OF REFERENCE SYMBOLS 1, 1A, 1B, 1C, 1D . . . Electronic pen, 2, 2A, 2B, 2C, 2D . . . Tablet device (position detection apparatus), 3, 3A, 3B . . . PC, 3C . . . Pat-type device, 4 . . . Communication network, 5, 5A, 5B, 5C . . . Server apparatus, 6 . . . Electronic tag transmitter, 6T, 6TA, 6TB, 6TC, 6TD . . . Electronic tag transmitter for a tablet device, 6P, 6PA, 6PB, 6PC, 6PD . . . Electronic tag transmitter for an electronic pen, 7 . . . Information processing apparatus, 14 . . . Recording paper, 21 . . . Paper holder, 20, 20A . . . Position detection apparatus, 54 . . . Pen ID correspondence information storage device, 55 . . . Tag information correspondence information storage device In the drawings:
FIG. 1
4 COMMUNICATION NETWORK
5 SERVER APPARATUS
6 ELECTRONIC TAG TRANSMITTER
7 INFORMATION PROCESSING APPARATUS
FIG. 3
RECORD OF DOCTOR'S VISIT
PATIENT'S IMPRESSIONS AND OPINIONS
DOCTOR'S OBSERVATIONS
FIG. 4
PEN ID CORRESPONDENCE INFORMATION STORAGE
PEN ID
DOCTOR'S NAME
FIG. 5
TAG INFORMATION CORRESPONDENCE INFORMATION STORAGE
TAG INFORMATION
HOSPITAL ROOM No.
EAST 101
PATIENT'S NAME
ABCD
NAME OF DISEASE
PATIENT'S IMPRESSIONS AND OPINIONS
DOCTOR'S OBSERVATIONS
EFGH
FIG. 6
TODAY'S RECORD OF DOCTOR'S VISIT
HOSPITAL ROOM
PATIENT'S NAME
NAME OF DISEASE
PATIENT'S IMPRESSIONS AND OPINIONS
DOCTOR'S OBSERVATIONS
DOCTOR'S NAME
EAST 101
ABCD
EFGH
IJKL
FIG. 7
1 ELECTRONIC PEN (WITH BALLPOINT PEN FUNCTION)
1S COREBODY
1T TIP PORTION
2 TABLET DEVICE
14 RECORDING PAPER
21X PAPER HOLDER
FIG. 8
21A UPPER COVER (UPPER PLATE)
21X PAPER HOLDER
22 SENSOR
23 SHIELD SHEET
24 SENSOR COVER
201 COORDINATE DATA FORMATION
202 CONTROLLER
203 USER I/F
AT TRANSMISSION ANTENNA
FIG. 9
1 ELECTRONIC PEN
20 POSITION DETECTION APPARATUS
60 CONTROL
61 MEMORY
110 ID MEMORY
201 COORDINATE DATA FORMATION
202 CONTROLLER
203 USER I/F
2010 PROCESS CONTROL
2012 DRIVE CIRCUIT
2015 DETECTION CIRCUIT
2021 STORAGE
2022 WIRELESS COMMUNICATION DEVICE
FIG. 10
51 CONTROL
52 COMMUNICATION
53 RECEPTION INFORMATION VERIFICATION
54 PEN ID CORRESPONDENCE INFORMATION STORAGE
55 TAG INFORMATION CORRESPONDENCE INFORMATION STORAGE
56 PROVIDED INFORMATION GENERATION
FIG. 11
1 ELECTRONIC PEN
START
S101 IN AREA OF COMMUNICATION WITH ELECTRONIC TAG TRANSMITTER?
S102 TRANSMIT POSITION DETECTION SIGNAL AND ADDITIONAL INFORMATION INCLUDING PEN PRESSURE INFORMATION AND PEN ID
S103 TRANSMIT POSITION DETECTION SIGNAL AND ADDITIONAL INFORMATION INCLUDING PEN PRESSURE INFORMATION, PEN ID, AND TAG INFORMATION
S104 OUT OF AREA OF COMMUNICATION WITH ELECTRONIC TAG TRANSMITTER?

FIG. 12
2 TABLET DEVICE
START
S201 DETECTION INFORMATION OF INPUT OF PEN INSTRUCTION RECEIVED?
S202 TAG INFORMATION INCLUDED?
S203 ASSOCIATE AND STORE INFORMATION OF PEN INSTRUCTION POSITION AND PEN ID
S204 DETECT PEN INSTRUCTION POSITION AND STORE IT IN ASSOCIATION WITH PEN ID AND TAG INFORMATION
S205 TRANSMISSION INSTRUCTION OPERATION FOR EXTERNAL DEVICE?
S206 TRANSMIT STORED INFORMATION TO EXTERNAL DEVICE
FIG. 13
3 PC
START
S301 TABLET DEVICE CONNECTED?
S302 ANOTHER PROCESS
S303 RECEIVE INFORMATION FROM TABLET DEVICE
S304 INFORMATION WITH TAG INFORMATION RECEIVED?
S305 TRANSMIT PEN ID TO SERVER APPARATUS
S306 RECEIVE PROVIDED INFORMATION
S307 USE INFORMATION OF PEN INSTRUCTION POSITION AND PROVIDED INFORMATION TO GENERATE DISPLAY INFORMATION
S308 TRANSMIT PEN ID AND TAG INFORMATION TO SERVER APPARATUS
S309 RECEIVE PROVIDED INFORMATION
S310 USE INFORMATION OF PEN INSTRUCTION POSITION AND PROVIDED INFORMATION TO GENERATE DISPLAY INFORMATION
S311 DISPLAY
S312 FINISHED?
END
FIG. 14
3 SERVER APPARATUS
START
S501 INFORMATION PROVIDING REQUEST RECEIVED FROM PC?
S502 ANOTHER PROCESS
S503 INFORMATION PROVIDING REQUEST INCLUDES PEN ID AND TAG INFORMATION? (ONLY PEN ID)
S505 USE INFORMATION CORRESPONDING TO PEN ID TO GENERATE PROVIDED INFORMATION
S505 USE INFORMATION CORRESPONDING TO PEN ID AND INFORMATION CORRESPONDING TO TAG INFORMATION TO GENERATE PROVIDED INFORMATION
S506 TRANSMIT GENERATED PROVIDED INFORMATION
S507 FINISHED?
END
FIG. 15
6 ELECTRONIC TAG TRANSMITTER
FIG. 17
2 TABLET DEVICE
START
S211 DETECTION INFORMATION OF INPUT OF PEN INSTRUCTION RECEIVED?
S212 IN RECEPTION AREA OF TAG INFORMATION?
S213 ASSOCIATE AND STORE INFORMATION OF PEN INSTRUCTION POSITION AND PEN ID
S214 STORE INFORMATION OF PEN INSTRUCTION POSITION IN ASSOCIATION WITH RECEIVED TAG INFORMATION AND PEN ID
S215 TRANSMISSION INSTRUCTION OPERATION FOR EXTERNAL DEVICE?
S216 TRANSMIT STORED INFORMATION TO EXTERNAL DEVICE
FIG. 18
3B PC
4 COMMUNICATION NETWORK
5B SERVER APPARATUS
6P ELECTRONIC TAG TRANSMITTER FOR AN ELECTRONIC PEN
6T ELECTRONIC TAG TRANSMITTER FOR A TABLET DEVICE
FIG. 19
2B TABLET DEVICE
START
S221 DETECTION INFORMATION OF INPUT OF PEN INSTRUCTION RECEIVED?
S222 IN AREA OF COMMUNICATION WITH TAG TRANSMITTER FOR A TABLET DEVICE?
S223 SIGNAL FROM ELECTRONIC PEN INCLUDES TAG INFORMATION FOR AN ELECTRONIC PEN?
S224 ASSOCIATE RECEIVED TAG INFORMATION FOR A TABLET DEVICE AND PEN ID AND STORE INFORMATION OF PEN INSTRUCTION POSITION
S225 ASSOCIATE RECEIVED TAG INFORMATION FOR A TABLET DEVICE, TAG INFORMATION FOR AN ELECTRONIC PEN RECEIVED FROM ELECTRONIC PEN, AND PEN ID AND STORE INFORMATION OF PEN INSTRUCTION POSITION
S226 SIGNAL FROM ELECTRONIC PEN INCLUDES TAG INFORMATION FOR AN ELECTRONIC PEN?
S227 STORE INFORMATION OF PEN INSTRUCTION POSITION IN ASSOCIATION WITH PEN ID
S228 ASSOCIATE TAG INFORMATION FOR AN ELECTRONIC PEN AND PEN ID AND STORE INFORMATION OF PEN INSTRUCTION POSITION
S229 TRANSMISSION INSTRUCTION OPERATION FOR EXTERNAL DEVICE?
S230 TRANSMIT STORED INFORMATION TO EXTERNAL DEVICE
FIG. 20
4 COMMUNICATION NETWORK
5C SERVER APPARATUS
6P ELECTRONIC TAG TRANSMITTER FOR AN ELECTRONIC PEN
6T ELECTRONIC TAG TRANSMITTER FOR A TABLET DEVICE
FIG. 21
8 FACTORY BUILDING
81 PRODUCTION ROOM
82 INSPECTION ROOM
83 SHIPMENT ROOM
84 REPAIR ROOM
FIGS. 22A and 22B
FOR PRODUCTION ROOM
PRODUCTION LINE A
TIME
COMMENT
QUANTITY
INSPECTION ROOM
CHECK PART C
CHECK PART D FIG. 23
TAG INFORMATION CORRESPONDENCE INFORMATION STORAGE ROOM
FOR A TABLET
FOR AN ELECTRONIC PEN
PROVIDED APP
PROVIDED INFORMATION
PRODUCTION
PRODUCTION APP
COORDINATE VALUE AND DOCUMENT FORMAT TABLE
INSPECTION
INSPECTION APP
SHIPMENT
SHIPMENT APP
REPAIR
REPAIR APP
FIG. 24
TAG INFORMATION
FOR AN ELECTRONIC PEN
CREDIT PAYMENT APP AND PROVIDED INFORMATION FOR SHOP A
SIGNATURE AUTHENTICATION APP AND PROVIDED INFORMATION FOR SHOP A
CREDIT PAYMENT APP AND PROVIDED INFORMATION FOR SHOP B
SIGNATURE AUTHENTICATION APP AND PROVIDED INFORMATION FOR SHOP B
FIG. 25
PEN ID CORRESPONDENCE INFORMATION STORAGE
PEN ID
CREDIT CARD NUMBER
SIGNATURE INFORMATION
USER
FIG. 26
SERVER APPARATUS
PAD-TYPE DEVICE
TABLET DEVICE
ELECTRONIC PEN
ELECTRONIC TAG TRANSMITTER FOR A TABLET DEVICE
ELECTRONIC TAG TRANSMITTER FOR AN ELECTRONIC PEN
APP REQUEST CORRESPONDING TO TgTA
APP CORRESPONDING TO TgTA
START APP
POSITION INSTRUCTION OPERATION
TEMPORARILY STORE
APP REQUEST CORRESPONDING TO TgPA
APP CORRESPONDING TO TgPA
START APP
DISPLAY SIGNATURE INPUT FIELD
SIGNATURE INPUT OPERATION
SIGNATURE INPUT INFORMATION AND PEN ID
AUTHENTICATION REQUEST (PEN ID, SIGNATURE INPUT INFORMATION)
AUTHENTICATE
AUTHENTICATION OK
NOTIFY AUTHENTICATION OK
DISPLAY AUTHENTICATION OK
PAYMENT INFORMATION
CREDIT PAYMENT
NOTIFY COMPLETION OF PAYMENT
DISPLAY COMPLETION OF PAYMENT FIG. 27
2D TABLET DEVICE
6 ELECTRONIC TAG receiver
20D POSITION DETECTION APPARATUS
201D COORDINATE DATA FORMATION
223D SELECTION CIRCUIT
2010D PROCESS CONTROL CIRCUIT
TO CONTROLLER
FIG. 28
POSITION DETECTION SIGNAL TRANSMISSION PERIOD
START SIGNAL
PEN PRESSURE INFORMATION, PEN ID, TAG INFORMATION
ADDITIONAL INFORMATION PERIOD

The invention claimed is:

1. An input apparatus comprising:
a receiver which, in operation, receives tag information transmitted from an electronic tag transmitter;
a transmitter which, in operation, transmits a position detection signal for detecting a position of the input apparatus on a sensor of a position detection apparatus, to the position detection apparatus, the position detection apparatus being different from the electronic tag transmitter; and
a control circuit which, in operation, determines whether the input apparatus is in an area in which the input apparatus can communicate with the electronic tag transmitter, controls the transmitter to transmit the tag information to the position detection apparatus along with the position detection signal when the input apparatus is determined to be within the area in which the input apparatus can communicate with the electronic tag transmitter, and does not control the transmitter to transmit the tag information to the position detection apparatus along with the position detection signal when the input apparatus is not determined to be within the area in which the input apparatus can communicate with the electronic tag transmitter.

2. The input apparatus according to claim 1, further comprising:
a storage device that stores identification information that identifies the input apparatus, wherein
the control circuit controls the transmitter to also transmit the identification information to the sensor of the position detection apparatus.

3. The input apparatus according to claim 1, wherein the transmitter uses electromagnetic induction coupling to transmit the signal to the sensor of the position detection apparatus.

4. The input apparatus according to claim 1, wherein the transmitter uses capacitive coupling to transmit the signal to the sensor of the position detection apparatus.

5. A position detection apparatus comprising:
a sensor which, in operation, receives a signal transmitted from an input apparatus, the signal received by the sensor including tag information transmitted from an electronic tag transmitter and a position detection signal when the input apparatus is within an area in which the input apparatus can communicate with the electronic tag transmitter, and the signal received by the sensor not including the tag information transmitted from the electronic tag transmitter and including the position detection signal when the input apparatus is not within the area in which the input apparatus can communicate with the electronic tag transmitter;

a detection circuit which, in operation, detects a position instructed by the input apparatus as a position where the sensor receives the position detection signal from the input apparatus; and a processor which, in operation, determines whether the signal received by the sensor includes the tag information from the electronic tag transmitter, stores information of the position detected by the detection circuit in a first storage device in association with the tag information transmitted from the input apparatus received by the sensor when the signal received by the sensor is determined to include the tag information transmitted from the electronic tag transmitter, and does not store the information of the position detected by the detection circuit in the first storage device in association with the tag information transmitted from the input apparatus when the signal received by the sensor is not determined to include the tag information from the electronic tag transmitter.

6. The position detection apparatus according to claim 5, further comprising:

a second storage device that stores first identification information that identifies the apparatus, wherein the processor, in operation, also stores the first identification information in the first storage device in association with the information of the position detected by the detection circuit.

7. The position detection apparatus according to claim 5, further comprising:

a receiver which, in operation, receives second identification information that identifies the input apparatus from the input apparatus, wherein the processor, in operation, also stores the second identification information of the input apparatus in the first storage device in association with the information of the position detected by the detection circuit.

8. A position detection apparatus comprising:

a sensor which, in operation, receives a signal transmitted from an input apparatus, the signal received by the sensor including tag information transmitted from an electronic tag transmitter and a position detection signal when the input apparatus is within an area in which the input apparatus can communicate with the electronic tag transmitter, and the signal received by the sensor not including the tag information from the electronic tag transmitter and including the position detection signal when the input apparatus is not within the area in which the input apparatus can communicate with the electronic tag transmitter;

a detection circuit which, in operation, detects a position instructed by the input apparatus as a position where the sensor receives the position detection signal from the input apparatus; and a transmitter which, in operation, transmits information of the position detected by the detection circuit in association with the tag information when the signal received by the sensor includes the tag information, and does not transmit the information of the position detected by the detection circuit in association with the tag information when the signal received by the sensor does not include the tag information.

9. The position detection apparatus according to claim 8, further comprising:

a first storage device which, in operation, stores first identification information that identifies the apparatus, wherein the transmitter also transmits the first identification information in association with the information of the position detected by the detection circuit.

10. The position detection apparatus according to claim 8, further comprising:

a receiver which, in operation, receives second identification information that identifies the input apparatus from the input apparatus, wherein the transmitter also transmits the second identification information of the input apparatus in association with the information of the position detected by the detection circuit.

11. A position detection apparatus comprising:

a first receiver which, in operation, receives tag information transmitted from an electronic tag transmitter when the first receiver is within an area in which first receiver can communicate with the electronic tag transmitter;

a sensor which, in operation, receives a position detection signal from an input apparatus;

a detection circuit which, in operation, detects a position instructed by the input apparatus as a position where the sensor receives the position detection signal from the input apparatus; and a processor which, in operation, determines whether the first receiver is within the area in which the first receiver can communicate with the electronic tag transmitter, stores information of the position detected by the detection circuit in a first storage device in association with the tag information received by the first receiver when the first receiver is determined to be within the area in which the first receiver can communicate with the electronic tag transmitter, and does not store the information of the position detected by the detection circuit in the first storage device in association with the tag information when the first receiver is not determined to be within the area in which the first receiver can communicate with the electronic tag transmitter.

12. The position detection apparatus according to claim 11, further comprising:

a second storage device which, in operation, stores first identification information that identifies the apparatus, wherein the processor, in operation, also stores the first identification information in the first storage device in association with the information of the position detected by the detection circuit.

13. The position detection apparatus according to claim 11, wherein:

a second receiver which, in operation, receives second identification information that identifies the input apparatus from the input apparatus, wherein the processor, in operation, also stores the second identification information of the input apparatus received by the second receiver in the first storage device in association with the information of the position detected by the detection circuit and the tag information received by the sensor.

14. A position detection apparatus comprising:

a sensor which, in operation, receives a signal transmitted from an input apparatus, the signal received by the sensor including first tag information transmitted from a first electronic tag transmitter and a position detection signal when the input apparatus is within an area in which the input apparatus can communicate with the first electronic tag transmitter, and the signal received by the sensor not including the first tag information transmitted from the first electronic tag transmitter and including the position detection signal when the input apparatus is not within the area in which the input apparatus can communicate with the first electronic tag transmitter;

a first receiver which, in operation, receives second tag information transmitted from a second electronic tag transmitter, the second tag information being different from the first tag information;

a detection circuit which, in operation, detects a position instructed by the input apparatus as a position where the sensor receives the position detection signal from the input apparatus; and a processor which, in operation, determines whether the signal received by the sensor includes the first tag information transmitted from the first electronic tag transmitter, stores information of the position detected by the detection circuit in a first storage device in association with the first tag information transmitted from the input apparatus received by the sensor and the second tag information received by the first receiver when the signal received by the sensor is determined to include the first tag information transmitted from the first electronic tag transmitter, and does not store the information of the position detected by the detection circuit in the first storage device in association with the first tag information and the second tag information tag information when the signal received by the sensor is not determined to include the first tag information transmitted from the input apparatus.

15. The position detection apparatus according to claim 14, further comprising:

a second storage device which, in operation, stores first identification information that identifies the apparatus, wherein the processor, in operation, also stores the first identification information in the first storage device in association with the information of the position detected by the detection circuit.

16. The position detection apparatus according to claim 14, further comprising:

a second receiver which, in operation, receives second identification information that identifies the input apparatus from the input apparatus, wherein the processor, in operation, also stores the second identification information of the input apparatus in the first storage device in association with the information of the position detected by the detection circuit.

17. The position detection apparatus according to claim 14, wherein:

the processor, in operation, determines whether the position detection apparatus is in a region range that enables the first receiver to receive the second tag information from the second electronic tag transmitter or is out of the region range, when the processor determines that the position detection apparatus is in the region range that allows the first receiver to receive the second tag information, the processor stores the information of the detected position in the first storage device in association with the first tag information from the input apparatus received by the sensor and the second tag information received by the first receiver.

* * * * *